United States Patent
Bark et al.

(10) Patent No.: US 12,257,943 B2
(45) Date of Patent: Mar. 25, 2025

(54) SWING ARM LIFTGATE

(71) Applicant: MAXON INDUSTRIES, INC., Santa Fe Springs, CA (US)

(72) Inventors: Paul Bark, Carlsbad, CA (US); Karapet Ablabutyan, Glendale, CA (US); Akop Gasparian, Pacoima, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 0 days.

(21) Appl. No.: 17/059,154

(22) PCT Filed: Jun. 6, 2019

(86) PCT No.: PCT/US2019/035851
§ 371 (c)(1),
(2) Date: Nov. 25, 2020

(87) PCT Pub. No.: WO2019/236892
PCT Pub. Date: Dec. 12, 2019

(65) Prior Publication Data
US 2021/0213863 A1     Jul. 15, 2021

Related U.S. Application Data

(60) Provisional application No. 62/838,553, filed on Apr. 25, 2019, provisional application No. 62/682,032, filed on Jun. 7, 2018.

(51) Int. Cl.
*B60P 1/44* (2006.01)
(52) U.S. Cl.
CPC ............. *B60P 1/445* (2013.01); *B60P 1/4414* (2013.01); *B60P 1/4478* (2013.01); *B60P 1/4485* (2013.01); *Y10S 414/13* (2013.01)

(58) Field of Classification Search
CPC ....... B60P 1/4414; B60P 1/445; B60P 1/4485; B60P 1/4471; B60P 1/4478; Y10S 414/13
(Continued)

(56) References Cited

U.S. PATENT DOCUMENTS 3,638,813 A * 2/1972 Strong ...................... B66B 9/00
414/544
3,703,968 A * 11/1972 Uhrich .................... B63C 11/40
901/22

(Continued)

FOREIGN PATENT DOCUMENTS

DE      3527935 A1 * 2/1987 .............. B60P 1/445
EP      0479653 A1 * 4/1992 .............. B60P 1/445
(Continued)

OTHER PUBLICATIONS

International Search Report and Written Opinion for PCT/US19/35851 mailed Aug. 22, 2019.

*Primary Examiner* — James Keenan
(74) *Attorney, Agent, or Firm* — Command IP LLP; Michael Zarrabian

(57) ABSTRACT

Systems, devices, and methods having a liftgate frame; a first bracket mount connected to a beam via one or more upper actuators and two or more upper linkages, the two or more upper linkages pivotally mounted between the first bracket mount and the liftgate frame, and where the first bracket mount is configured to move from a first stowed position under the liftgate frame to a second engage position via the one or more upper actuators and the two or more upper linkages; a second bracket mount connected to the beam; a third bracket mount connected to second bracket mount via one or more lower actuators and two or more lower linkages, the two or more lower linkages pivotally mounted between the second bracket mount and the third bracket mount; and a lift platform connected to the third (Continued)

bracket mount, where the lift platform is configured to move from an up position to a down position positioned selectively relative to an external surface; where the first bracket mount moves in an arcuate path from the first stowed position under the liftgate frame to the second engaged position.

20 Claims, 50 Drawing Sheets

(58) Field of Classification Search
USPC .......................................... 414/558, 557, 917
See application file for complete search history.

(56) References Cited

U.S. PATENT DOCUMENTS

| | | | |
|---|---|---|---|
| 3,737,055 A | 6/1973 | Pettit | |
| 3,799,373 A * | 3/1974 | Randall | B60P 1/4457 |
| | | | 414/557 |
| 4,078,676 A | 3/1978 | Mortenson | |
| 4,147,261 A * | 4/1979 | Dautel | B60P 1/4414 |
| | | | 414/557 |
| 4,505,359 A * | 3/1985 | Corley, Jr. | B60P 1/4414 |
| | | | 187/244 |
| 4,801,235 A * | 1/1989 | Rauschdorf | B65G 47/915 |
| | | | 414/733 |
| 4,975,016 A * | 12/1990 | Pellenc | B25J 19/023 |
| | | | 414/730 |
| 5,405,237 A * | 4/1995 | Oka | B66F 9/065 |
| | | | 414/722 |
| 6,183,187 B1 * | 2/2001 | Ablabutyan | B60P 1/4414 |
| | | | 414/558 |
| 6,659,707 B2 * | 12/2003 | Jensen | B60P 1/4471 |
| | | | 414/545 |
| 8,813,600 B2 * | 8/2014 | Breu | E02F 9/166 |
| | | | 414/917 |
| 10,005,381 B2 * | 6/2018 | Peterson | B60P 1/4457 |
| 2005/0186057 A1* | 8/2005 | Reicks | B60P 1/445 |
| | | | 414/556 |
| 2009/0191037 A1 | 7/2009 | Ablabutyan et al. | |
| 2009/0226290 A1 | 9/2009 | Krause | |
| 2015/0283933 A1 | 10/2015 | Derie et al. | |
| 2016/0107559 A1 | 4/2016 | Russo et al. | |
| 2016/0325668 A1 | 11/2016 | Ablabutyan et al. | |
| 2017/0240086 A1 | 8/2017 | Ablabutyan et al. | |
| 2018/0236923 A1* | 8/2018 | Wu | B60P 1/445 |

FOREIGN PATENT DOCUMENTS

| | | | | |
|---|---|---|---|---|
| GB | 2207113 A * | 1/1989 | | B60P 1/445 |
| JP | 2007001469 A * | 1/2007 | | E02F 9/166 |
| WO | WO-9219465 A1 * | 11/1992 | | B60P 1/445 |
| WO | WO-9810953 A1 * | 3/1998 | | B60P 1/445 |

* cited by examiner

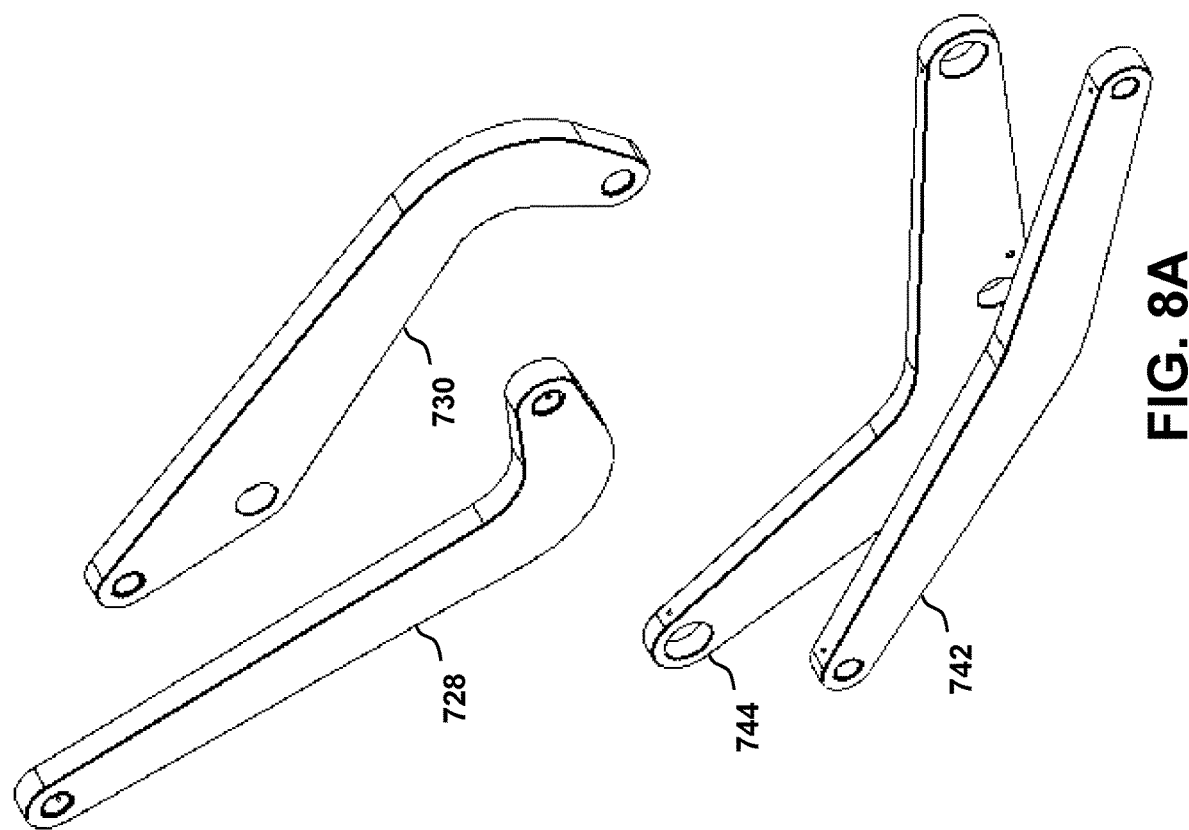

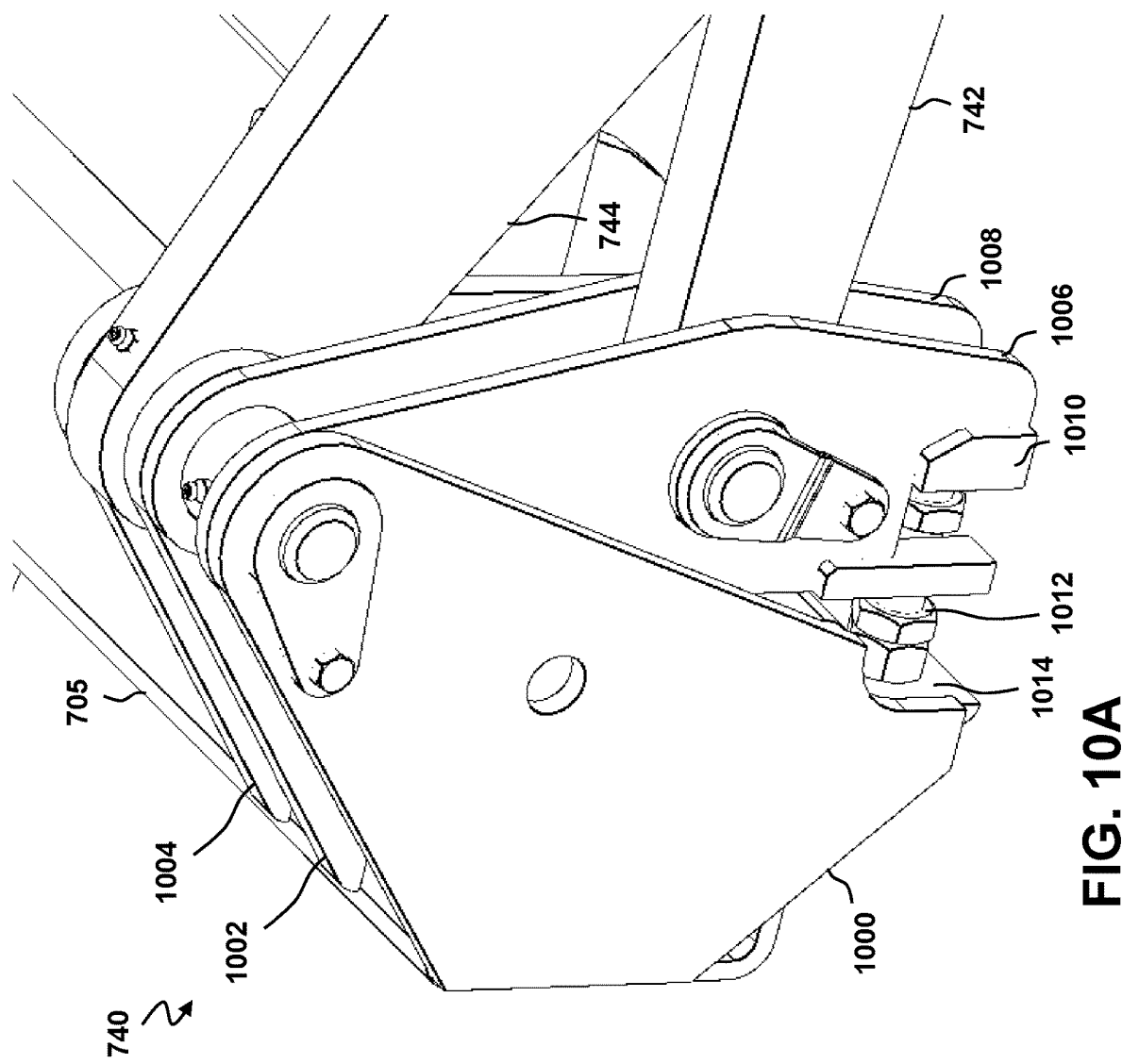

SWING ARM LIFTGATE

CROSS-REFERENCE TO RELATED APPLICATION

This application is a 35 U.S.C § 371 National State Entry of International Application No. PCT/US2019/035851, filed Jun. 6, 2019, which claims the priority benefit of U.S. Provisional Patent Application Ser. No. 62/682,032, filed Jun. 7, 2018 and U.S. Provisional Patent Application Ser. No. 62/838,553 filed Apr. 25, 2019, all of which are incorporated herein by reference in their entirety for all purposes.

FIELD OF ENDEAVOR

The invention relates to vehicle liftgates, and more particularly to stowable vehicle liftgates.

BACKGROUND

Vehicle liftgates may move in substantially linear movements from actuators, which may cause the liftgate to impinge or contact items on the back of a vehicle, such as a stowable walk ramp or fixed tow hitch. These items must be removed and/or not used if a liftgate is desired to be attached to the back of the vehicle.

SUMMARY

A system embodiment may include: a liftgate frame; a first bracket mount connected to a beam via one or more upper actuators and two or more upper linkages, the two or more upper linkages pivotally mounted between the first bracket mount and the liftgate frame, and where the first bracket mount may be configured to move from a first stowed position under the liftgate frame to a second engaged position via the one or more upper actuators and the two or more upper linkages; a second bracket mount connected to the beam; a third bracket mount connected to second bracket mount via one or more lower actuators and two or more lower linkages, the two or more lower linkages pivotally mounted between the second bracket mount and the third bracket mount; and a lift platform connected to the third bracket mount, where the lift platform may be configured to move from an up position to a down position positioned selectively relative to an external surface; where the first bracket mount moves in an arcuate path from the first stowed position under the liftgate frame to the second engaged position.

In additional system embodiments, the first bracket mount, the second bracket mount, the third bracket mount, and the lift platform may remain at a set orientation throughout the arcuate path between the first stowed position and the second engaged position. In additional system embodiments, the first bracket mount, the second bracket mount, the third bracket mount, and the lift platform may remain at a set orientation throughout the movement between the up position and the down position positioned selectively relative to the external surface.

Additional system embodiments may include a vehicle frame, where the liftgate frame may be mounted to the vehicle frame. In additional system embodiments, the lift platform may be stored under the vehicle frame in the first stowed position. In additional system embodiments, the lift platform may be positioned selectively relative to a vehicle floor of the vehicle frame when the lift platform is in the up position.

Additional system embodiments may include a vehicle accessory connected to the vehicle frame. In additional system embodiments, the vehicle accessory may be a stowable walk ramp. In additional system embodiments, the vehicle accessory may be a tow hitch. In additional system embodiments, the vehicle accessory may be a vehicle restraint, such as a dock lock. In additional system embodiments, the arcuate path of the first bracket moves around the vehicle accessory without impinging the vehicle accessory.

In additional system embodiments, a vertical height of first bracket relative to the liftgate frame in the first stowed position may be substantially equal to a vertical height of the first bracket relative to the liftgate frame in the second engaged position. In additional system embodiments, the lift platform may be a one-piece platform. In additional system embodiments, the lift platform may be a foldable platform. In additional system embodiments, at least one of the two or more upper linkages comprise an "L" shape. In additional system embodiments, each of the two or more upper linkages may be substantially straight. In additional system embodiments, each of the two or more upper linkages may be substantially parallel to each of the other two or more upper linkages. In additional system embodiments, at least one of the two or more lower linkages may comprise an "L" shape. In additional system embodiments, movement in the arcuate path from the first stowed position to the second engaged position may be via the one or more upper actuators extending. In additional system embodiments, movement in the arcuate path from the second stowed position to the first engaged position may be via the one or more upper actuators retracting.

In additional system embodiments, movement of the lift platform from the down position to the up position may be via the one or more lower actuators extending. In additional system embodiments, movement of the lift platform from the up position to the down position may be via the one or more lower actuators retracting. In additional system embodiments, the lift platform may be in a worked position during movement in the arcuate path from the first stowed position to the second engaged position. In additional system embodiments, the second bracket mount may be connected to the beam by a fastener, where rotation of the fastener adjusts a tilt of the platform relative to the liftgate frame.

Another system embodiment may include: a liftgate frame; one or more first bracket mounts connected to a beam via one or more upper actuators and two or more upper linkages, the two or more upper linkages pivotally mounted between each of the first bracket mounts and the liftgate frame, where each of the two or more upper linkages comprise an "L" shape, and where each of the first bracket mounts are configured to move from a first stowed position under the liftgate frame to a second engaged position via the one or more upper actuators and the two or more upper linkages; one or more second bracket mounts connected to the beam; one or more third bracket mounts connected to each of the one or more second bracket mounts via one or more lower actuators and two or more lower linkages, the two or more lower linkages pivotally mounted between each of the one or more second bracket mounts and each of the one or more third bracket mounts, where at least one of the two or more lower linkages comprise a slight bend proximate a middle portion, and where at least one of the two or more lower linkages comprise an "L" shape; and a lift platform connected to each of the one or more third bracket mounts, where the lift platform may be configured to move from an up position to a down position positioned selectively relative to an external surface; where the first bracket mount moves in an arcuate path from the first stowed position under the liftgate frame to the second engaged position.

In additional system embodiments, the one or more first bracket mounts, the one or more second bracket mounts, the one or more third bracket mounts, and the lift platform may remain at a set orientation throughout the arcuate path between the first stowed position and the second engaged position. In additional system embodiments, the one or more first bracket mounts, the one or more second bracket mounts, the one or more third bracket mounts, and the lift platform may remain at a set orientation throughout the movement between the up position and the down position positioned selectively relative to the external surface.

Additional system embodiments may include a vehicle frame, where the liftgate frame may be mounted to the vehicle frame. In additional system embodiments, the lift platform may be stored under the vehicle frame in the first stowed position. In additional system embodiments, the lift platform may be positioned selectively relative to a vehicle floor of the vehicle frame when the lift platform may be in the up position.

Additional system embodiments may include a vehicle accessory connected to the vehicle frame. In additional system embodiments, the vehicle accessory may be a stowable walk ramp. In additional system embodiments, the vehicle accessory may be a tow hitch. In additional system embodiments, the vehicle accessory may be a vehicle restraint, such as a dock lock. In additional system embodiments, the arcuate path of the one or more first brackets moves around the vehicle accessory without impinging the vehicle accessory.

In additional system embodiments, a vertical height of the one or more first brackets relative to the liftgate frame in the first stowed position may be substantially equal to a vertical height of the one or more first brackets relative to the liftgate frame in the second engaged position. In additional system embodiments, the lift platform may be a one-piece platform. In additional system embodiments, the lift platform may be a foldable platform. In additional system embodiments, movement in the arcuate path from the first stowed position to the second engaged position may be via the one or more upper actuators extending. In additional system embodiments, movement in the arcuate path from the second stowed position to the first engaged position may be via the one or more upper actuators retracting. In additional system embodiments, movement of the lift platform from the down position to the up position may be via the one or more lower actuators extending. In additional system embodiments, movement of the lift platform from the up position to the down position may be via the one or more lower actuators retracting. In additional system embodiments, the lift platform may be in a worked position during movement in the arcuate path from the first stowed position to the second engaged position. In additional system embodiments, the one or more second bracket mounts are connected to the beam by one or more fasteners, where rotation of the one or more fasteners adjusts a tilt of the platform relative to the liftgate frame.

Another system embodiment may include: a liftgate frame; one or more first bracket mounts connected to a beam via one or more upper actuators and two or more pairs of upper linkages, the two or more pairs of upper linkages pivotally mounted between the one or more first bracket mounts and the liftgate frame, where the two or more pairs of upper linkages are substantially straight and parallel, and where the one or more first bracket mounts are configured to move from a first stowed position under the liftgate frame to a second engaged position via the one or more upper actuators and the two or more pairs of upper linkages; one or more stops connected to the liftgate frame, where each of the one or more stops contacts at least one upper linkage of the two or more pairs of upper linkages in the second engaged position; one or more second bracket mounts connected to the beam; one or more third bracket mounts connected to each of the one or more second bracket mounts via one or more lower actuators and two or more lower linkages, the two or more lower linkages pivotally mounted between each of the one or more second bracket mounts and each of the one or more third bracket mounts, where at least one of the two or more lower linkages comprise a slight bend proximate a middle portion, and where at least one of the two or more lower linkages comprise an "L" shape; and a lift platform connected to each of the third bracket mounts, where the lift platform may be configured to move from an up position to a down position positioned selectively relative to an external surface; where the first bracket mount moves in an arcuate path from the first stowed position under the liftgate frame to the second engaged position.

Additional system embodiments may include: a vehicle frame, where the liftgate frame may be mounted to the vehicle frame; and a vehicle accessory connected to the vehicle frame; where the arcuate path of the one or more first brackets moves around the vehicle accessory without impinging the vehicle accessory.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 8A depicts a perspective view of the upper and lower linkages of the alternate swing arm assembly of FIG. 7A, according to one embodiment.

FIG. 10A depicts a perspective view of a second bracket mount attached to a beam in the alternate swing arm assembly of FIG. 7A, according to one embodiment.

DETAILED DESCRIPTION

Figure 1A:
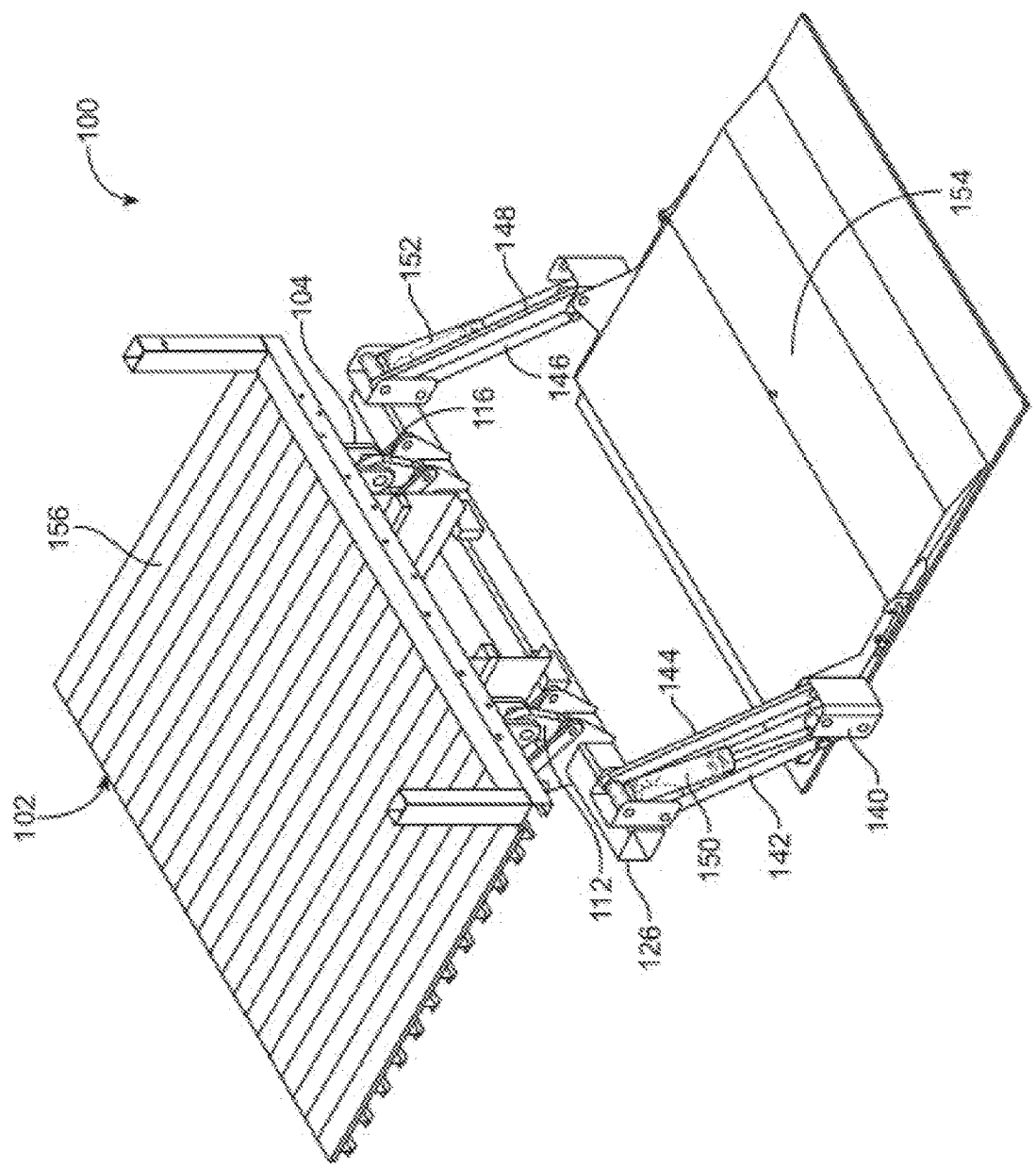
FIGS. 1A-1G depict perspective, left, right, front, rear, top, and bottom views, respectively, of a swing arm assembly on a vehicle frame, according to one embodiment.
Figure 1B:
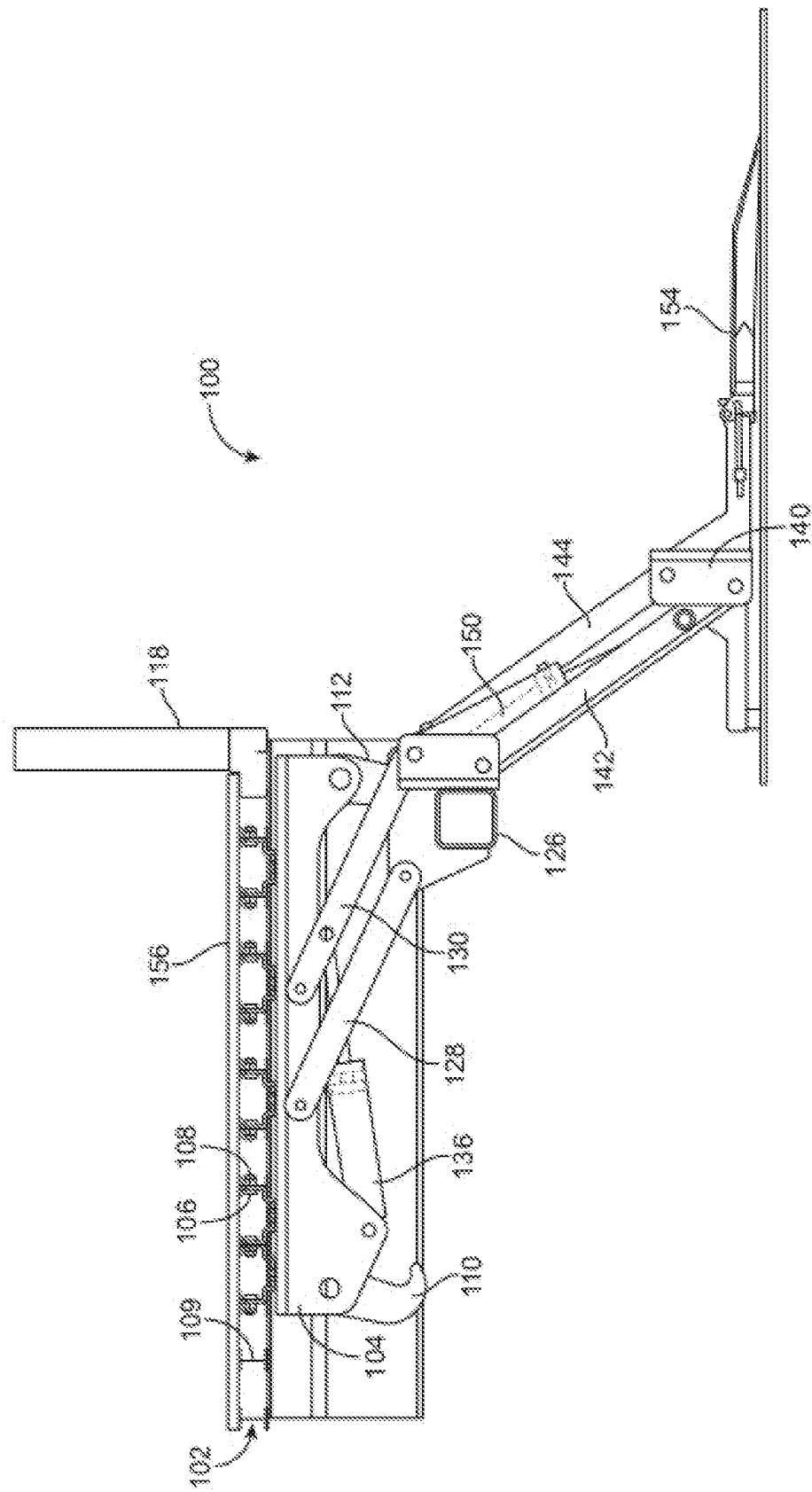
Figure 1C:
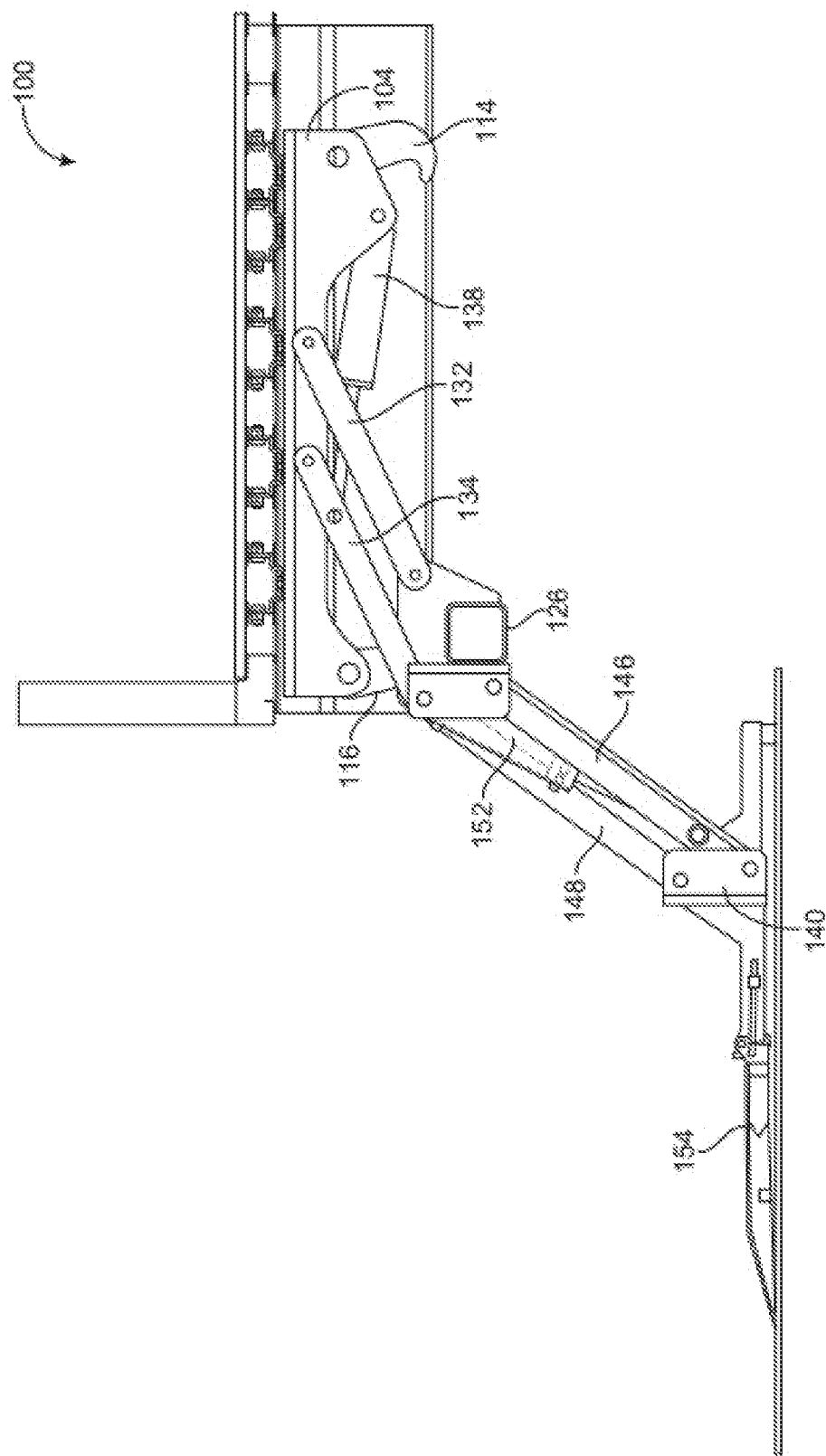
Figure 1D:
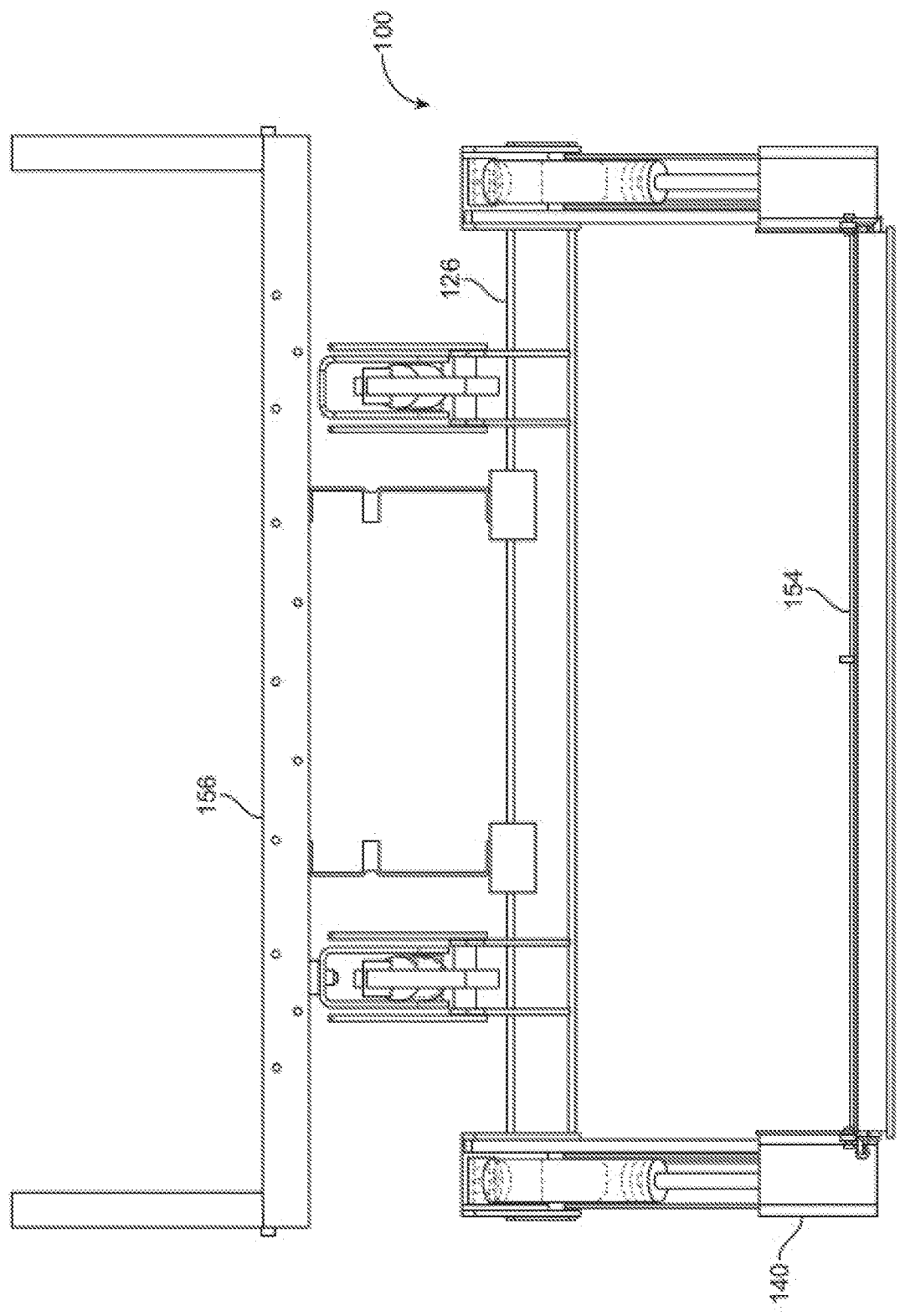
Figure 1E:
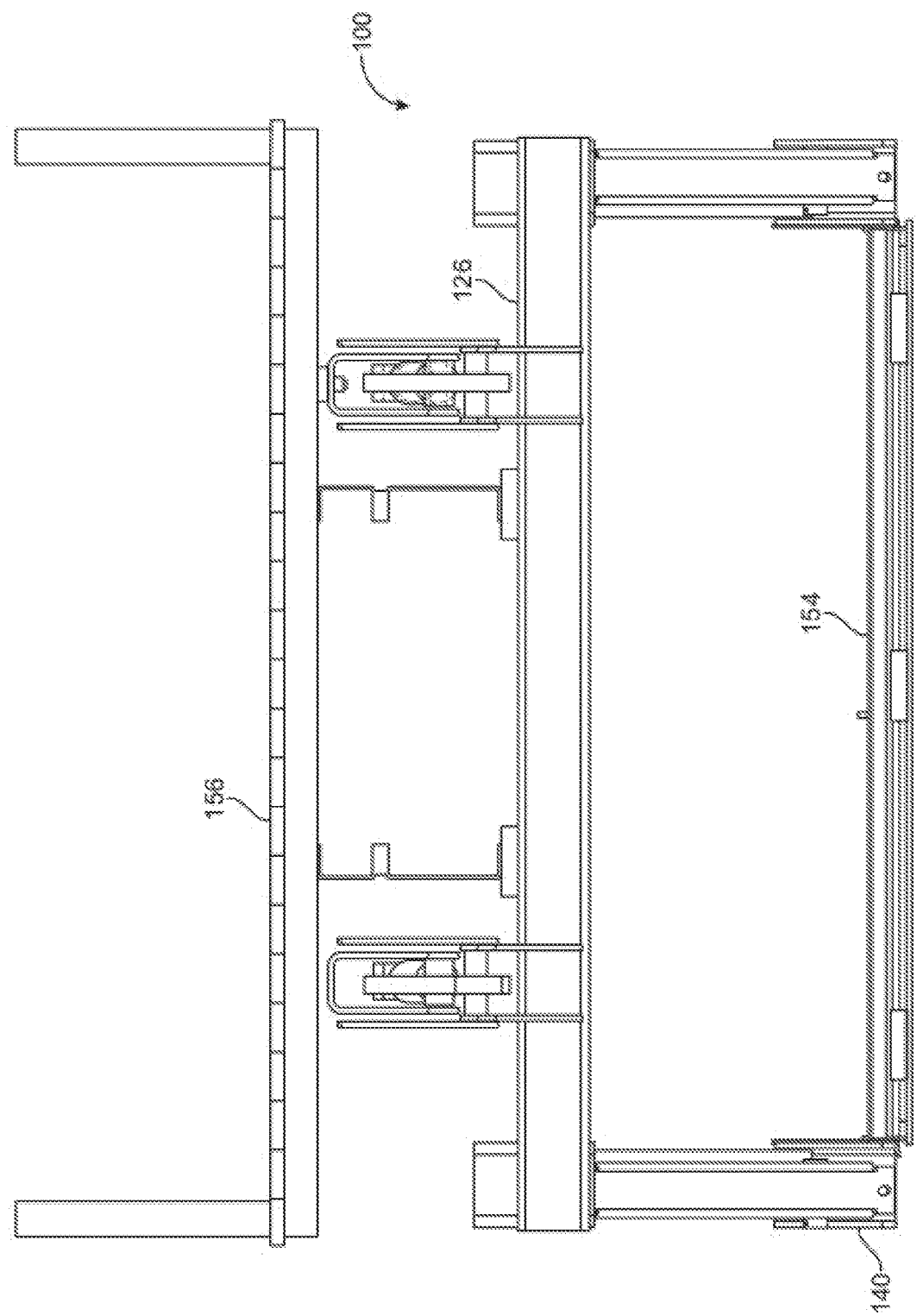
Figure 1F:
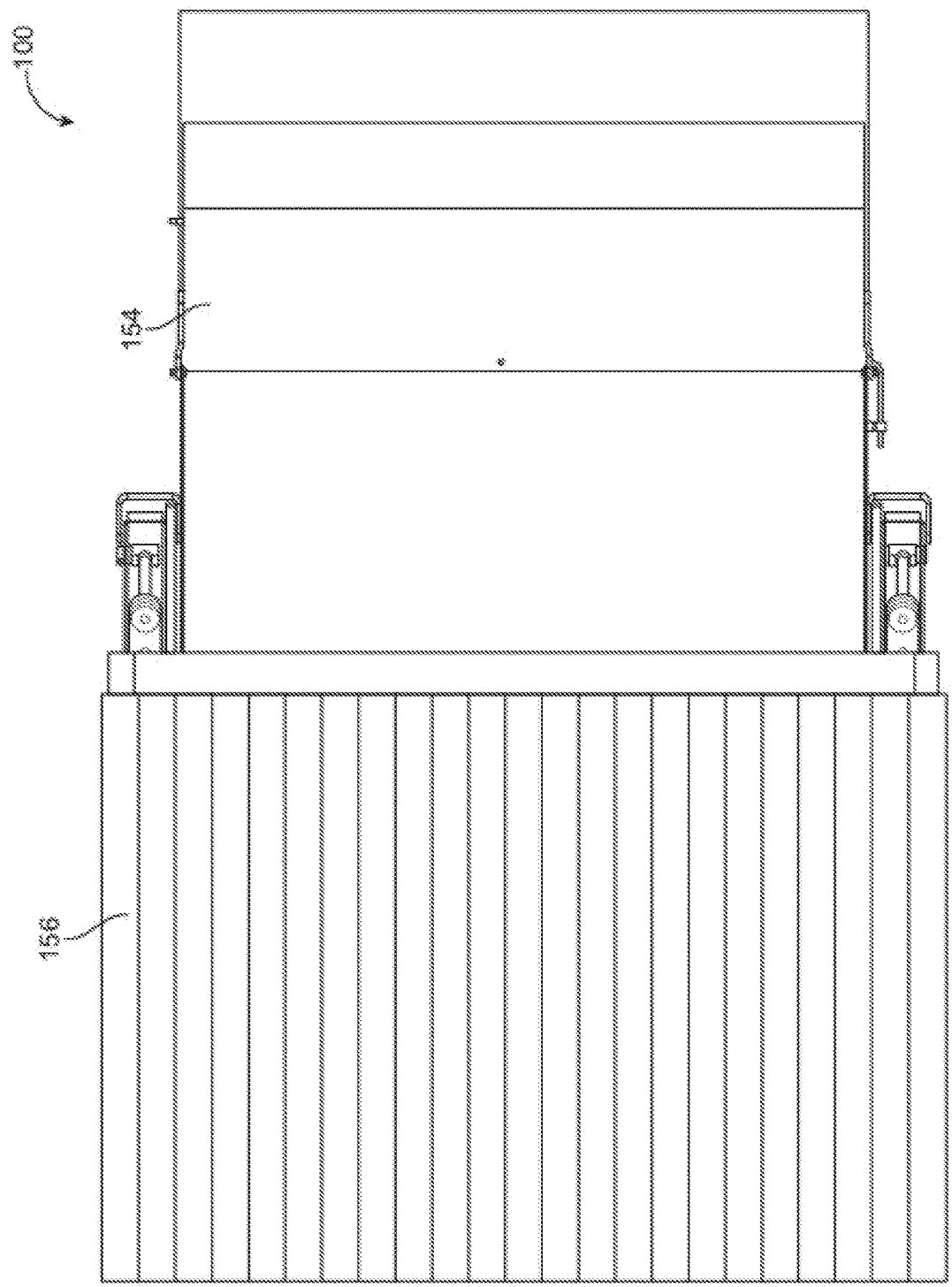
Figure 1G:
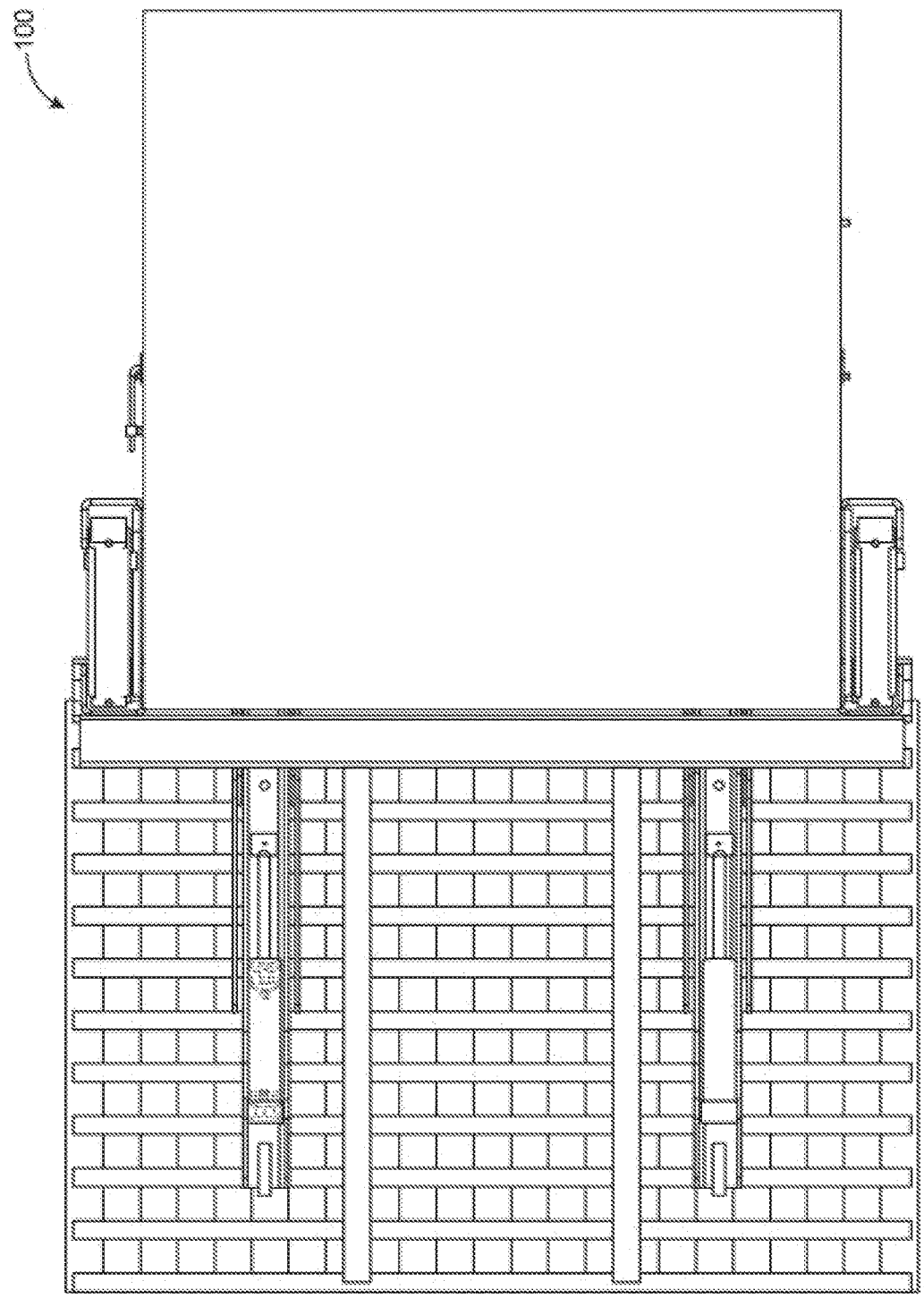

The following description is made for the purpose of illustrating the general principles of the embodiments discloses herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

A system is disclosed that includes a swing arm assembly for stowing a liftgate under a vehicle. The swinging motion of the disclosed system allows the allows the platform to be used without contacting an installed walk ramp; vehicle hitch; steps; a vehicle restraint, such as a dock lock; a vehicle restraint receiver; or the like. The lift "swings over" any such installed device without contacting the installed device. Being able to use the swing arm assembly with the installed device is not possible if the lift slides in and out in the worked position, as in other lift gates. In addition, liftgates that slide or roll have more stress on individual parts. The swinging motion of the disclosed liftgate reduces stress on individual parts, resulting in a more reliable and/or durable system. A liftgate frame may be mounted to a vehicle frame such that a platform of the liftgate is stored under the vehicle frame in a first stowed position. A first bracket may move from a first stowed position to a second engaged position via one or more upper actuators and two pairs of upper linkages pivotally mounted between the liftgate frame and the first bracket. In some embodiments, the first bracket may move from the first stowed position to the second engaged position via one or more manual movements, motors, etc.

A one-piece or foldable platform may be mounted to a second bracket. The platform may move between a first position positioned selectively relative to a vehicle floor and a second position positioned selectively relative to an external surface via a pair of lower actuators and two pairs of lower linkages pivotally mounted between the first bracket and the second bracket. In some embodiments, the platform may move between the first position and the second position via one or more manual movements, motors, etc. The platform may ramp up or ramp down towards the vehicle floor or the external surface. The slant of the platform may be adjusted manually or via one or more motors or actuators. The first position may be substantially aligned with a vehicle floor. The second position may be substantially aligned with the external surface, such as the ground.

One or more engagement mechanisms, such as one or more rotating or sliding latches, may be used to secure the first bracket in the first stowed position or the second engaged position via one or more posts on the first bracket. The first bracket, second bracket, and platform may remain at a set orientation, such as substantially parallel or slanted a set amount, during movement between the first stowed position and the second engaged position, and between the first position positioned selectively relative to a vehicle floor and the second position positioned selectively relative to an external surface. The platform may also be slanted to ramp up or ramp down relative to the first bracket or second bracket. The slant of the platform may be adjusted via a user. The slant of the platform may also be adjusted via hydraulics, a motor, etc., such as by a user selecting a switch to adjust the slant of the platform. In some embodiments, the geometry of the liftgate arm mechanism may make it possible to make the platform change angle with respect to earth as the platform moves up or down, by changing the distance between the pins of the shackle (second bracket 140).

FIGS. 1A-1G depict perspective, left, right, front, rear, top, and bottom views, respectively, of an exemplary swing arm assembly 100 on a vehicle frame 102. The swing arm assembly 100 may include a liftgate frame 104 attached to the vehicle frame 102, such as by a plurality of nuts 106 and bolts 108 that attach the liftgate frame 104 to a plurality of vehicle I-beams 109. The liftgate frame 104 may also be attached to the vehicle frame 102 by welding the liftgate frame 104 to an underside of the vehicle. In some embodiments, the liftgate frame 104 may be secured to the vehicle by a combination of nuts 106, bolts 108, and welding. A first storage engagement mechanism 110, a first deployment engagement mechanism 112, a second storage engagement mechanism 114, and a second deployment engagement mechanism 116 may be rotatably and/or slidably mounted to the liftgate frame 104.

The first storage engagement mechanism 110 and second storage engagement mechanism 114 may be disposed distal from a vehicle opening 118 and used to secure a first bracket 126 in a stowed first position under the vehicle frame 102. The first deployment engagement mechanism 112 and the second deployment engagement mechanism 116 may be disposed proximate the vehicle opening 118 and used to secure the first bracket 126 in an engaged second position.

The first storage engagement mechanism 110 and first deployment engagement mechanism 112 may be disposed proximate a first side of the swing arm assembly 100. The second storage engagement mechanism 114 and second deployment engagement mechanism 116 may be disposed proximate a second opposite side of the swing arm assembly 100. The first side and second opposite side of the swing arm assembly 100 may be identical. In some embodiments, the swing arm assembly 100 may contain one or more storage engagement mechanisms (110, 114) and/or one or more deployment engagement mechanisms (112, 116). Only one side may contain the engagement mechanisms in some embodiments. The engagement mechanisms may be manually engaged or disengaged, such as by a user rotating or sliding the engagement mechanisms via a handle. The engagement mechanisms may also be automated to move via a controller, actuator, and push-button interface.

The liftgate frame 104 may be attached to the first bracket 126 via two or more pairs of upper linkages, such as a first upper linkage 128, a second upper linkage 130, a third upper linkage 132, and a fourth upper linkage 134. The first upper linkage 128 and second upper linkage 130 may be disposed proximate a first side of the swing arm assembly 100. The third upper linkage 132 and fourth upper linkage 134 may be disposed proximate a second opposite side of the swing arm assembly 100. One or more upper actuators, such as a first upper actuator 136 and a second upper actuator 138 may be used to move the first bracket 126 from a stowed first position under the vehicle frame 102 to an engaged second position proximate the vehicle opening 118.

The first bracket 126 may be attached to a second bracket 140 via a first lower linkage 142, a second lower linkage 144, a third lower linkage 146, and a fourth lower linkage 148. The first lower linkage 142 and second lower linkage 144 may be disposed proximate the first side of the swing arm assembly 100. The third lower linkage 146 and fourth lower linkage 148 may be disposed proximate a second opposite side of the swing arm assembly 100. A first lower actuator 150 and a second lower actuator 152 may be used to move the second bracket 140 attached to a platform 154 from a first position positioned selectively relative to a vehicle floor 156, to a second position for stowing, to a third position positioned selectively relative to an external surface, such as the ground.

The first bracket 126 may be connected to the second bracket 140. The first bracket may operate to move from the first position positioned selectively relative to a vehicle floor 156, to a second position for stowing, to a third position positioned selectively relative to an external surface, such as the ground. The movement of the first bracket 126 may be via an actuator, a motor, a manual movement, or the like.

Figure 2:
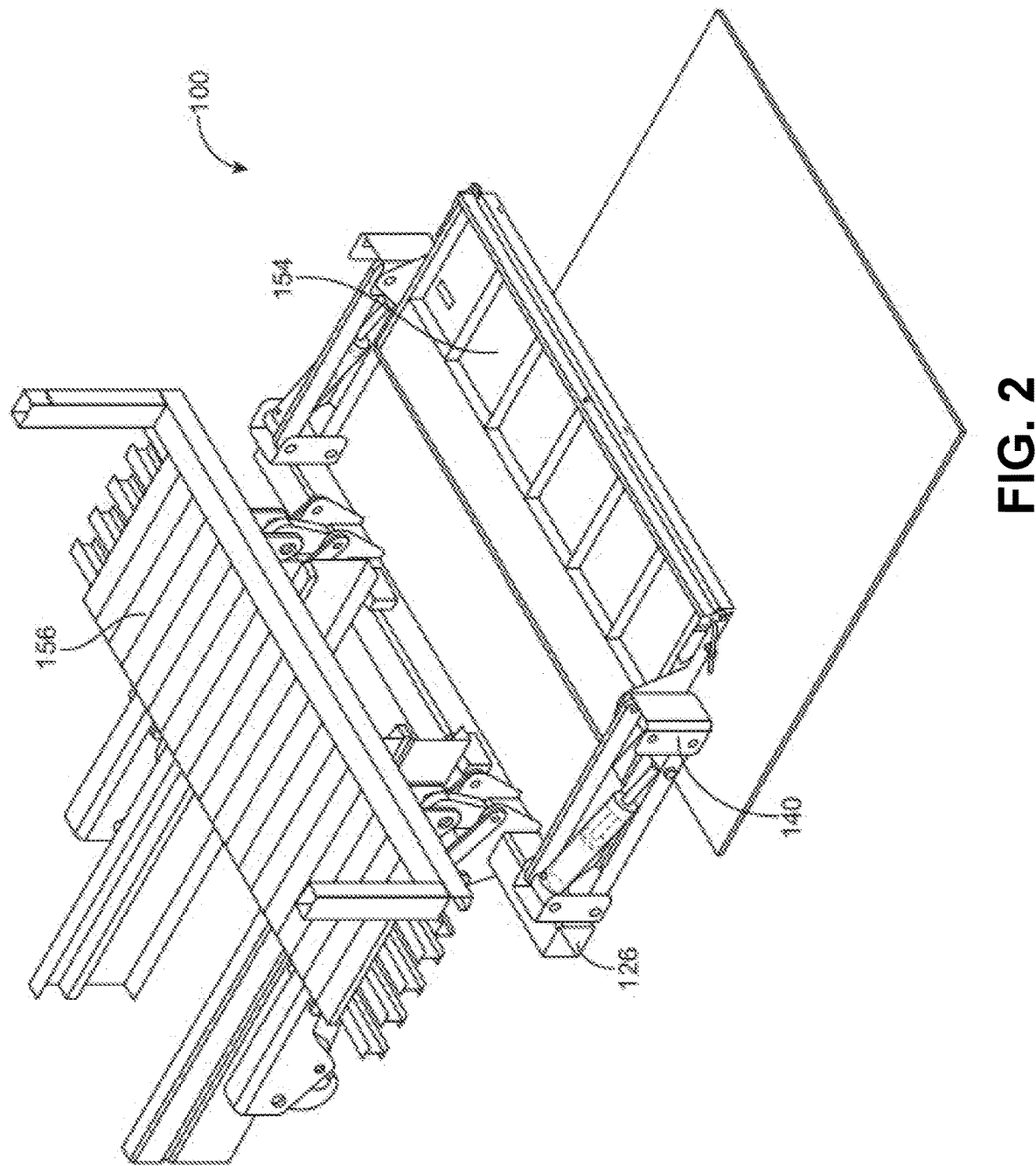
FIG. 2 depicts a perspective view of the swing arm assembly of FIGS. 1A-1G with the platform in a folded position, according to one embodiment.

FIG. 2 depicts a perspective view of the exemplary swing arm assembly 100 of FIGS. 1A-1G with the platform 154 in a folded position. In some embodiments, the platform 154 may be folded or partially folded when the swing arm assembly is in a stowed position. In other embodiments, the platform 154 may be a one-piece platform.

Figure 3A:
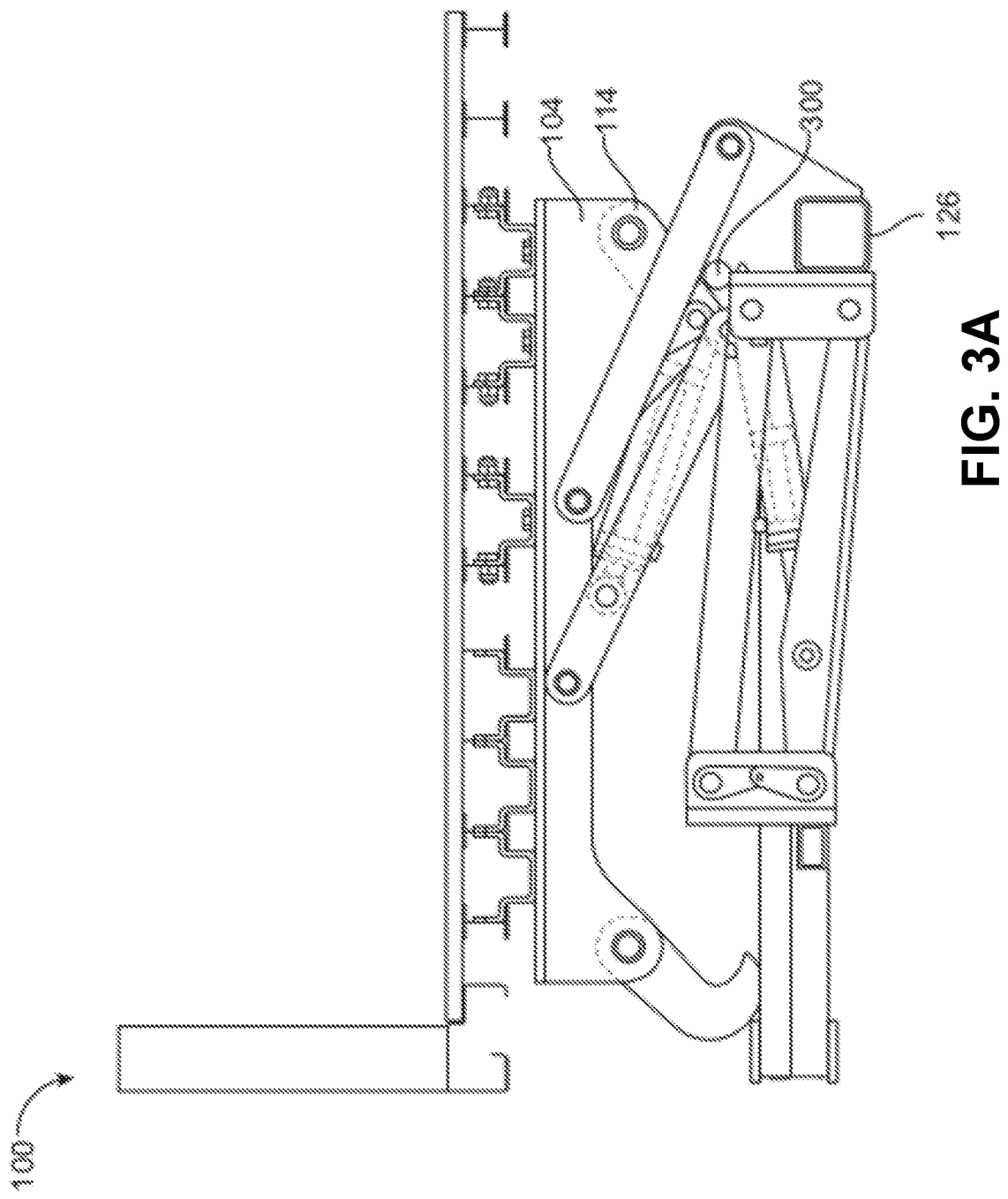
FIGS. 3A-3E depict side views of the swing arm assembly of FIGS. 1A-1G unlatching, extending, and latching, according to one embodiment.
Figure 3B:
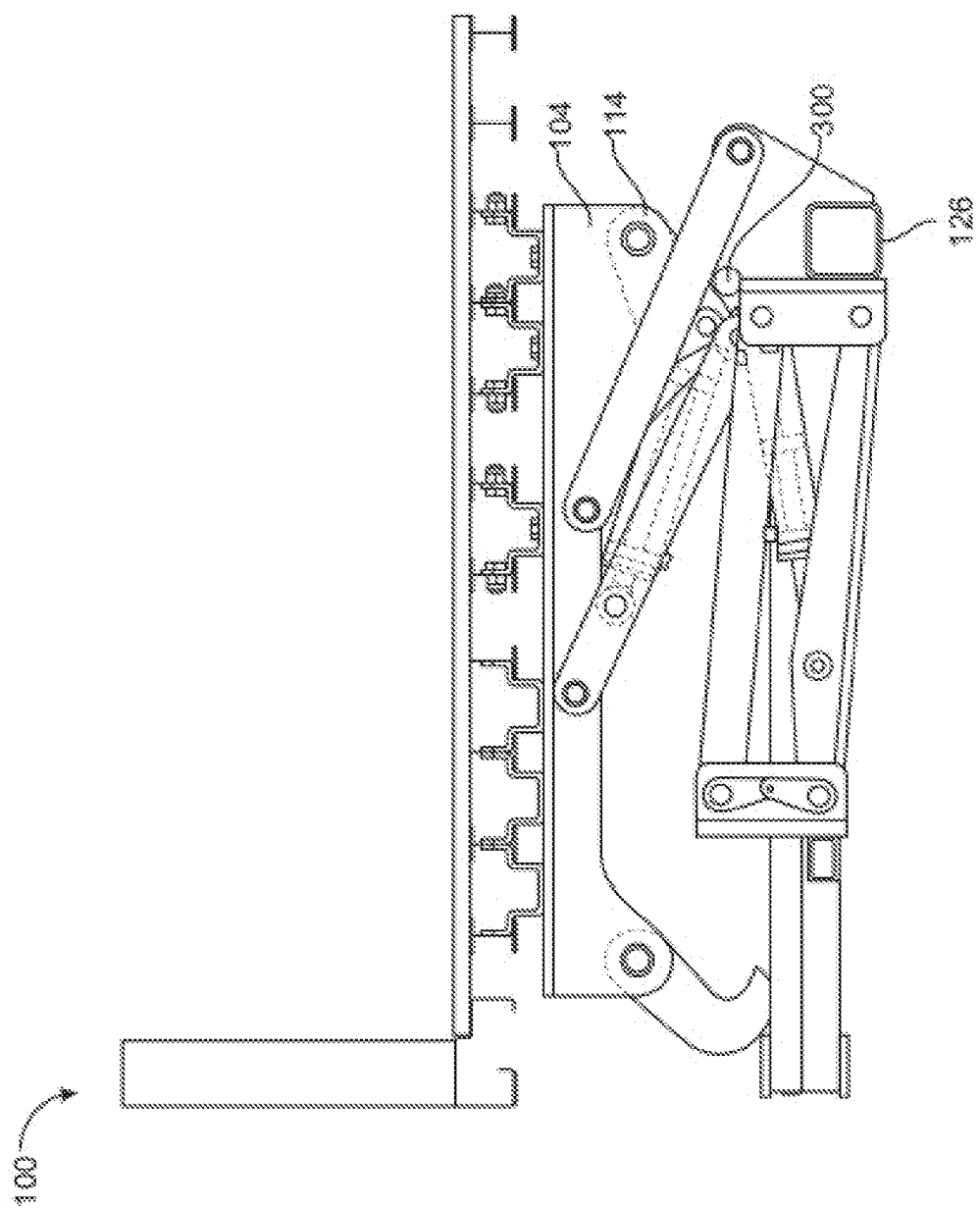
Figure 3C:
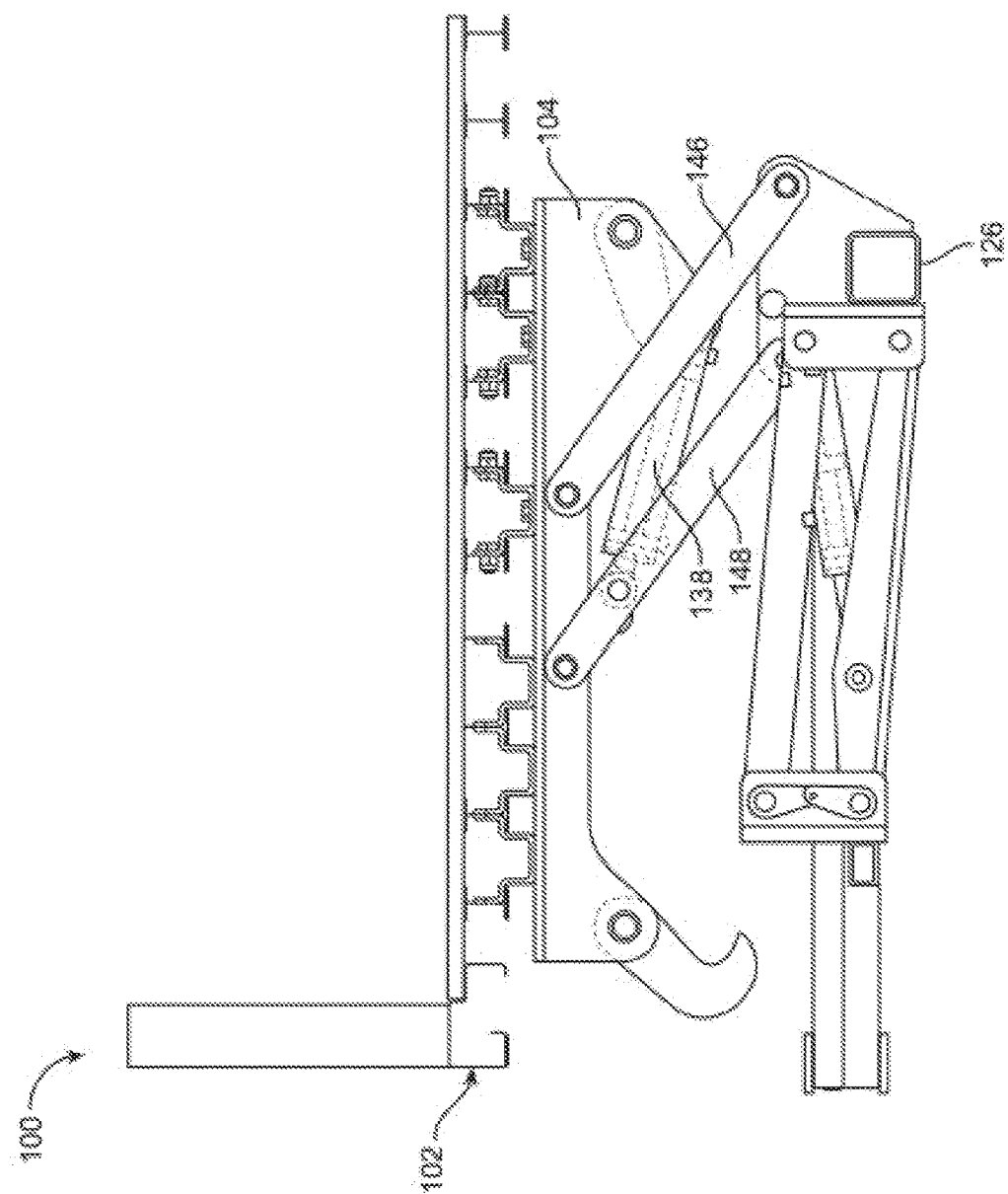
Figure 3D:
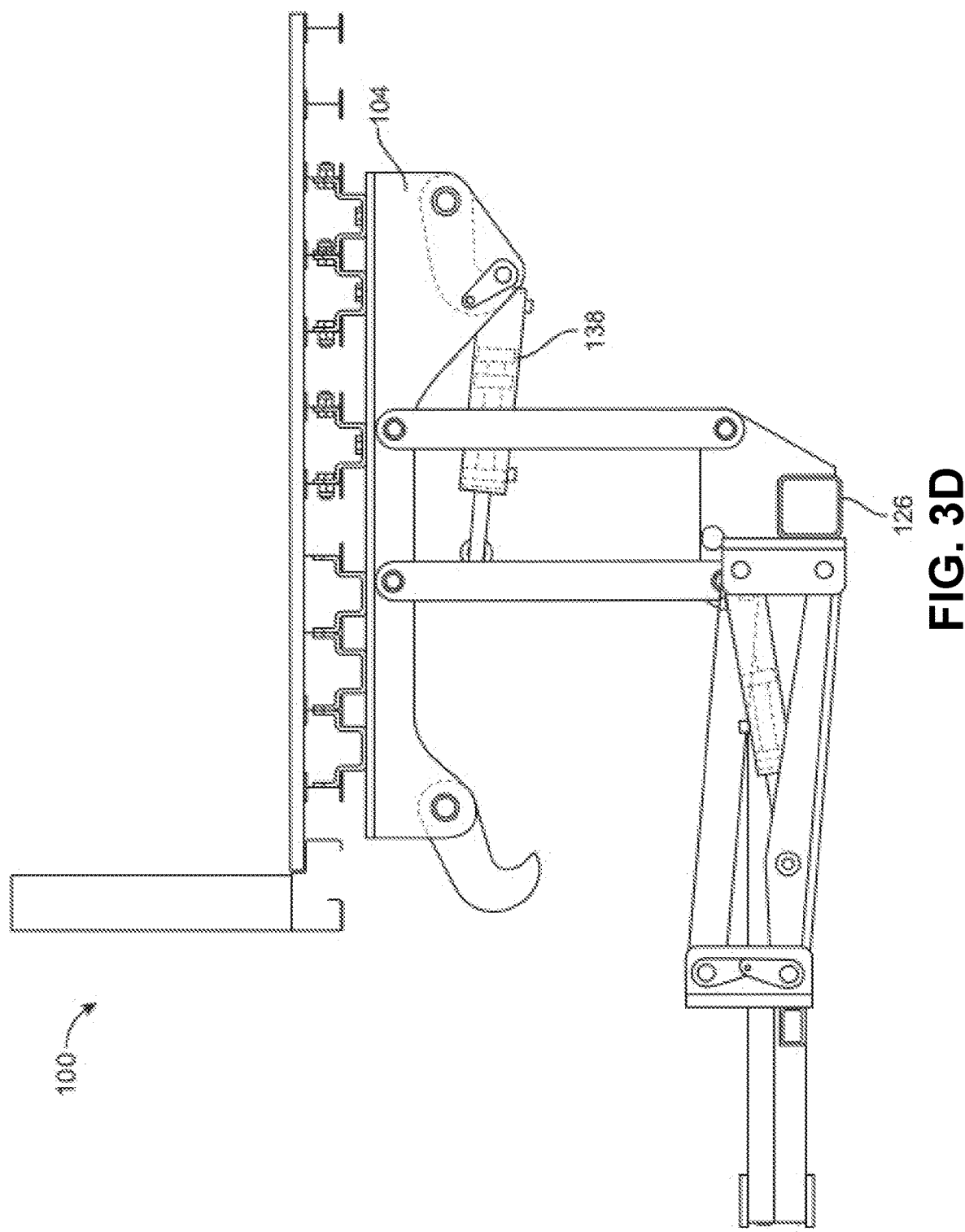
Figure 3E:
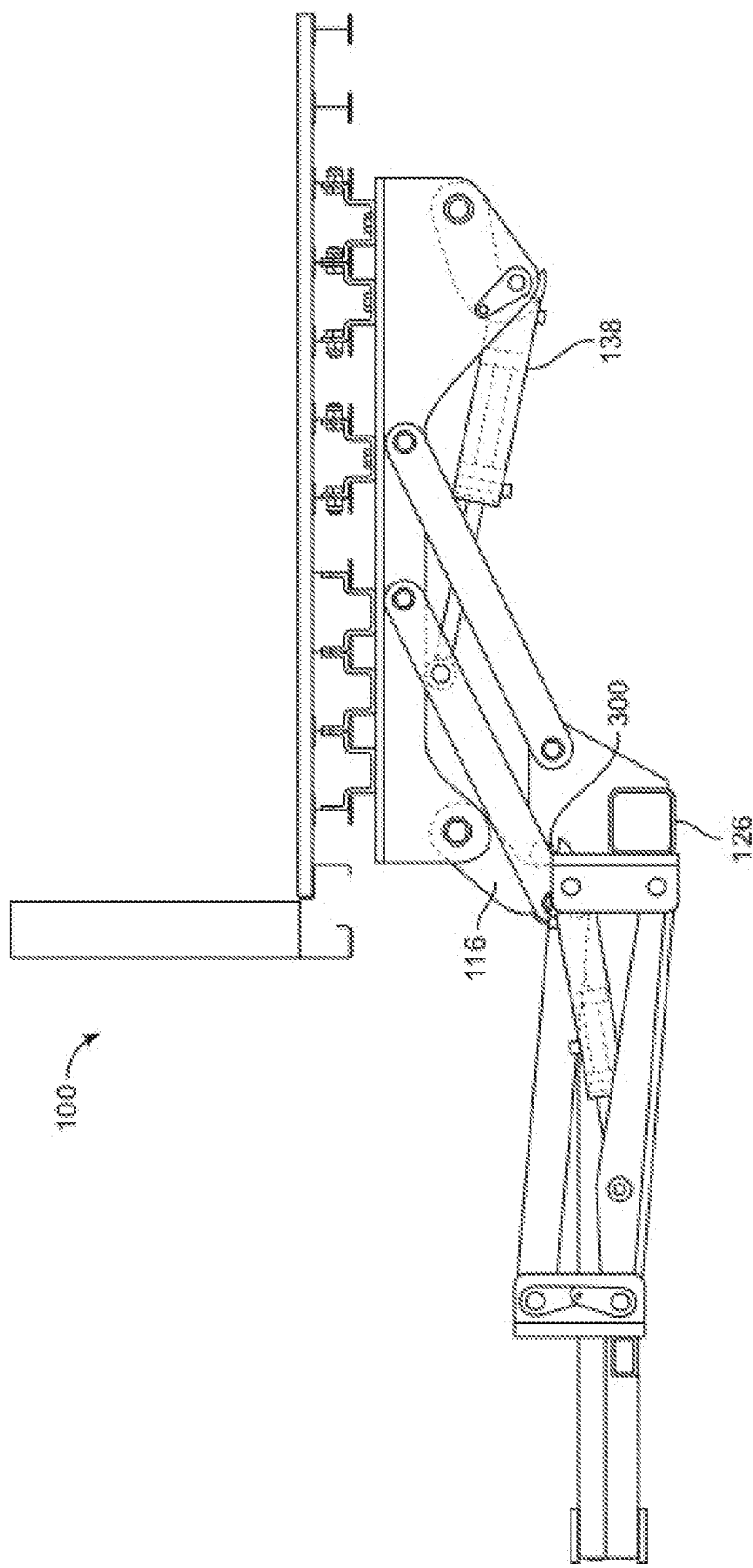

FIGS. 3A-3E depict side views of the exemplary swing arm assembly 100 of FIGS. 1A-1G unlatching, extending, and latching. The right side is depicted in FIGS. 3A-3E, but identical actions may occur on the left side. FIG. 3A depicts a secured first stowed position as the second storage engagement mechanism 114 is secured about post 300. FIG. 3B depicts an unsecured first stowed position as the second storage engagement mechanism 114 is removed from post 300. FIG. 3C depicts an unsecured third interim position as the first bracket 126 is distanced from the liftgate frame 104. FIG. 3D depicts an unsecured fourth interim position as the first bracket reaches a maximum distance from the liftgate frame when linkages are in a completely vertical orientation. FIG. 3E depicts a second secured engaged position as the second deployment engagement mechanism 116 is secured about the post 300.

The second storage engagement mechanism 114 may be rotated relative to the liftgate frame 104 apart from a post 300 on the first bracket 126, as shown in FIGS. 3A-3B. In some embodiments, the engagement mechanism may be slid, e.g., to engage a notch. The engagement mechanism may also be manual, e.g., controlled by a user movement of a handle or other device, or automatic, e.g., via a controller and actuator or motor. The second upper actuator 138 may then extend causing the first bracket 126 to move away from the vehicle frame 102 via pivoting movement of the third upper linkage 146 and fourth upper linkage 148, as shown in FIG. 3C. The first bracket 126 may remain substantially level relative to the vehicle floor during this pivoting movement. In some embodiments, the first bracket 126 may be angled a set amount relative to the vehicle floor. The second upper actuator 138 may continue to extend until the first bracket 126 is at a maximum vertical distance from the liftgate frame 104, as shown in FIG. 3D. The second upper actuator 138 reaches an extended position, as shown in FIG. 3E. The post 300 of the first bracket 126 is secured by the second deployment engagement mechanism 116.

Figure 4A:
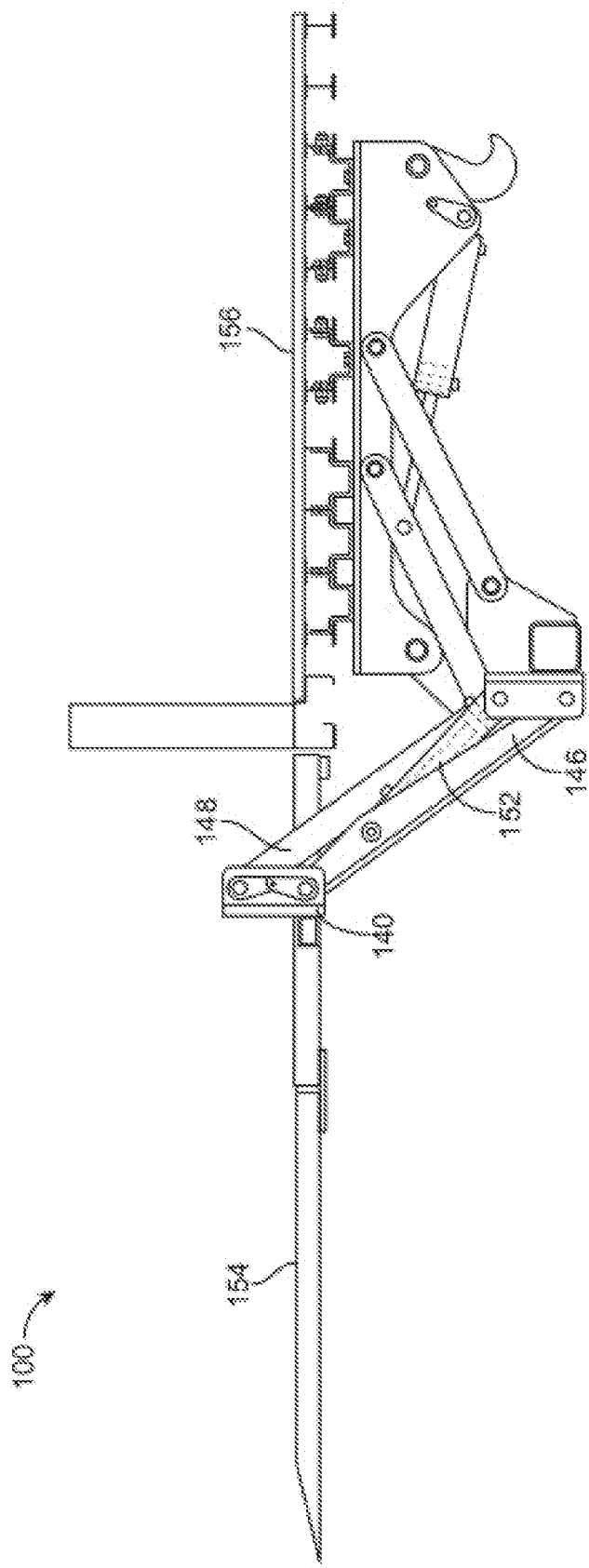
FIGS. 4A-4C depict side views of the swing arm assembly of FIGS. 1A-1G moving the platform from a first position positioned selectively relative to a vehicle floor, to a second position, to a third position positioned selectively relative to an external surface, according to one embodiment.
Figure 4B:
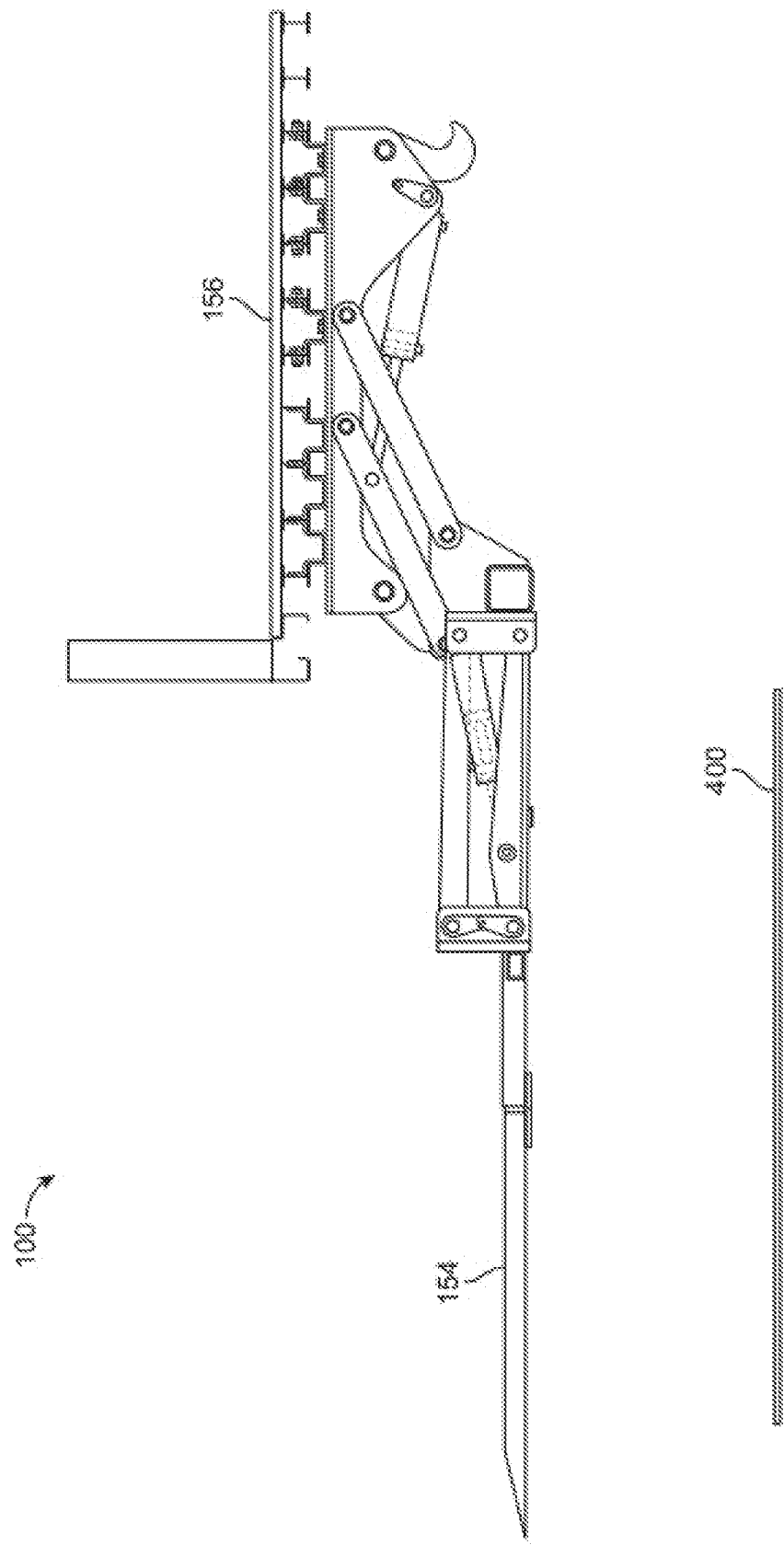
Figure 4C:
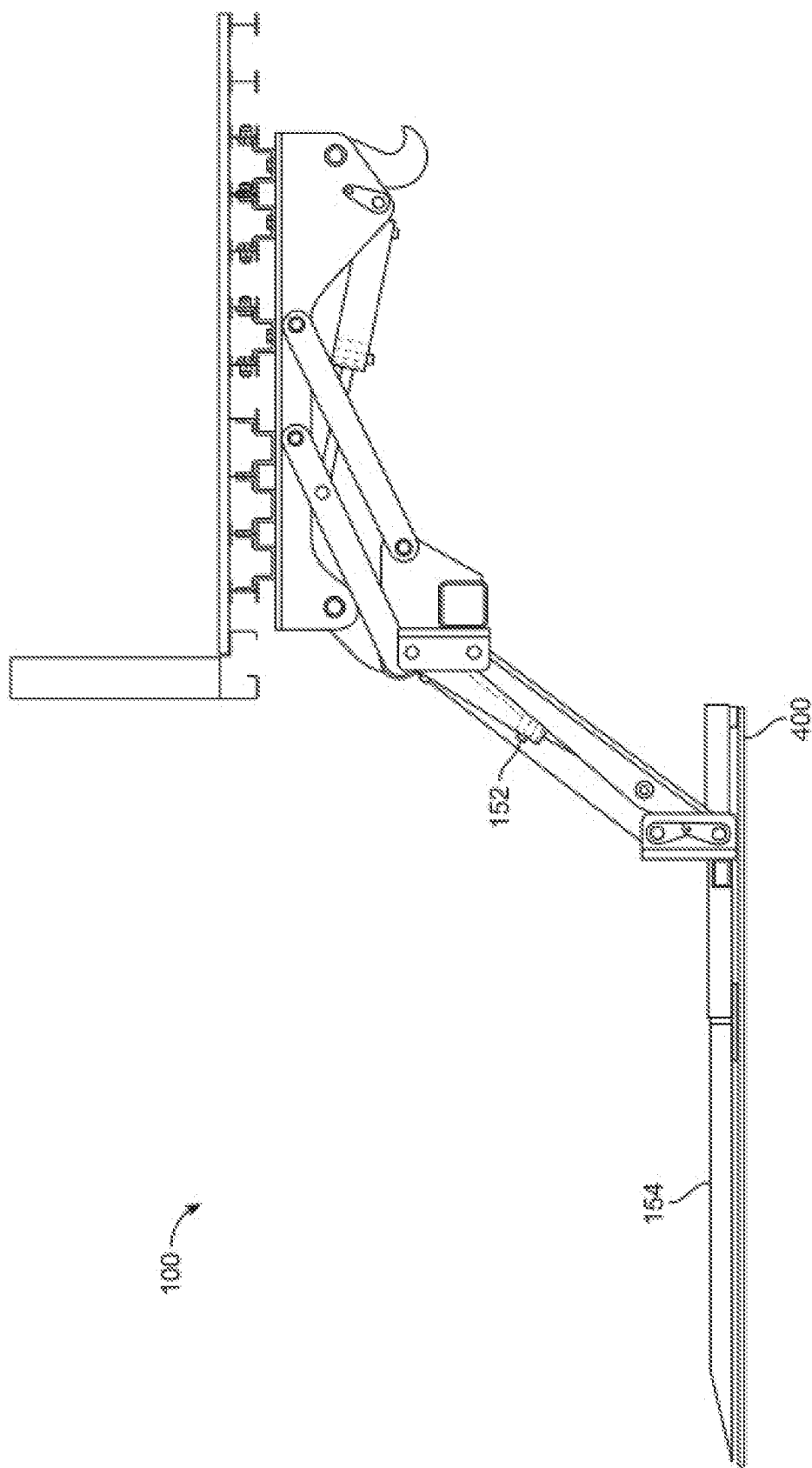

FIGS. 4A-4C depict side views of the exemplary swing arm assembly 100 of FIGS. 1A-1G moving the platform 154 from a first position positioned selectively relative to a vehicle floor 156, to a second position, to a third position positioned selectively relative to an external surface. In the first position shown in FIG. 4A, the platform 154 is raised to be positioned selectively relative to the vehicle floor 156 to allow for the transfer of items in the vehicle onto the platform 154 or vice versa. The platform 154 may be substantially aligned with the vehicle floor 156, higher than the vehicle floor 156, or lower than the vehicle floor 156. The platform 154 may be substantially parallel to the vehicle floor 156 or slanted relative to the vehicle floor 156. The amount of slant in the platform 154 may be set, adjustable manually by a user, or adjustable automatically via a controller and actuator or motor, or by geometry. The second lower actuator 152 may retract to move the second bracket 140 to a maximum vertical height that may be above, below, or substantially aligned with the vehicle floor 156 via the third lower linkage 146 and the fourth lower linkage 148. The platform 154 and second bracket 140 may remain substantially level relative to the vehicle floor 156 and/or the ground during movement. The platform 154 may ramp down or ramp up relative to its vertical height.

In the second position shown in FIG. 4B between the first position and the third position, the platform 154 is positioned vertically between the vehicle floor 156 and the ground 400. The platform 154 may be folded and stowed in the second position, as shown in FIGS. 5A-5E. The platform 154 may remain substantially level relative to the vehicle floor 156 and/or ground in the second position. The platform 154 may also be slanted relative to the vehicle floor 156 and/or ground in the second position. The amount of slant in the platform 154 may be set, adjustable manually by a user, or adjustable automatically via a controller and actuator or motor. Or by geometry.

In the third position shown in FIG. 4C, the platform 154 is positioned selectively relative to an external surface, such as the ground 400. The second lower actuator 152 extends to move the second bracket 140 to a position relative to the ground 400 via the third lower linkage 146 and the fourth lower linkage 148.

Figure 5A:
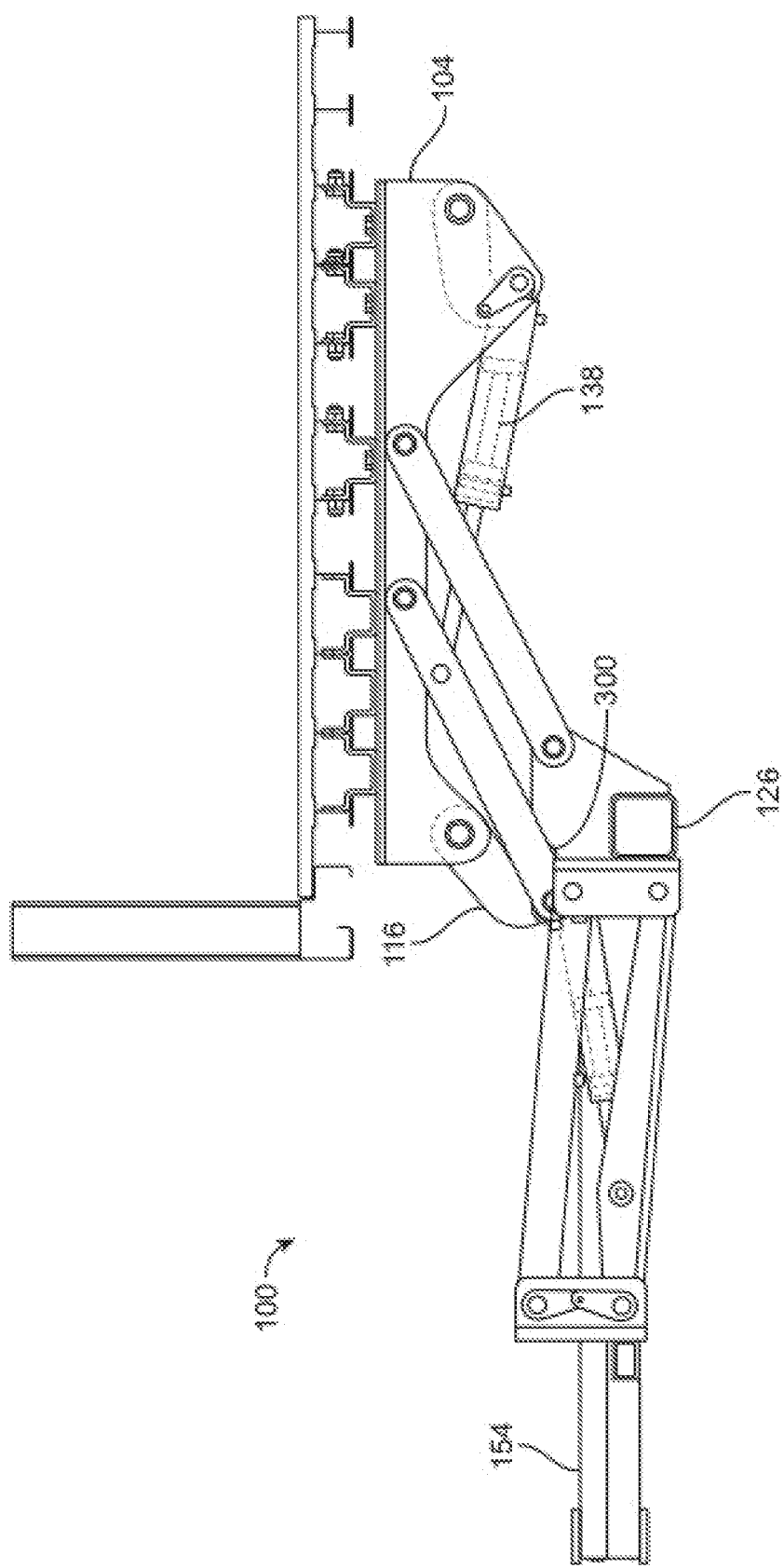
FIGS. 5A-5E depict side views of the swing arm assembly of FIGS. 1A-1G unlatching, stowing, and latching, according to one embodiment.
Figure 5B:
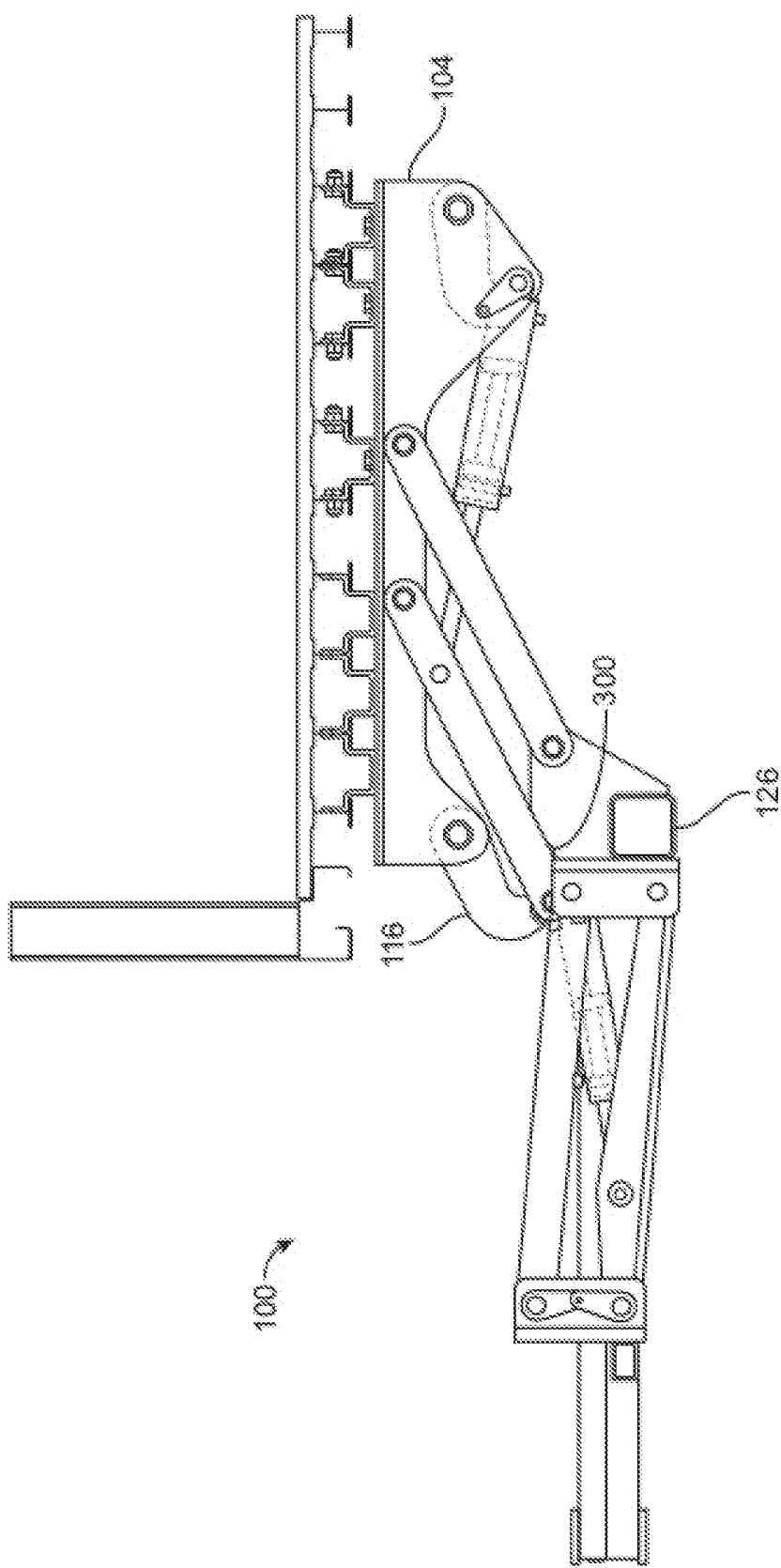
Figure 5C:
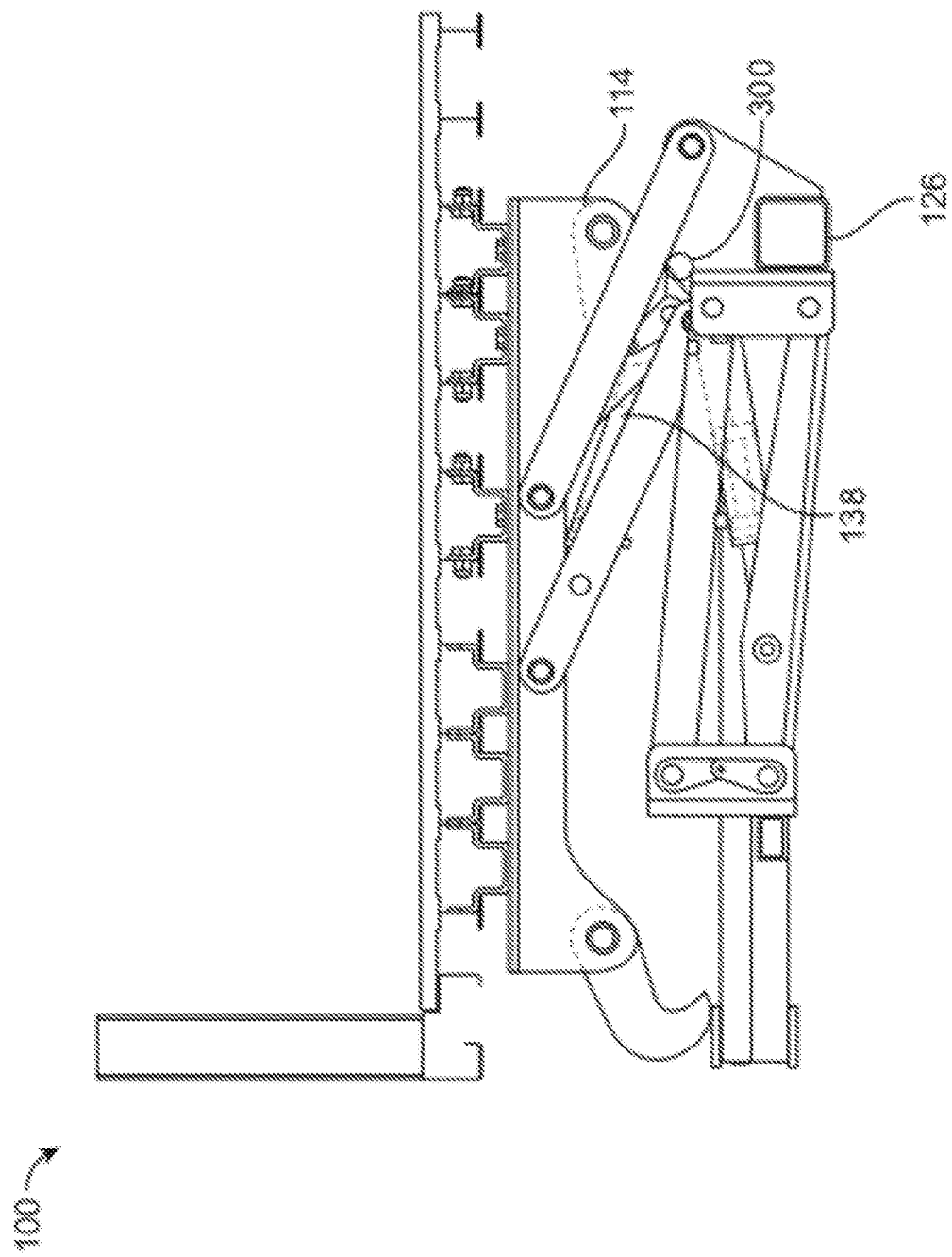
Figure 5D:
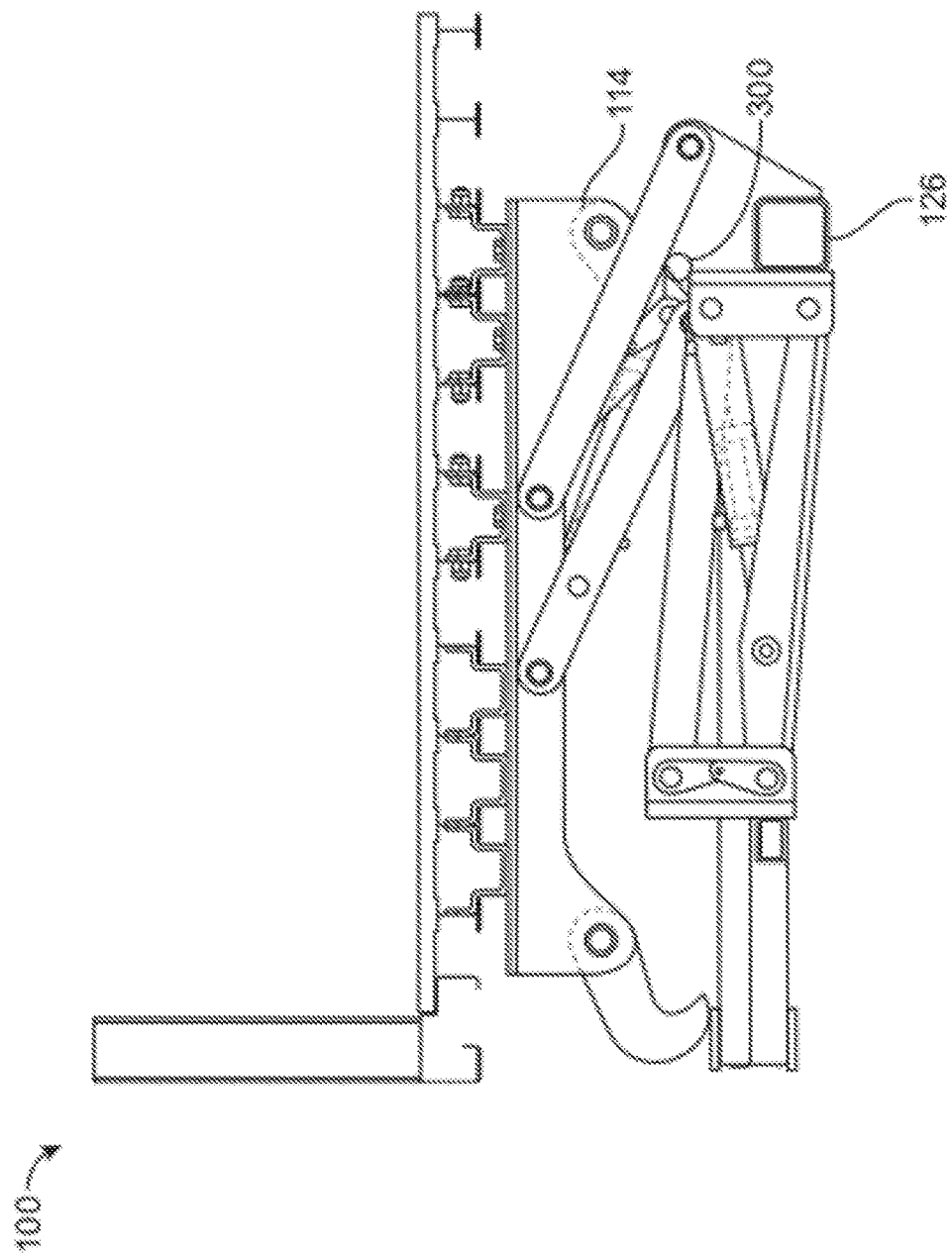
Figure 5E:
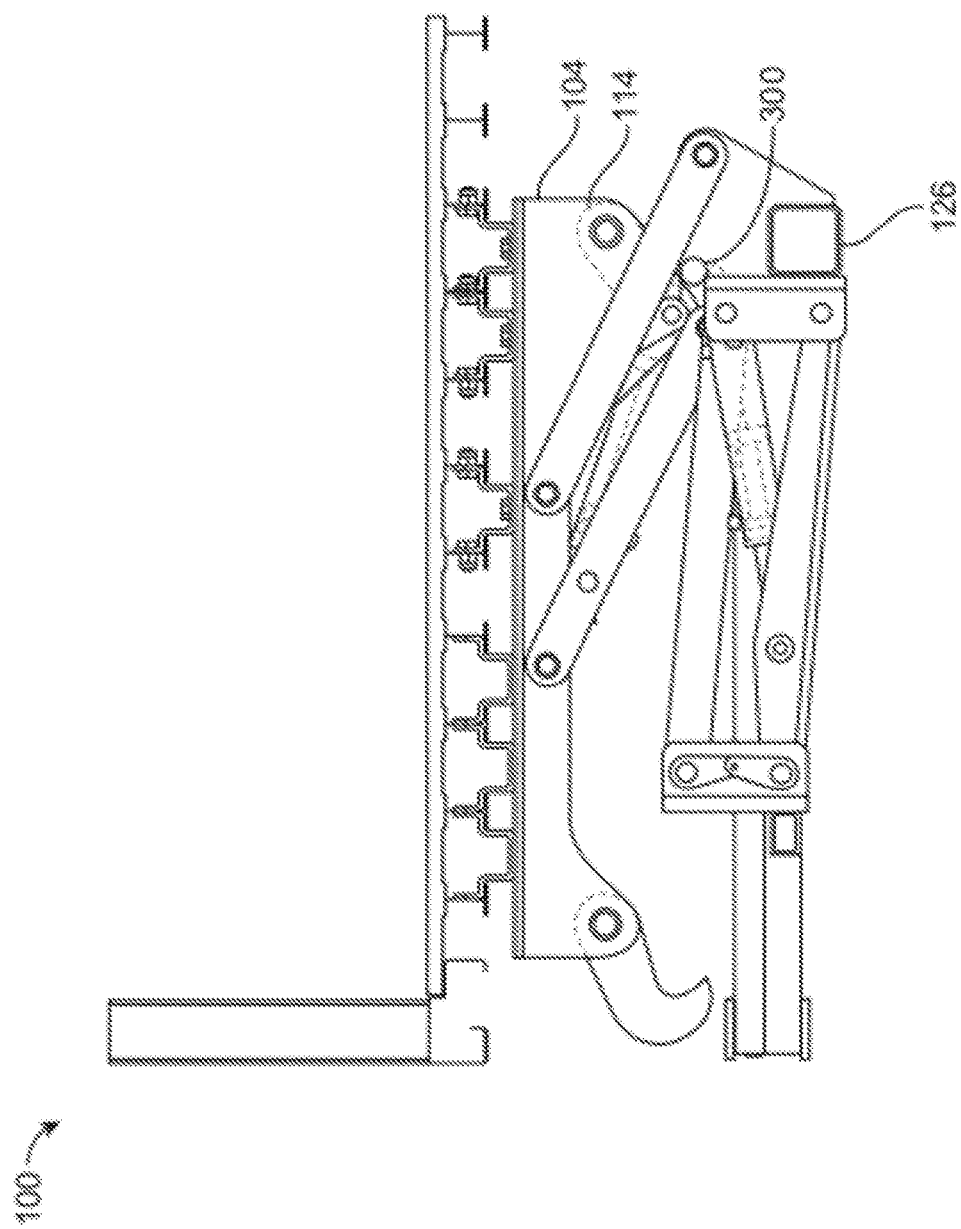

FIGS. 5A-5E depict side views of the exemplary swing arm assembly of FIGS. 1A-1G unlatching, stowing, and latching. FIG. 5A depicts a second secured engaged position as the second deployment engagement mechanism 116 is secured about the post 300. FIG. 5B depicts a second unsecured engaged position as the second deployment engagement mechanism 116 is removed from the post 300. FIG. 5C depicts an unsecured first stowed position as the second storage engagement mechanism 114 is not yet secured to post 300. FIG. 5D depicts a secured first stowed position as the second storage engagement mechanism 114 is secured about post 300. FIG. 5E depicts the secured first stowed position as the first bracket 126 is moved apart from the liftgate frame 104 to secure the second storage engagement mechanism 114 against the post 300.

The liftgate 100 may be folded when not in use. The second deployment engagement mechanism 116 may secure post 300 on first bracket 126 to ensure that the liftgate stays in the deployed position. The second deployment engagement mechanism 116 may be rotated, or slid, relative to the liftgate frame 104, and away from the post 300, as shown in FIG. 5B. While the second deployment engagement mechanism 116 is depicted as a rotating latch, it may also be a sliding mechanism such as a mechanism with a handle that is slid into an opening to engage or disengage the post 300. The second upper actuator 138 may then retract to move the first bracket 126 to a stowed position under the vehicle frame 102. The second storage engagement mechanism 114 may then rotate relative to the liftgate frame 104, as shown in FIG. 5D, to secure around post 300, as shown in FIG. 5E. The second storage engagement mechanism 114 may ensure that the liftgate does not fall during travel of the vehicle.

Figure 6A:
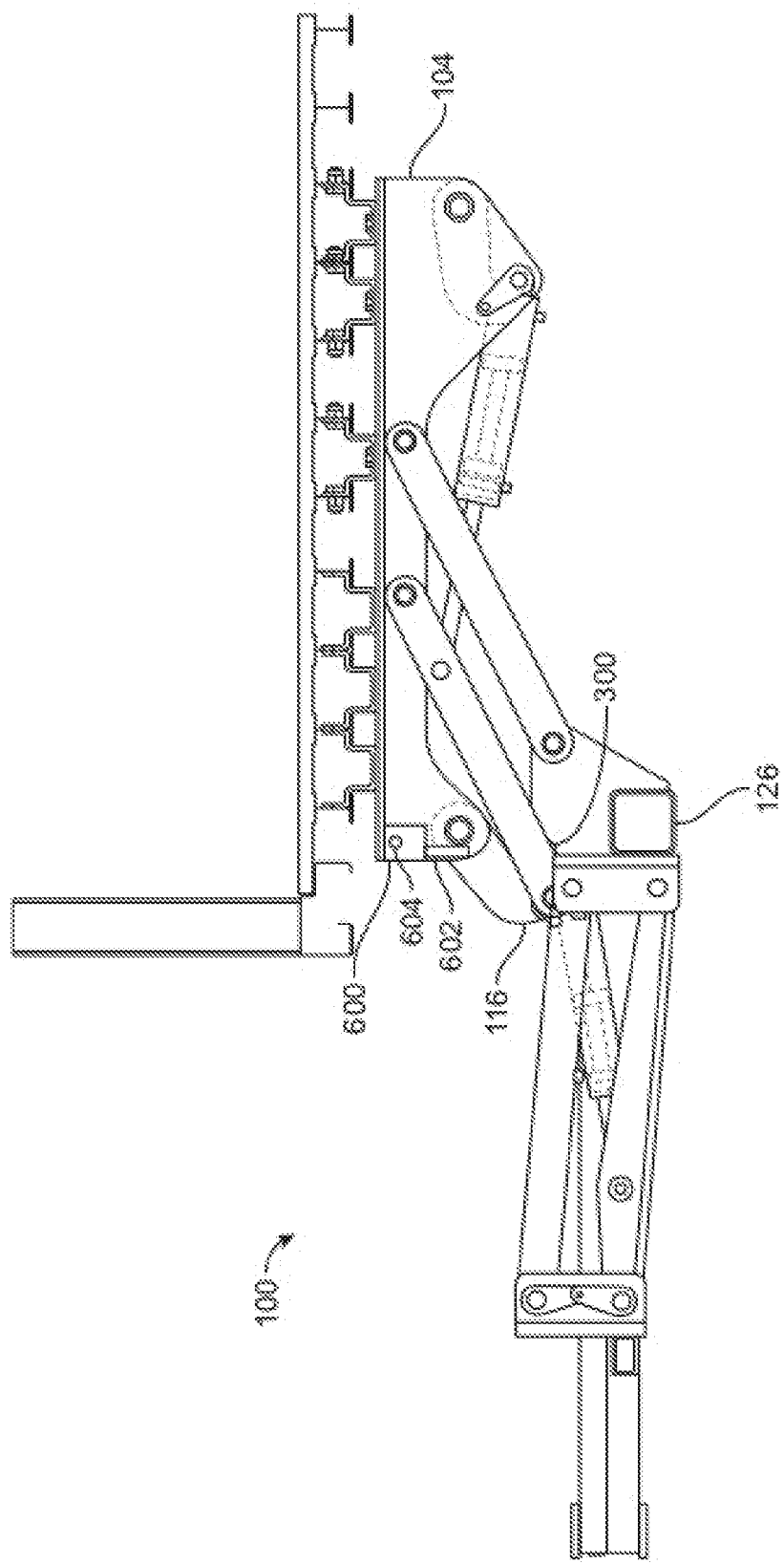
FIGS. 6A-6B depict side views of the swing arm assembly of FIGS. 1A-1G with a controller for unlatching and latching, according to one embodiment.
Figure 6B:
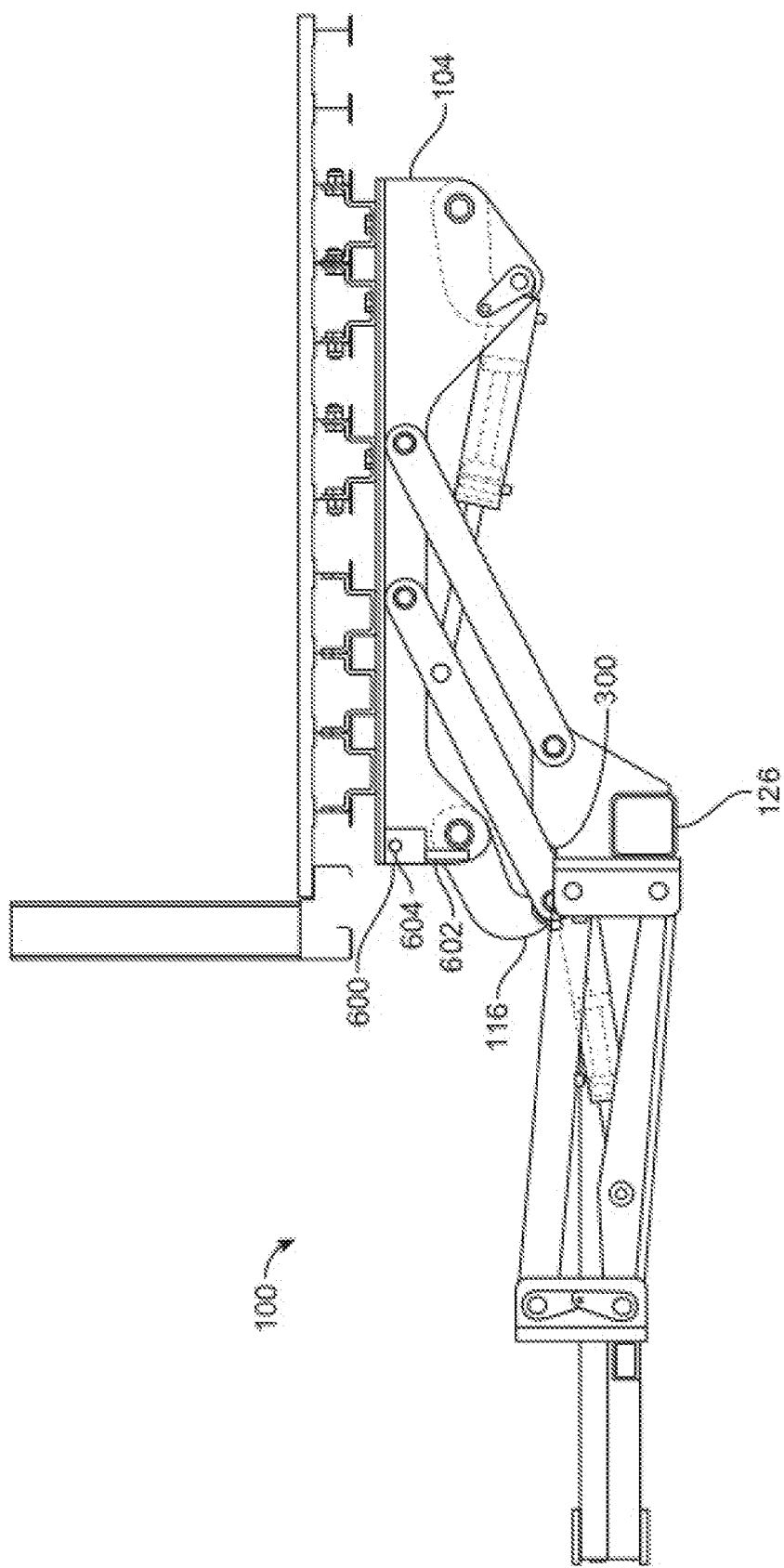

FIGS. 6A-6B depict side views of the exemplary swing arm assembly of FIGS. 1A-1G with a controller 600 for unlatching and latching. FIG. 6A depicts a second secured engaged position as the second deployment engagement mechanism 116 is secured about the post 300. FIG. 6B depicts a second unsecured engaged position as the second deployment engagement mechanism 116 is removed from the post 300.

The controller 600 may be connected to an actuator 602, or other motor, to adjust a position of the second deployment engagement mechanism 116. A push-button 604, or other control, may be used to adjust the position of the second deployment engagement mechanism 116. The controller 600 may also be applied to any of the other engagement mechanisms to control their respective movements.

Figure 7A:
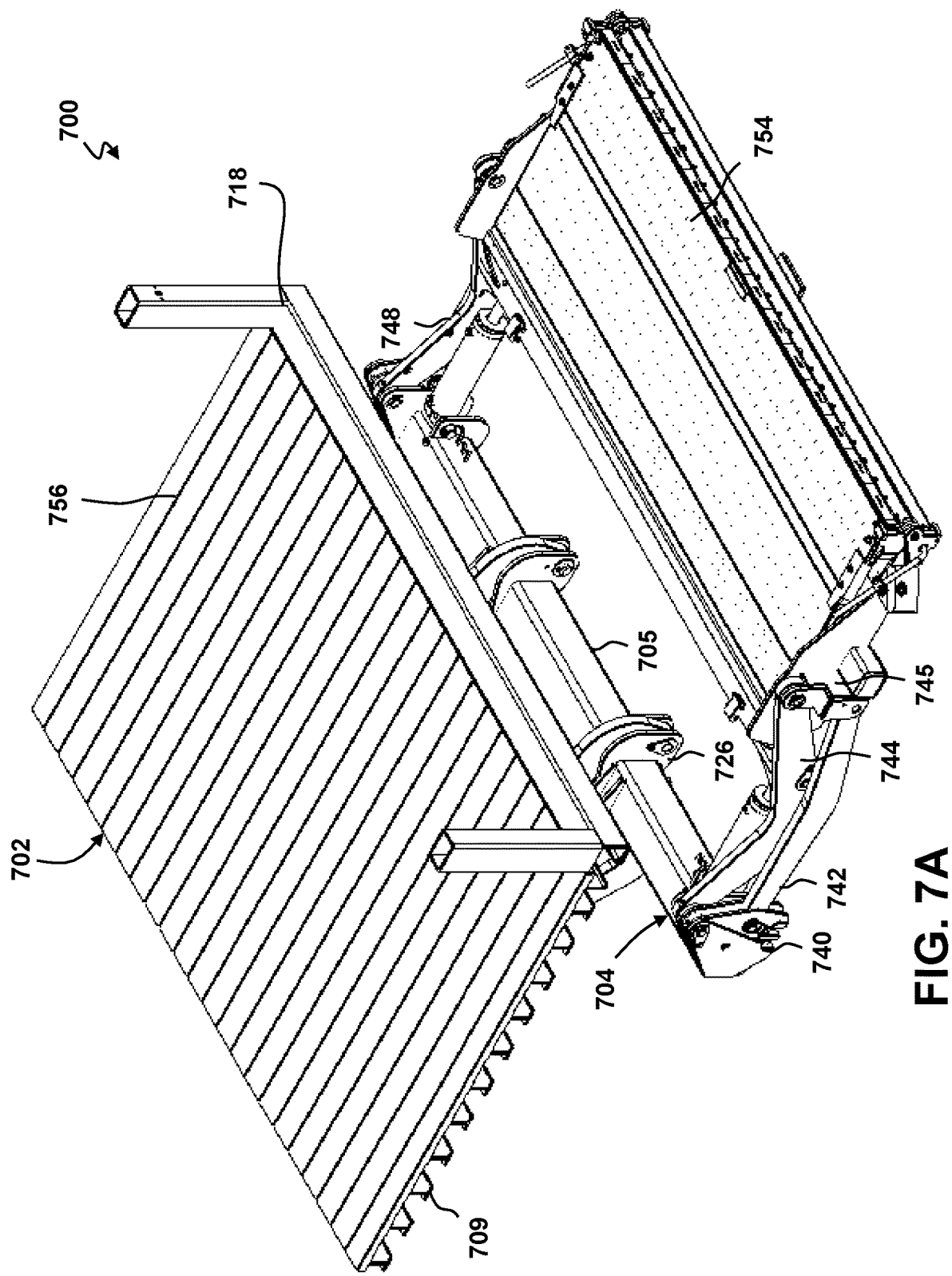
FIG. 7A depicts a perspective view of an alternate swing arm assembly on a vehicle frame, according to one embodiment.
Figure 7B:
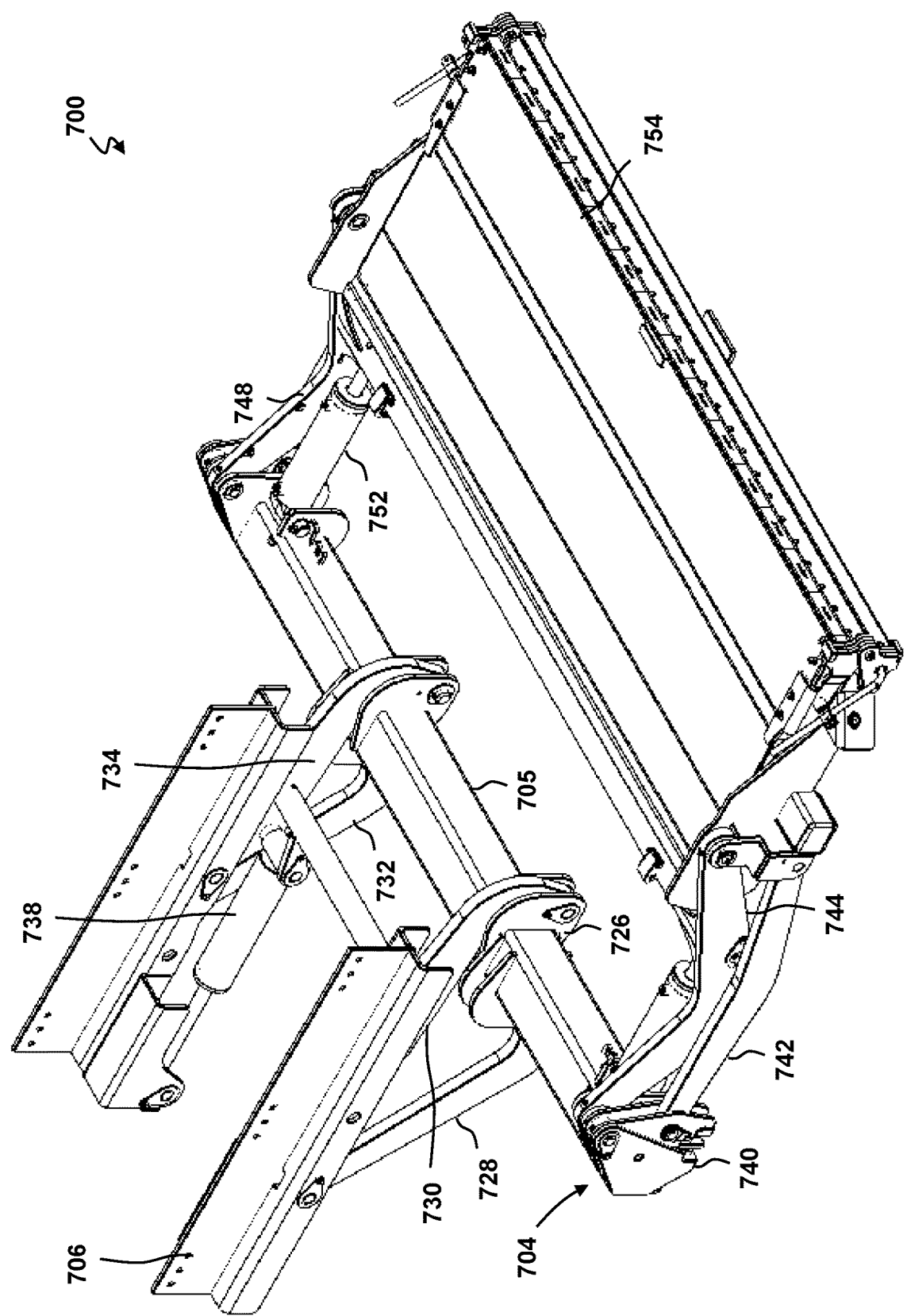
FIG. 7B depicts a perspective view of the alternate swing arm assembly of FIG. 7A without the vehicle frame, according to one embodiment.
Figure 7C:
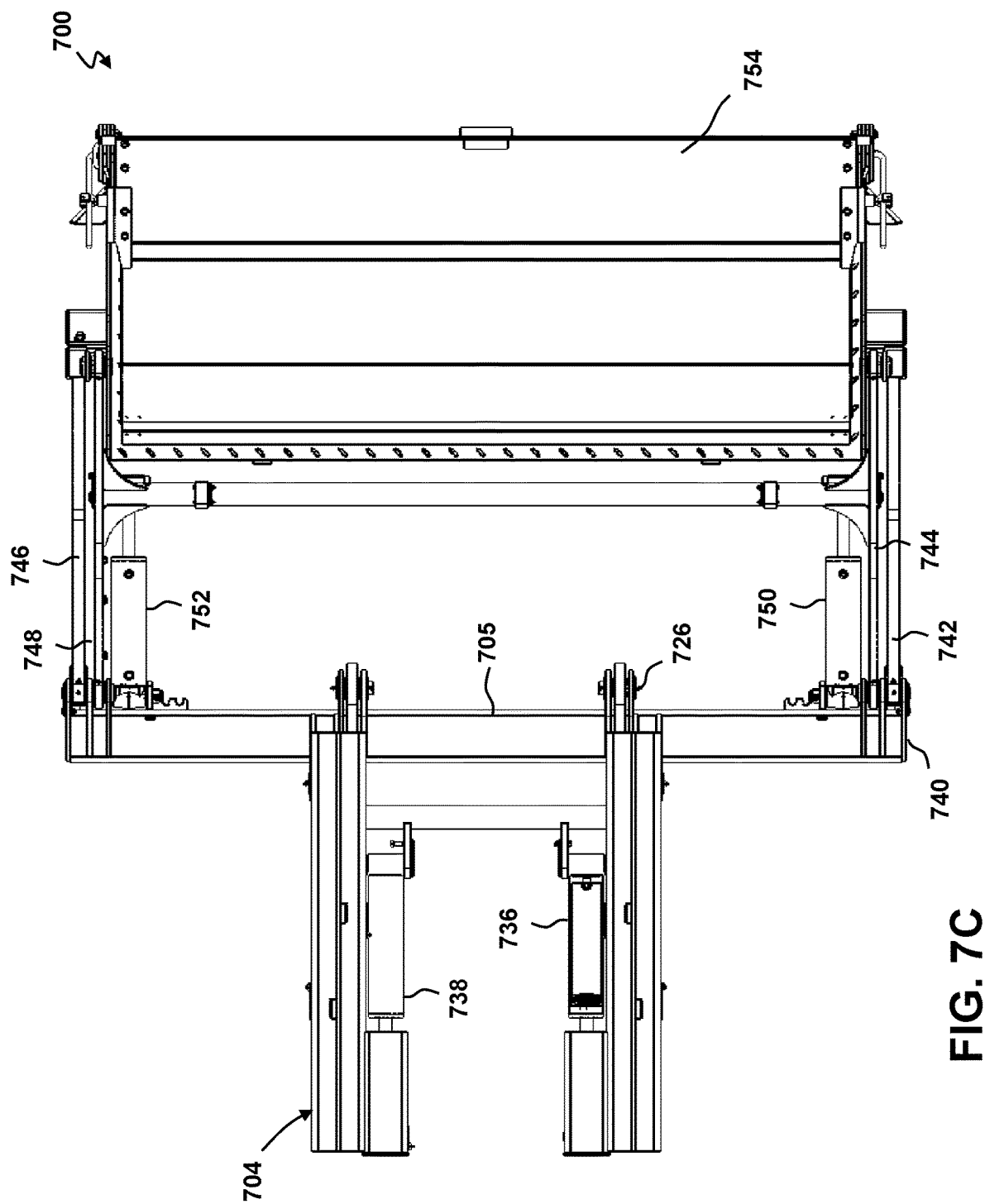
FIG. 7C depicts a top view of the alternate swing arm assembly of FIG. 7A without the vehicle frame, according to one embodiment.
Figure 7D:
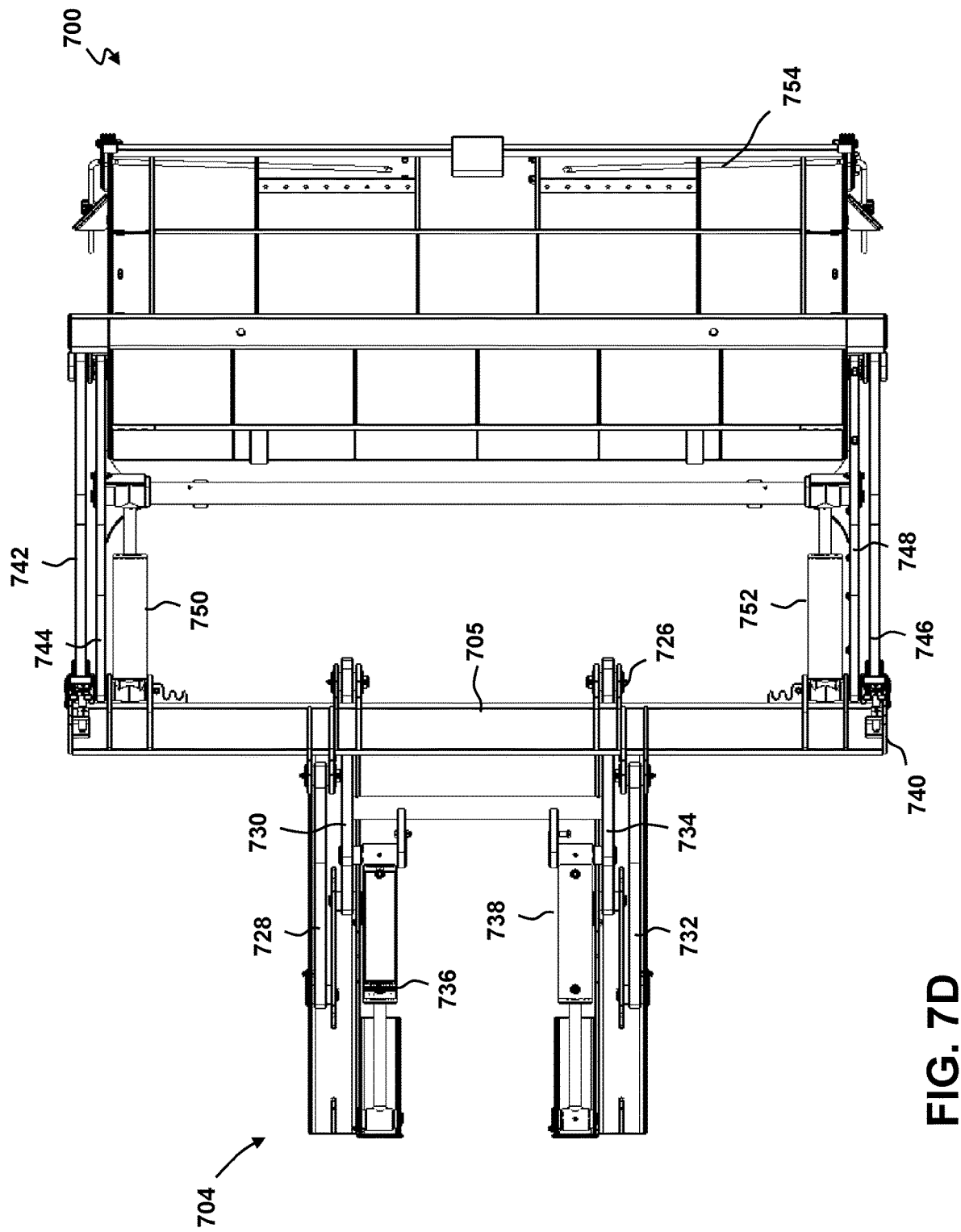
FIG. 7D depicts a bottom view of the alternate swing arm assembly of FIG. 7A without the vehicle frame, according to one embodiment.

FIG. 7A depicts a perspective view of an alternate swing arm assembly 700 on a vehicle frame 702, according to one embodiment. FIG. 7B depicts a perspective view of the alternate swing arm assembly 700 of FIG. 7A without the vehicle frame, according to one embodiment. FIG. 7C depicts a top view of the alternate swing arm assembly 700 of FIG. 7A without the vehicle frame, according to one embodiment. FIG. 7D depicts a bottom view of the alternate swing arm assembly 700 of FIG. 7A without the vehicle frame, according to one embodiment.

The swing arm assembly 700 may include a liftgate frame 704 attached to the vehicle frame 702, such as by a plurality of nuts and bolts that attach the liftgate frame 704 to a plurality of vehicle I-beams 709. The liftgate frame 704 may include one or more apertures 706 for securing the liftgate frame 704 to one or more vehicle I-beams 709. The liftgate frame 704 may also be attached to the vehicle frame 702 by welding the liftgate frame 704 to an underside of the vehicle. In some embodiments, the liftgate frame 704 may be secured to the vehicle by a combination of nuts, bolts, and welding.

The liftgate frame 704 may be attached to a beam 705 via a first bracket mount 726 via two or more pairs of upper linkages, such as a first upper linkage 728, a second upper linkage 730, a third upper linkage 732, and a fourth upper linkage 734. The first upper linkage 728 and second upper linkage 730 may be disposed proximate a first side of the swing linkage assembly 700. The third upper linkage 732 and fourth upper linkage 734 may be disposed proximate a second opposite side of the swing arm assembly 700. The first side and the second opposite side of the swing arm assembly 700 may be identical. One or more upper actuators, such as a first upper actuator 736 and a second upper actuator 738 may be used to move the beam 705 and first bracket mount 726 from a stowed first position under the vehicle frame 702 to an engaged second position proximate the vehicle opening 718.

In some embodiments, the alternate swing arm assembly may have one or more stops to limit movement of the upper linkages 728, 730, 732, 734 and/or lower linkages. In some embodiments, the distance between each of the pairs of upper linkages 728, 730, 732, 734 may have an adjustable distance to accommodate different mounting requirements. The different mounting requirements may depend on the truck or trailer body style.

The first bracket mount 726 may be attached to the beam 705. A second bracket mount 740 may also be attached to the beam 705. The second bracket mount 740 may connect the beam to a lift platform 754 via a first lower linkage 742, a second lower linkage 744, a third lower linkage 746, and a fourth lower linkage 748. The first lower linkage 742 and second lower linkage 744 may be disposed proximate the first side of the swing arm assembly 700. The third lower linkage 746 and fourth lower linkage 748 may be disposed proximate the second opposite side of the swing arm assembly 700. A first lower actuator 750 and a second lower actuator 752 may be used to move the platform 754 from a first position positioned selectively relative to a vehicle floor 756, to a second position for stowing, to a third position positioned selectively relative to an external surface, such as the ground. The second bracket mount 740 and beam 705 remain fixed in position when the lift is the 'worked' position, as shown in FIG. 7B. The second bracket mount 740 and beam 705 do not move when the lower actuators 750, 752 are being operated. A third bracket mount 745 may connect the platform 754 to the beam 705 via the lower linkages 742, 744, 746, 748.

The first bracket mount 726 and the second bracket mount 740 may be connected to the beam 705. The beam 705 may be a structural element, such as a support having a substantially square or rectangular cross-section. In other embodiments, the beam 705 may be made from two or more pieces. In other embodiments, the first bracket mount 726 and the second bracket mount 740 may be connected. The first bracket mount 726 may operate to move from the first position positioned selectively relative to a vehicle floor 756, to a second position for stowing, to a third position positioned selectively relative to an external surface, such as the ground. The movement of the first bracket 726 may be via an actuator, a motor, a manual movement, or the like.

The platform 754 is depicted in a folded position. In some embodiments, the platform 754 may be folded or partially folded when the swing arm assembly 700 is in a stowed position. In other embodiments, the platform 754 may be a one-piece platform.

Figure 8B:
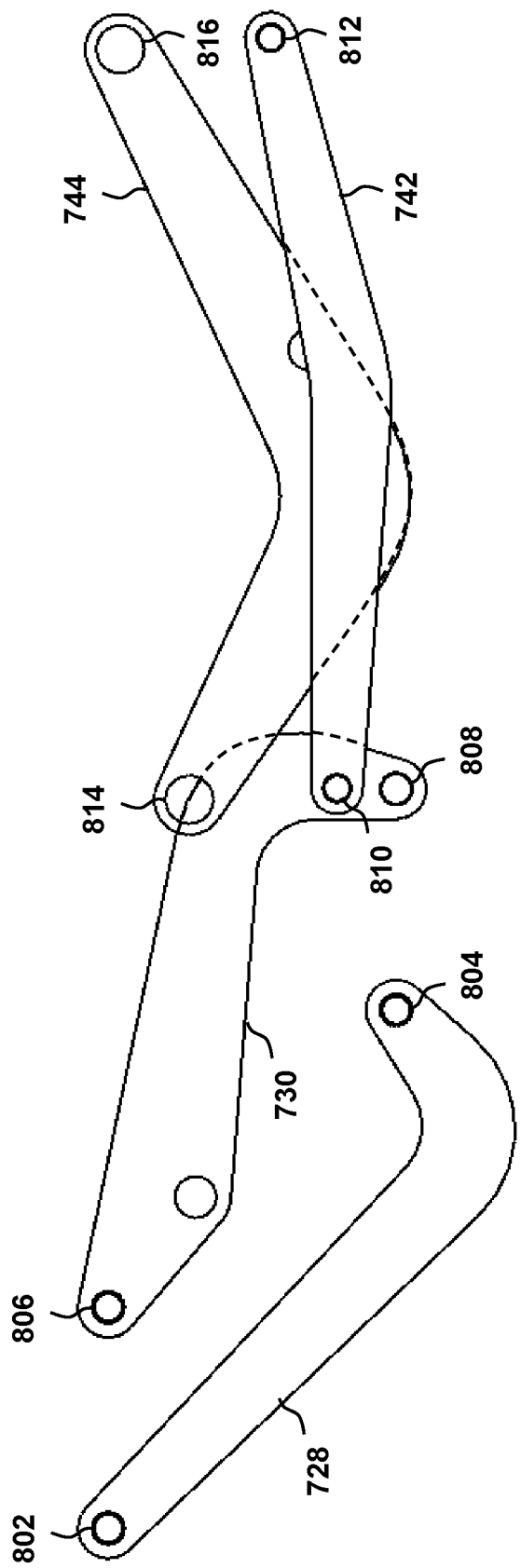
FIG. 8B depicts a side view of the upper and lower linkages of the alternate swing arm assembly of FIG. 7A with dashed lines showing the outlines of the upper and lower linkages where hidden, according to one embodiment.

FIG. 8A depicts a perspective view of the upper linkages 728, 730 and lower linkages 742, 744 of the alternate swing arm assembly of FIG. 7A, according to one embodiment. FIG. 8B depicts a side view of the upper linkages 728, 730 and lower linkages 742, 744 of the alternate swing arm assembly of FIG. 7A with dashed lines showing the outlines of the upper and lower linkages where hidden, according to one embodiment. The upper linkages 728, 730 and lower linkages 742, 744 are on the first side of the swing arm assembly. A second set of upper linkages and lower linkages may be disposed on the opposite side of the swing arm assembly. The first side and second opposite side of the swing arm assembly may be identical.

The first upper linkage 728 may have a first aperture 802 disposed proximate a first end of the first upper linkage 728 and a second aperture 804 disposed proximate a second opposite end of the first upper linkage 728. The first upper linkage 728 may have a generally "L" shape with a curved portion proximate the second aperture 804 of the first upper linkage 728.

The second upper linkage 730 may have a first aperture 806 disposed proximate a first end of the second upper linkage 730 and a second aperture 808 disposed proximate a second opposite end of the second upper linkage 730. The second upper linkage 730 may have a generally "L" shape with a curved portion proximate the second aperture 808 of the second upper linkage 730. The generally "L" shape of the second upper linkage 730 may substantially mirror the generally "L" shape of the first upper linkage 728. The generally "L" shape of the first upper linkage 728 may bend away from the second upper linkage 730 in the swing arm assembly. The generally "L" shape of the second upper linkage 730 may bend away from the first upper linkage 728 in the swing arm assembly.

The first aperture 802 of the first upper linkage 728 may be proximate the first aperture 806 of the second upper linkage 730. These first apertures 802, 806 may be pivotably attached to the liftgate frame proximate the vehicle frame when the liftgate frame is attached to the vehicle frame, as shown in FIG. 7A. The second aperture 804 of the first upper linkage 728 may be proximate the second aperture 808 of the second upper linkage 730. These second apertures 804, 806 may be pivotably attached to the first bracket mount, as shown in FIG. 7A. These second apertures 804, 806 remain substantially inline relative to one another throughout movement of the swing arm assembly.

The shapes of the first upper linkage 728 and the second upper linkage 730 provide an arcuate movement of the swing arm assembly from the first position positioned selectively relative to a vehicle floor to a second position for stowing. The "L" shape of the upper linkages 728, 730 allows for more ground clearance for the swing arm assembly as compared to a substantially straight arm.

The first lower linkage 742 may have a first aperture 810 disposed proximate a first end of the first lower linkage 742 and a second aperture 812 disposed proximate a second opposite end of the first lower linkage 742. The first lower linkage 742 may have a slight bend proximate a middle of the first lower linkage 742. The first lower linkage 742 may have a generally "V" shape with a curved portion substantially in a middle portion of the first lower linkage 742.

The second lower linkage 744 may have a first aperture 814 disposed proximate a first end of the second lower linkage 744 and a second aperture 816 disposed proximate a second opposite end of the second lower linkage 744. The second lower linkage 744 may have a generally "L" shape with a curved portion closer to the first aperture 814 than the second aperture 816 of the second lower linkage 744. The generally "L" shape of the second lower linkage 730 may bend toward the first lower linkage 742 in the swing arm assembly. The slid bend of the first lower linkage 742 may bend away from the second lower linkage 744 in the swing arm assembly.

The first aperture 810 of the first lower linkage 742 may be proximate the first aperture 814 of the second lower linkage 744. These first apertures 810, 814 may be pivotably attached to the second bracket mount, as shown in FIG. 7A. The second aperture 812 of the first lower linkage 742 may be proximate the second aperture 816 of the second lower linkage 744. These second apertures 812, 816 may be pivotably attached to the third bracket mount, as shown in FIG. 7A. These second apertures 812, 814 remain substantially inline relative to one another throughout movement of the swing arm assembly such that the attached platform remains substantially level throughout movement of the platform up to a vehicle bed and down to a ground level. In some embodiments, the platform may be tilted by a set amount and the movement of the platform via the lower linkages 742, 744 may maintain the set amount of tilt of the platform during movement of the platform.

Figure 14:
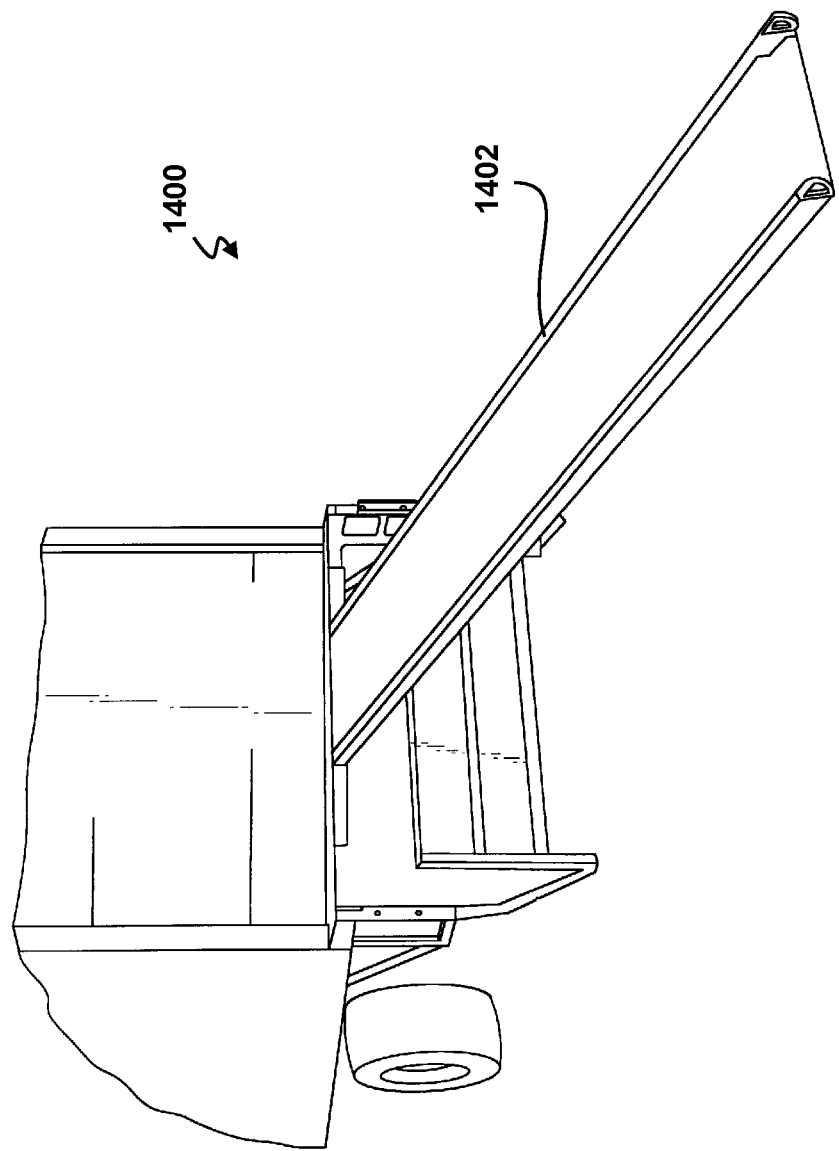
FIG. 14 depicts a perspective view of a vehicle having a walk ramp, according to one embodiment.
Figure 15:
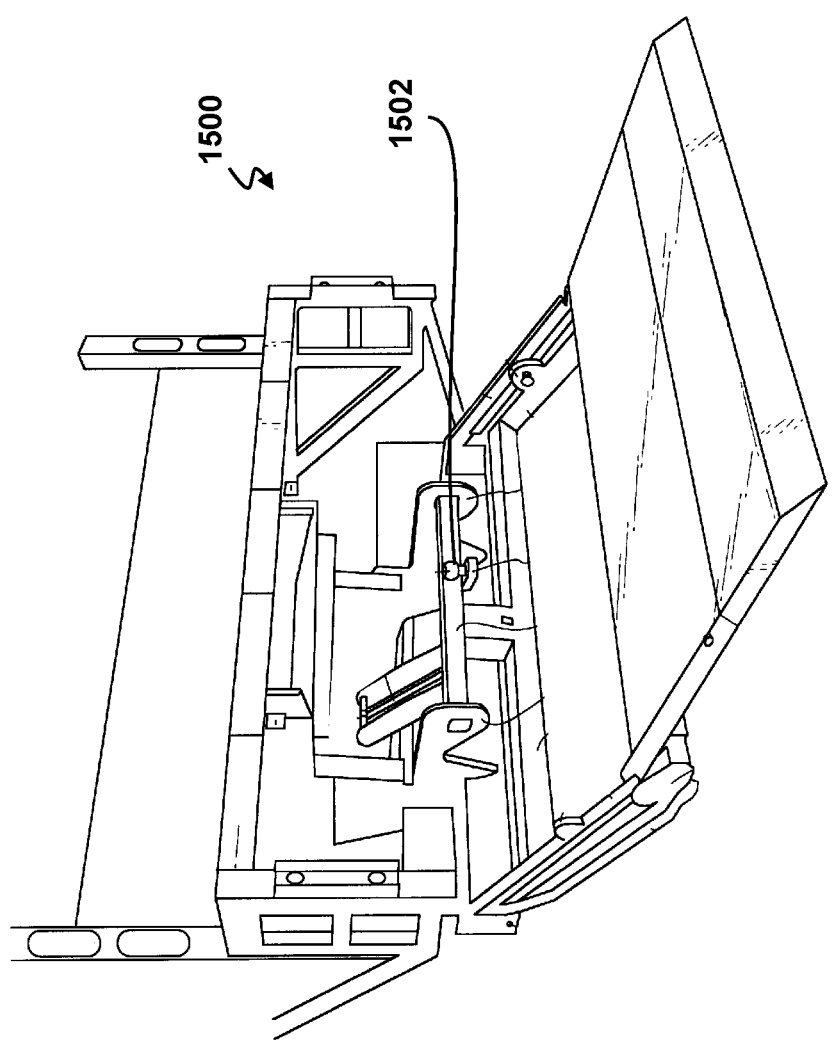
FIG. 15 depicts a perspective view of a vehicle having a tow hitch, according to one embodiment.

The shapes of the first lower linkage 742 and the second lower linkage 744 provide an arcuate movement of the platform of the swing arm assembly throughout the third position positioned selectively relative to an external surface as the platform moves up to a vehicle bed and down to a ground level. This arcuate movement allows the platform to be used without contacting an installed walk ramp, such as shown in FIG. 14; steps; a vehicle hitch, such as shown in FIG. 15; a vehicle restraint, such as a dock lock; and/or a vehicle restraint receiver. The arcuate movement, i.e., swinging motion, of upper linkages 728, 730 allows the lift to be used without contacting an installed device such as walk ramp, tow hitch, steps, a vehicle restraint, a vehicle restraint receiver, or the like. The lift "swings over" any such installed device without contacting the installed device. Being able to use the swing arm assembly with the installed device is not possible if the lift slides in and out in the worked position, as in other lift gates.

Figure 9A:
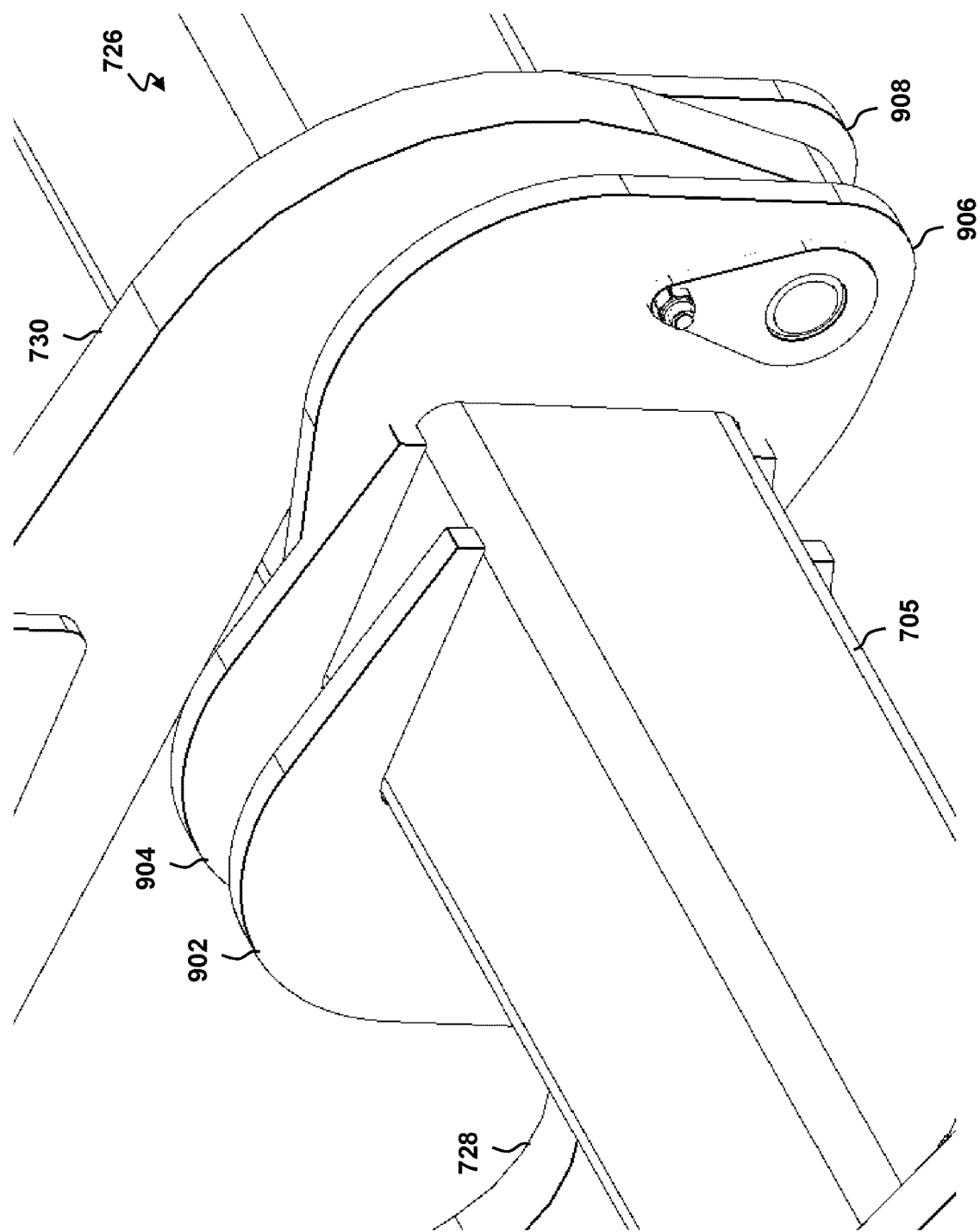
FIG. 9A depicts a perspective view of a first bracket mount attached to the beam in the alternate swing arm assembly of FIG. 7A, according to one embodiment.
Figure 9B:
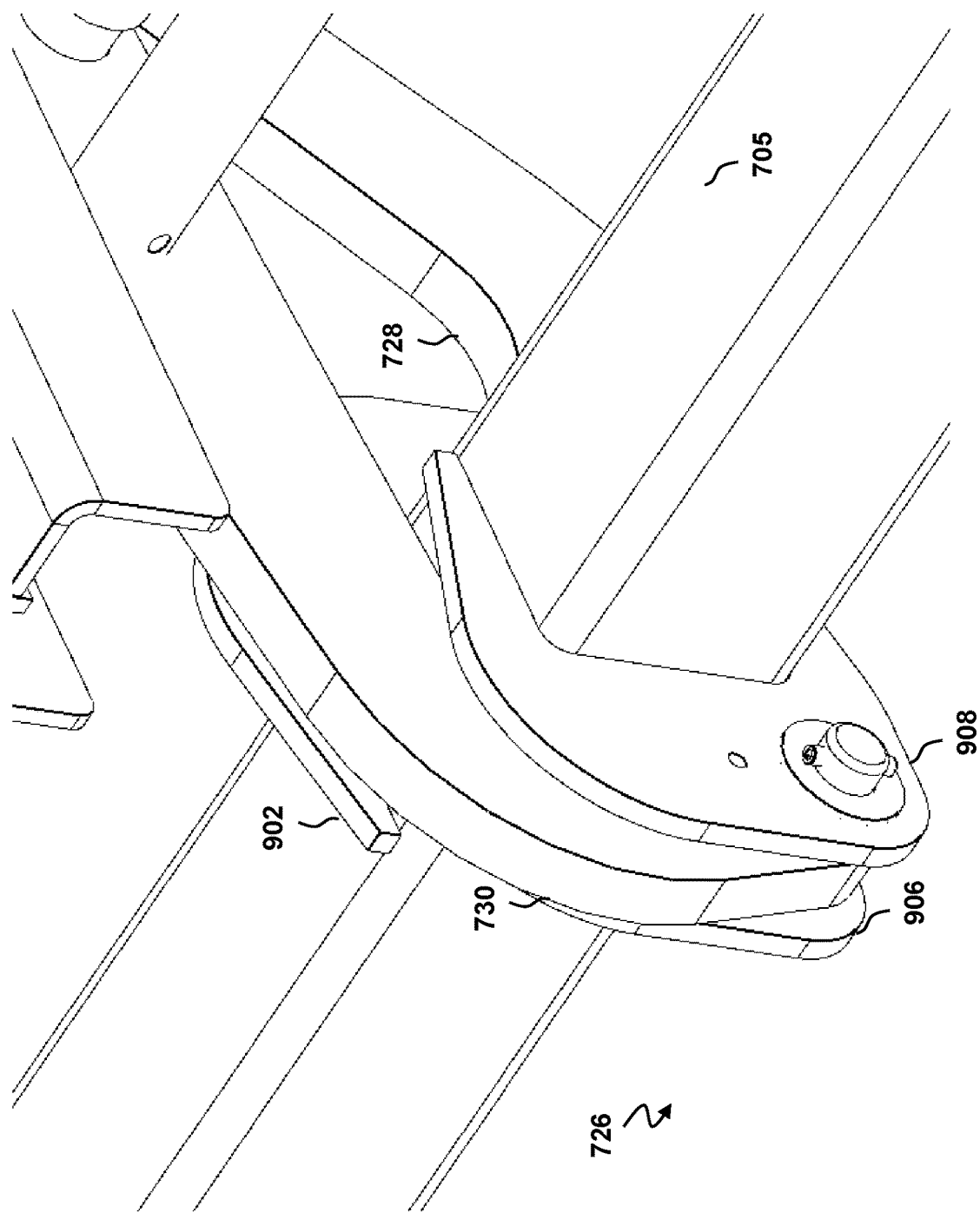
FIG. 9B depicts another perspective view of the first bracket mount attached to the beam in the alternate swing arm assembly of FIG. 7A, according to one embodiment.

FIG. 9A depicts a perspective view of a first bracket mount 726 attached to the beam 705 in the alternate swing arm assembly of FIG. 7A, according to one embodiment. FIG. 9B depicts another perspective view of the first bracket mount 726 attached to the beam 705 in the alternate swing arm assembly of FIG. 7A, according to one embodiment. The first bracket mount 726 includes four generally "C" shaped plates 902, 904, 906, 908.

The first and second "C" shaped plates 902, 904 surround a portion of the first upper linkage 728 such that the first upper linkage 728 is pivotally connected to the first and second "C" shaped plates 902, 904. The beam 705 is fit into an open end of the first and second "C" shaped plates 902, 904. The first and second "C" shaped plates 902, 904 may be attached to the beam 705 via welding, one or more nuts and bolts, friction fit, or the like.

The third and fourth "C" shaped plates 906, 908 surround a portion of the second upper linkage 730 such that the second upper linkage 730 is pivotally connected to the third and fourth "C" shaped plates 906, 908. The beam 705 is fit into an open end of the third and fourth "C" shaped plates 906, 908. The third and fourth "C" shaped plates 906, 908 may be attached to the beam 705 via welding, one or more nuts and bolts, friction fit, or the like. The first and second "C" shaped plates 902, 904 may be oriented opposite the third and fourth "C" shaped plates 906, 908 such that the "C" shapes plates 902, 904, 906, 908 collectively surround the beam 705. The first bracket mount 726 may be used for each pair of upper linkages attached to the beam 705, such as shown in FIG. 7A.

Figure 10B:
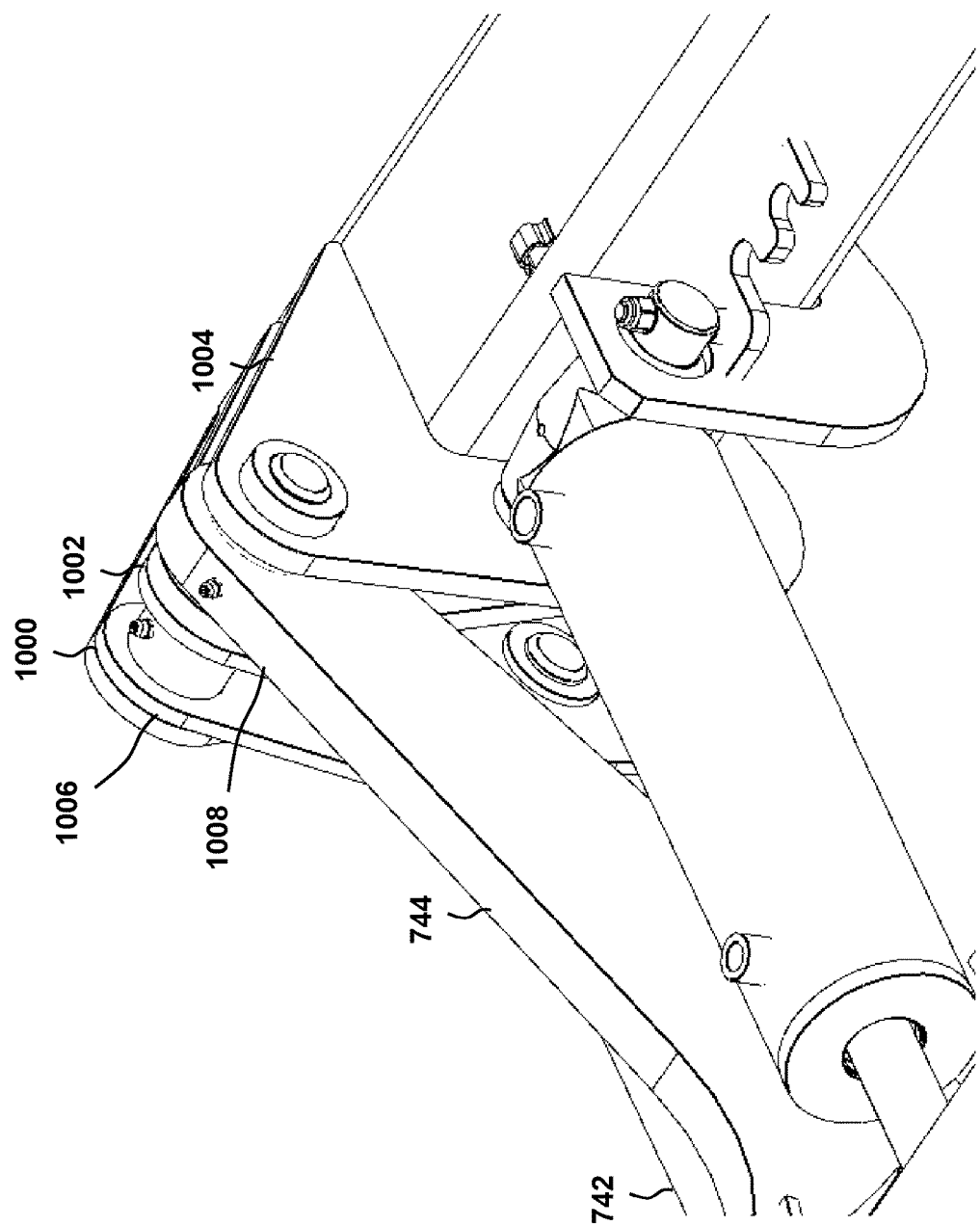
FIG. 10B depicts another perspective view of the second bracket mount attached to the beam in the alternate swing arm assembly of FIG. 7A, according to one embodiment.

FIG. 10A depicts a perspective view of a second bracket mount 740 attached to a beam 705 in the alternate swing arm assembly of FIG. 7A, according to one embodiment. FIG. 10B depicts another perspective view of the second bracket mount 740 attached to the beam 705 in the alternate swing arm assembly of FIG. 7A, according to one embodiment. The second bracket mount 740 may include a first plate 1000, a second plate 1002, a third plate 1004, a fourth plate 1006, a fifth plate 1008, a connecting block 1010, a fastener 1012, and a beam bracket 1014.

The first plate 1000 may form an endcap of the beam 705 and may align the second bracket mount 740 with respect to the beam 705. The second plate 1002 and third plate 1004 may be attached to the beam, such as by welding, nuts and bolts, or the like. The fourth plate 1006 and fifth plate 1008 may be pivotably connected to the first plate 1000 and second plate 1002, respectively, to enclose the second bracket mount 740 about the beam 705. A connecting block 1010 may connect the fourth plate 1006 and fifth plate 1008. In some embodiments, the fourth plate 1006 and fifth plate 1008 may be connected.

The fastener 1012 may be connected through the connecting block 1010 and beam bracket 1014. The beam bracket 1014 may be connected to the beam, such as by welding, nuts and bolts, or the like. In some embodiments, the fastener 1012 may be tightened to secure the fourth plate 1006 and fifth plate 1008 to the beam 705. In other embodiments, the fastener may be used to adjust platform tilt as necessary. Rotation of the fastener 1012 in a first direction may adjust the platform tilt in a first angle. Rotation of the fastener 1012 in an opposite second direction may adjust the platform tile in an opposite second angle. The first lower linkage 742 may be pivotably disposed and connected between the fourth plate 1006 and fifth plate 1008. The second lower linkage 744 may be pivotably disposed and connected between the second plate 1002 and the third plate 1004. The second bracket mount 740 may be used for each pair of lower linkages attached to the beam 705, such as shown in FIG. 7A.

Figure 11A:
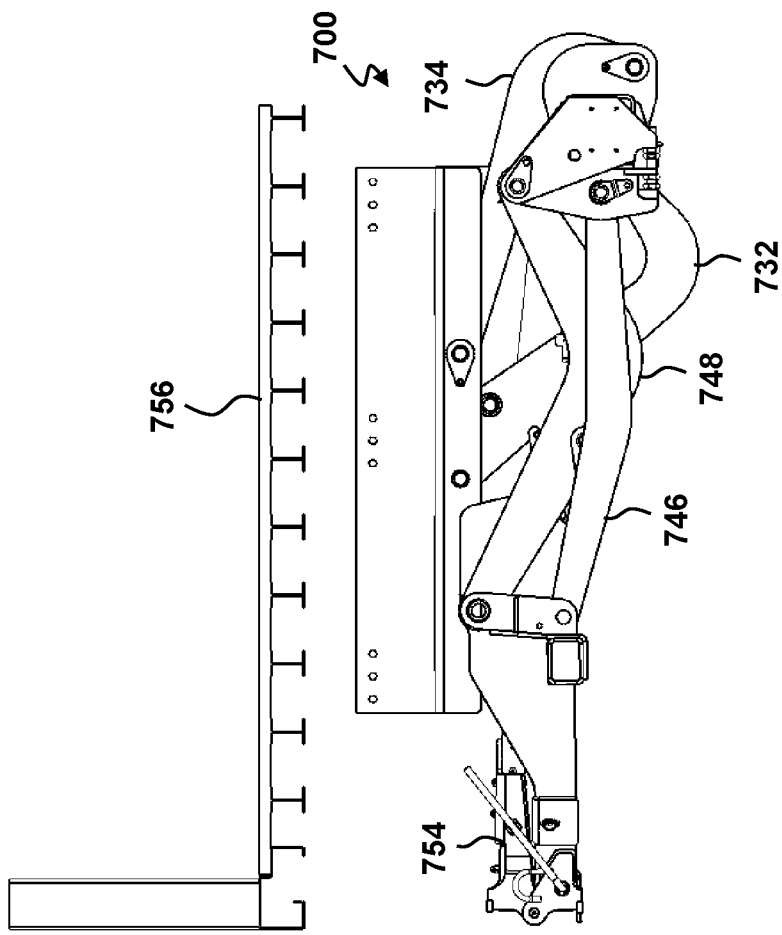
FIG. 11A depicts a side view of the alternate swing arm assembly of FIG. 7A in a stowed position, according to one embodiment.

FIG. 11A depicts a side view of the alternate swing arm assembly 700 of FIG. 7A in a stowed position, according to one embodiment. The swing arm assembly 700 and lift platform 754 are stowed underneath the vehicle floor 756. This stowed position may be used when the vehicle is in motion, the swing arm assembly 700 is not in use, or the like. The upper linkages 732, 734 and lower linkages 746, 748 maintain the lift platform 754 underneath the vehicle in the stowed position.

Figure 11B:
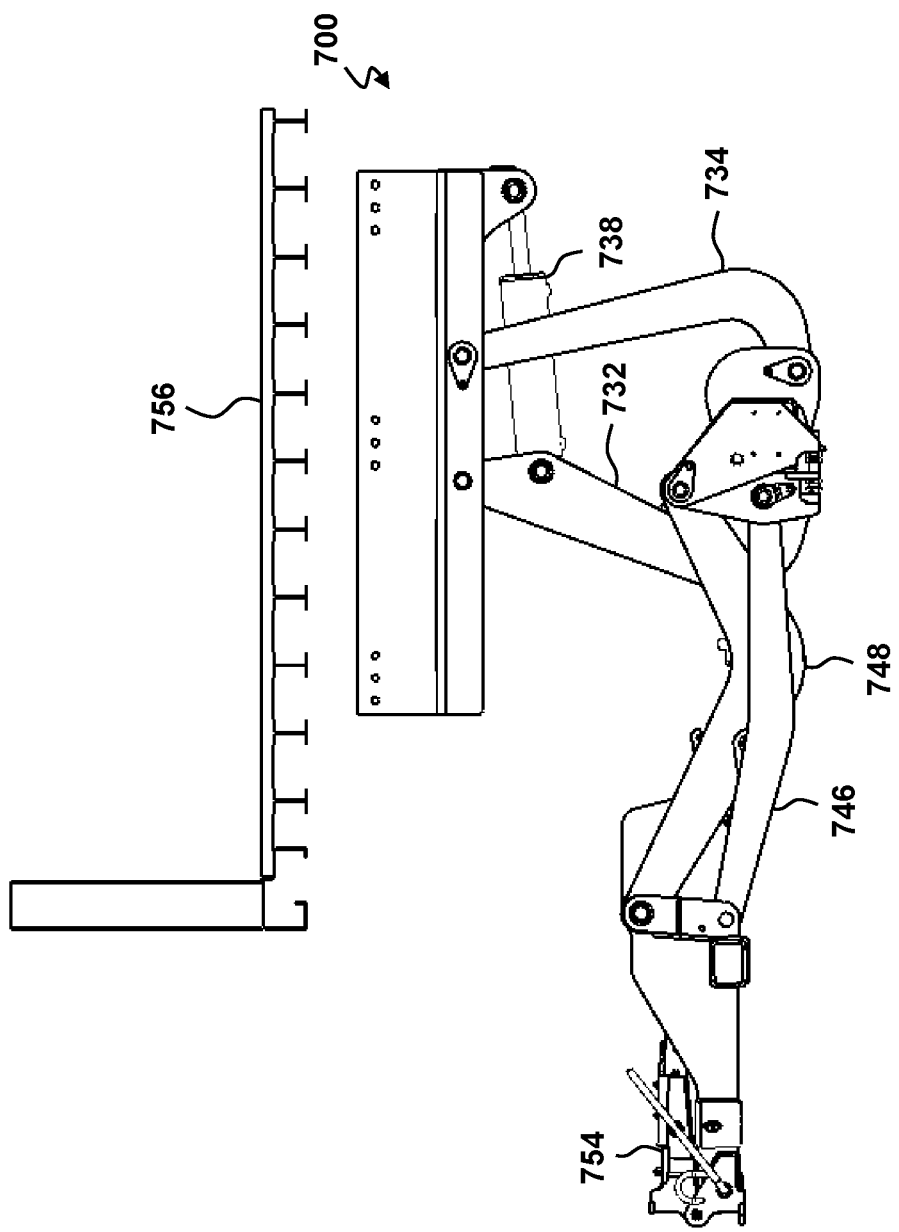
FIG. 11B depicts a side view of the alternate swing arm assembly of FIG. 7A in a middle position, according to one embodiment.

FIG. 11B depicts a side view of the alternate swing arm assembly 700 of FIG. 7A in a middle position, according to one embodiment. The second upper actuator 738 may extend causing the lift platform 754 to move away from the vehicle floor 756 via pivoting movement of the third upper linkage 732 and fourth upper linkage 734. The third lower linkage 746, fourth lower linkage 748, and lift platform 754 may remain substantially level relative to the vehicle floor 756 and/or their stowed positions during this pivoting movement. In some embodiments, the lift platform 754 may be angled a set amount relative to the vehicle floor 756 and/or the ground.

Figure 11C:
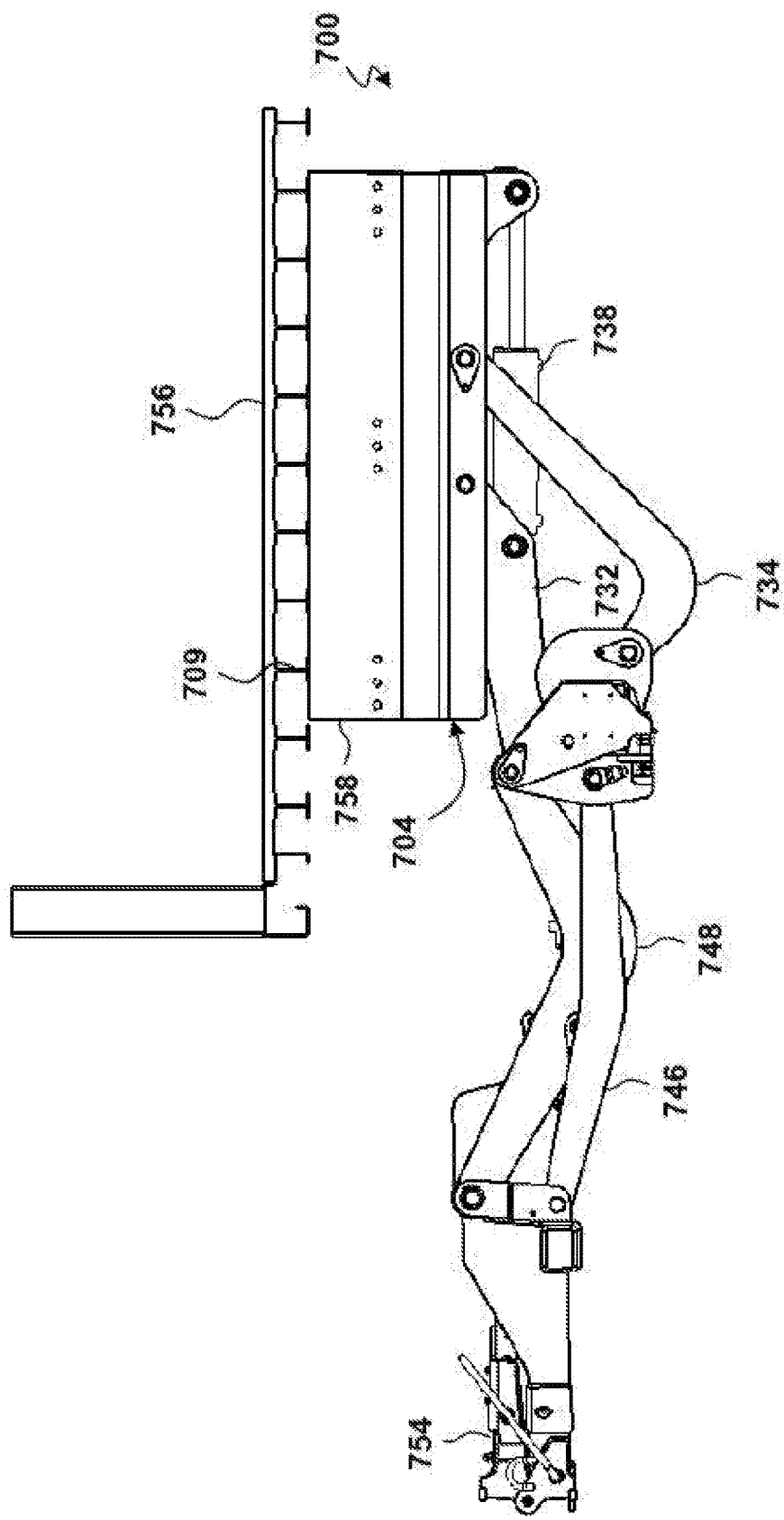
FIG. 11C depicts a side view of the alternate swing arm assembly of FIG. 7A in a worked position, according to one embodiment.
Figure 11D:
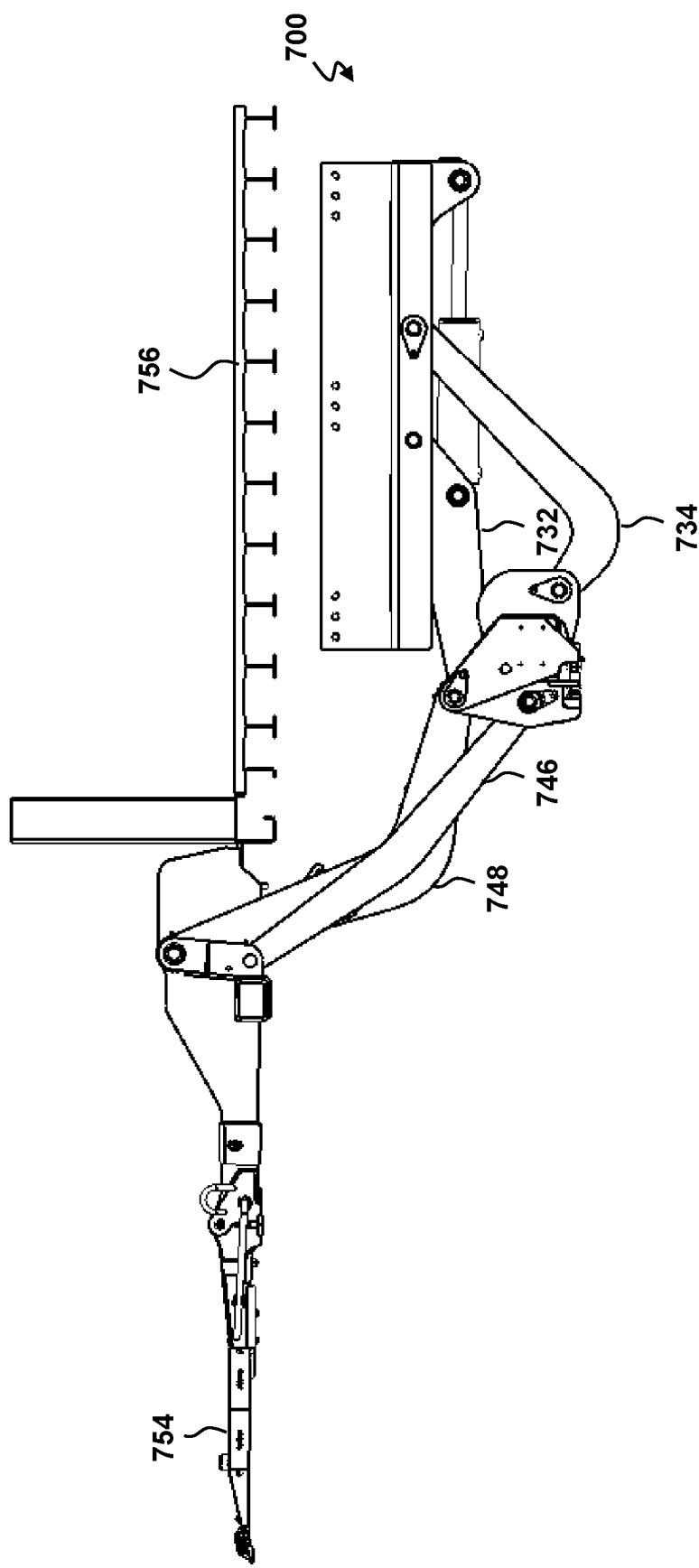
FIG. 11D depicts a side view of the alternate swing arm assembly of FIG. 7A in an up position, according to one embodiment.
Figure 11E:
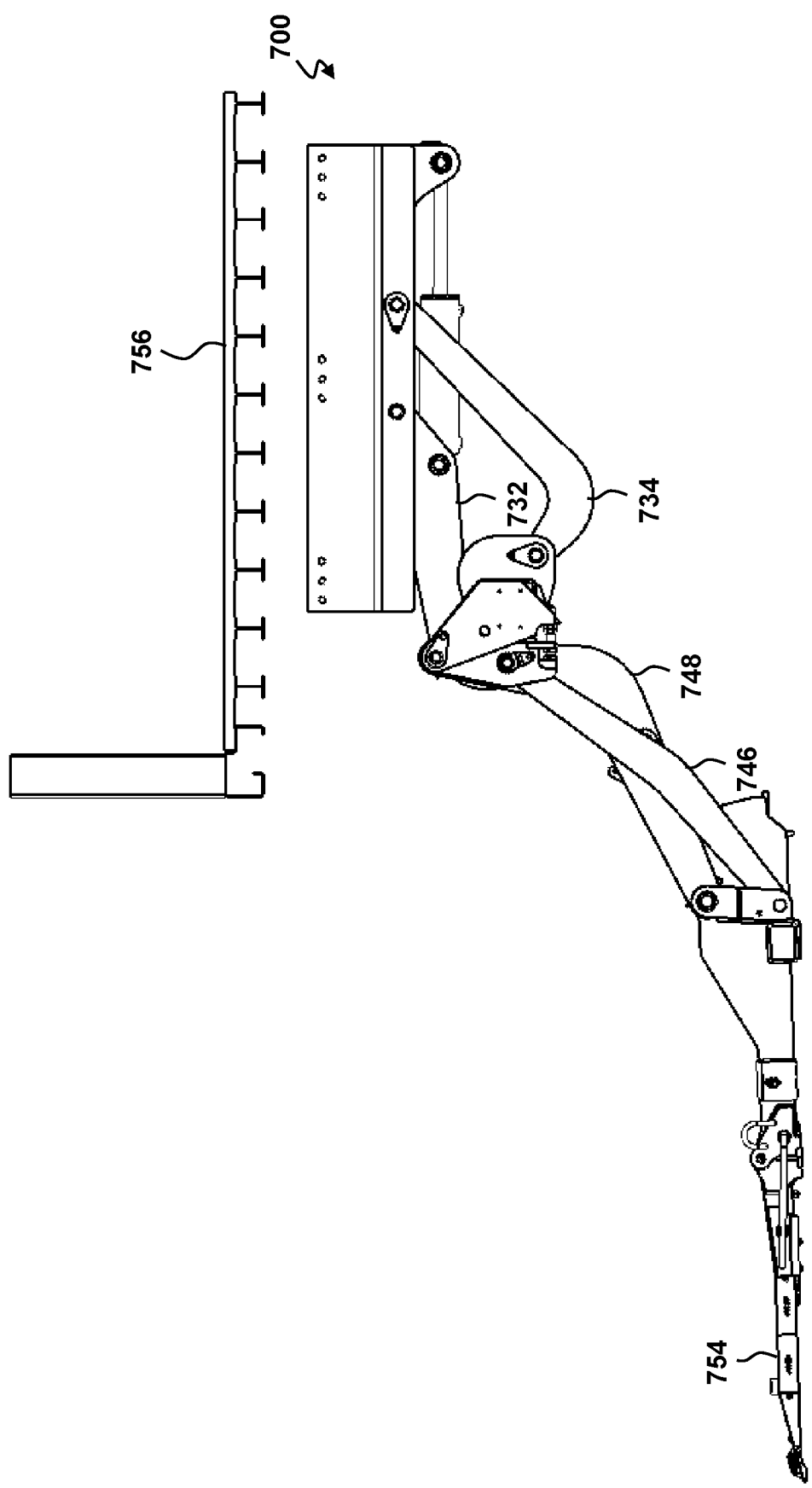
FIG. 11E depicts a side view of the alternate swing arm assembly of FIG. 7A in a down position, according to one embodiment.

FIG. 11C depicts a side view of the alternate swing arm assembly 700 of FIG. 7A in a worked position, according to one embodiment. The second upper actuator 738 may continue to extend until the lift platform 745 is at a maximum horizontal distance from the vehicle floor 756. From the worked position shown in FIG. 11C, the lift platform 754 may be unfolded and raised, as shown in FIG. 11D, and/or lowered, as shown in FIG. 11E. A vertical height of first bracket relative to the liftgate frame in the first stowed position, as shown in FIG. 11A, may be substantially equal to a vertical height of the first bracket relative to the liftgate frame in the second engaged position, as shown in FIG. 11C.

A mounting plate 758 is shown in FIG. 11C. The liftgate frame 704 may be connected to the mounting plate 758. The mounting plate 758 may be connected to one or more vehicle I-beams 709. In some embodiments, the mounting plate 758 may include a plurality of slots for various mounting locations to accommodate different bed heights, mounting requirements, or the like. In one embodiment, the mounting plate 758 may include three slots for various mounting locations.

FIG. 11D depicts a side view of the alternate swing arm assembly 700 of FIG. 7A in an up position, according to one embodiment. In the up position shown in FIG. 11D, the platform 754 is raised to be positioned selectively relative to the vehicle floor 756 to allow for the transfer of items in the vehicle onto the platform 754 or vice versa. The platform 754 may be substantially aligned with the vehicle floor 756, higher than the vehicle floor 756, or lower than the vehicle floor 756. The platform 754 may be substantially parallel to the vehicle floor 756 or slanted relative to the vehicle floor 756. The amount of slant in the platform 754 may be set, adjustable manually by a user, or adjustable automatically via a controller and actuator or motor, or by geometry. The second lower actuator may extend to move the lift platform 754 to a maximum vertical height that may be above, below, or substantially aligned with the vehicle floor 756 via the third lower linkage 746 and the fourth lower linkage 748. The platform 754 may remain substantially level relative to the vehicle floor 756 and/or the ground during movement. The platform 754 may ramp down or ramp up relative to its vertical height.

FIG. 11E depicts a side view of the alternate swing arm assembly 700 of FIG. 7A in a down position, according to one embodiment. In the down position shown in FIG. 11E, the platform 754 is positioned selectively relative to an external surface, such as the ground. The second lower actuator may retract to move the lift platform 754 to a position relative to the ground via the third lower linkage 746 and the fourth lower linkage 748.

Figure 12A:
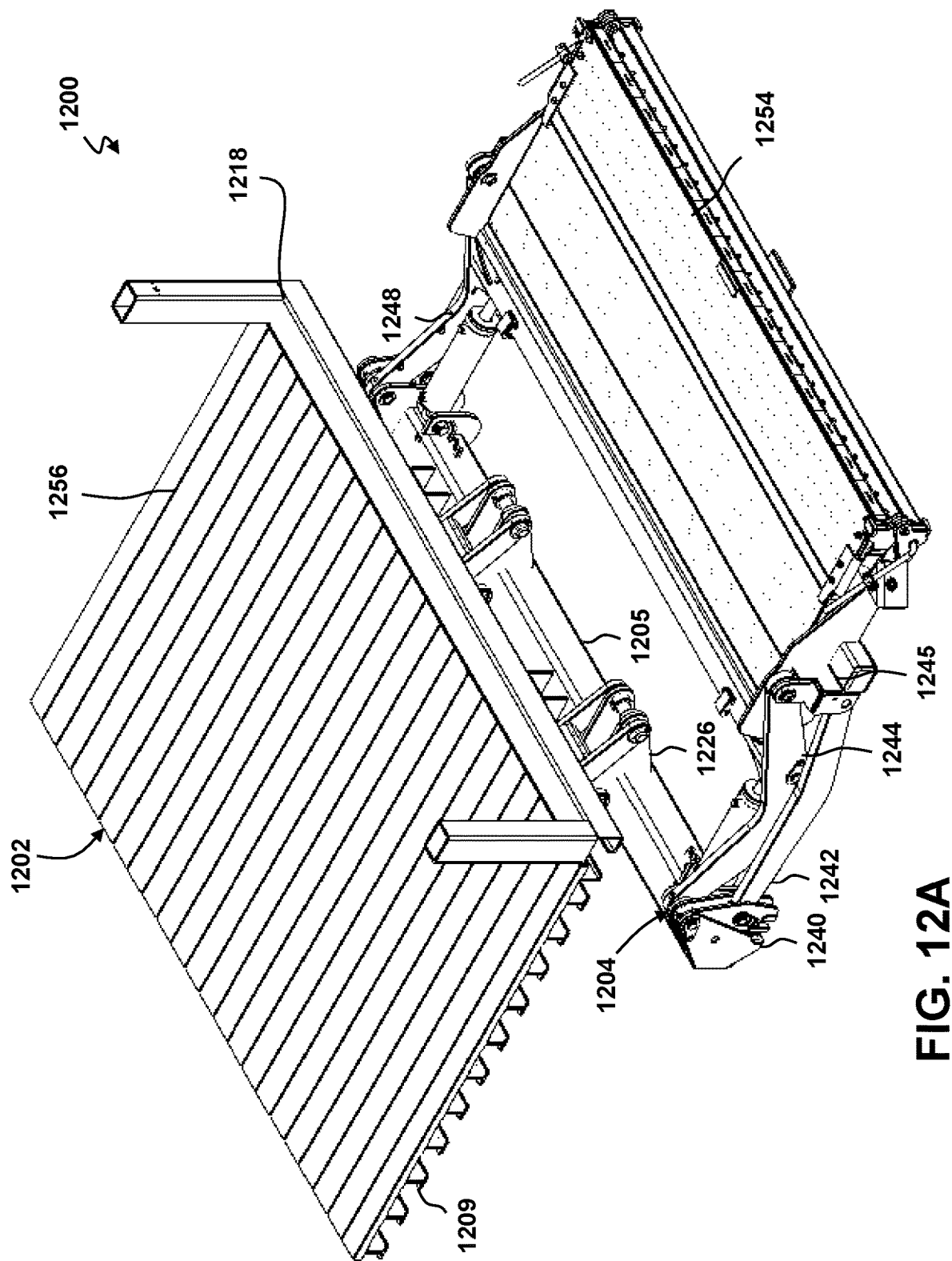
FIG. 12A depicts a perspective view of another alternate swing arm assembly on a vehicle frame, according to one embodiment.
Figure 12B:
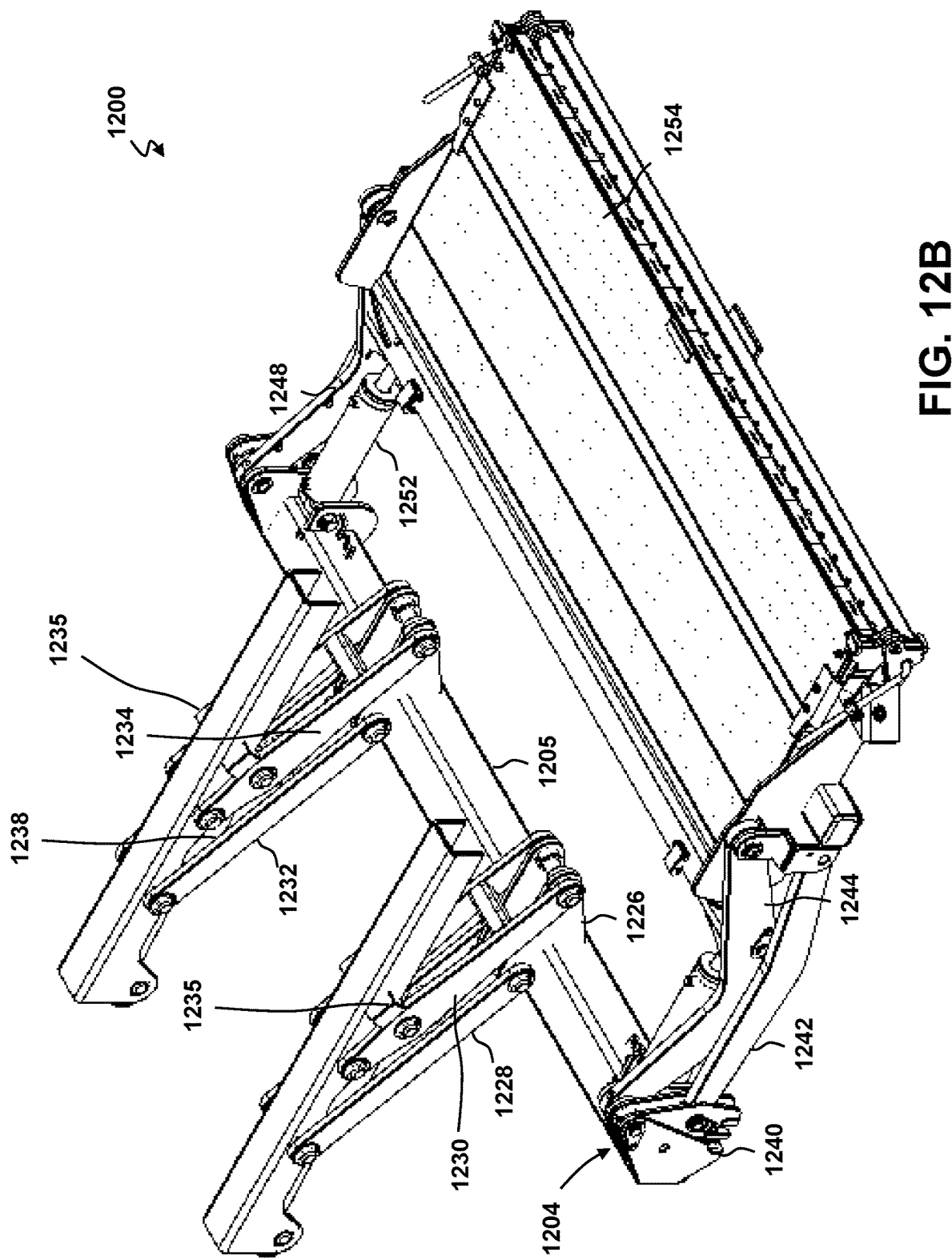
FIG. 12B depicts a perspective view of the alternate swing arm assembly of FIG. 12A without the vehicle frame, according to one embodiment.
Figure 12C:
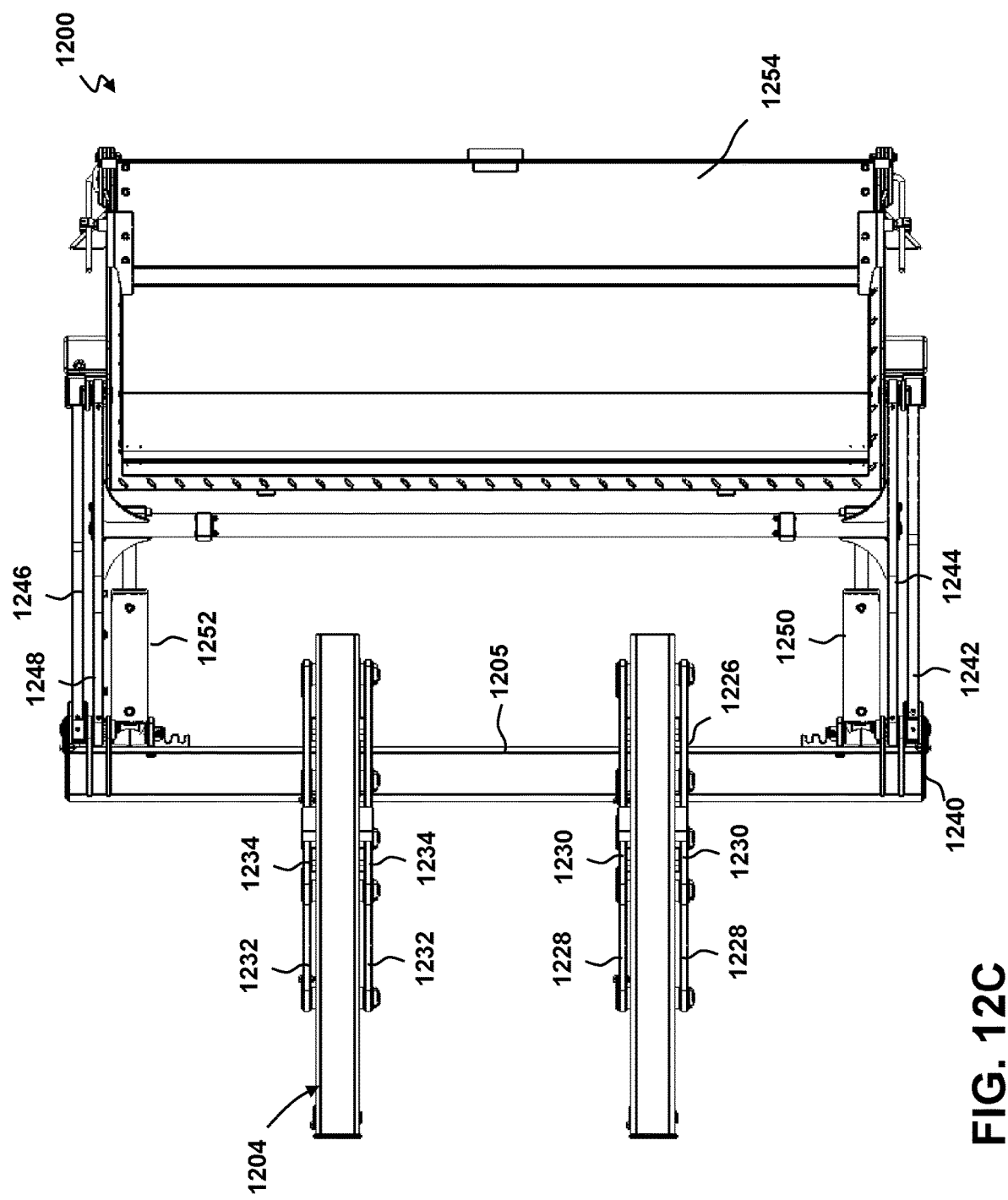
FIG. 12C depicts a top view of the alternate swing arm assembly of FIG. 12A without the vehicle frame, according to one embodiment.
Figure 12D:
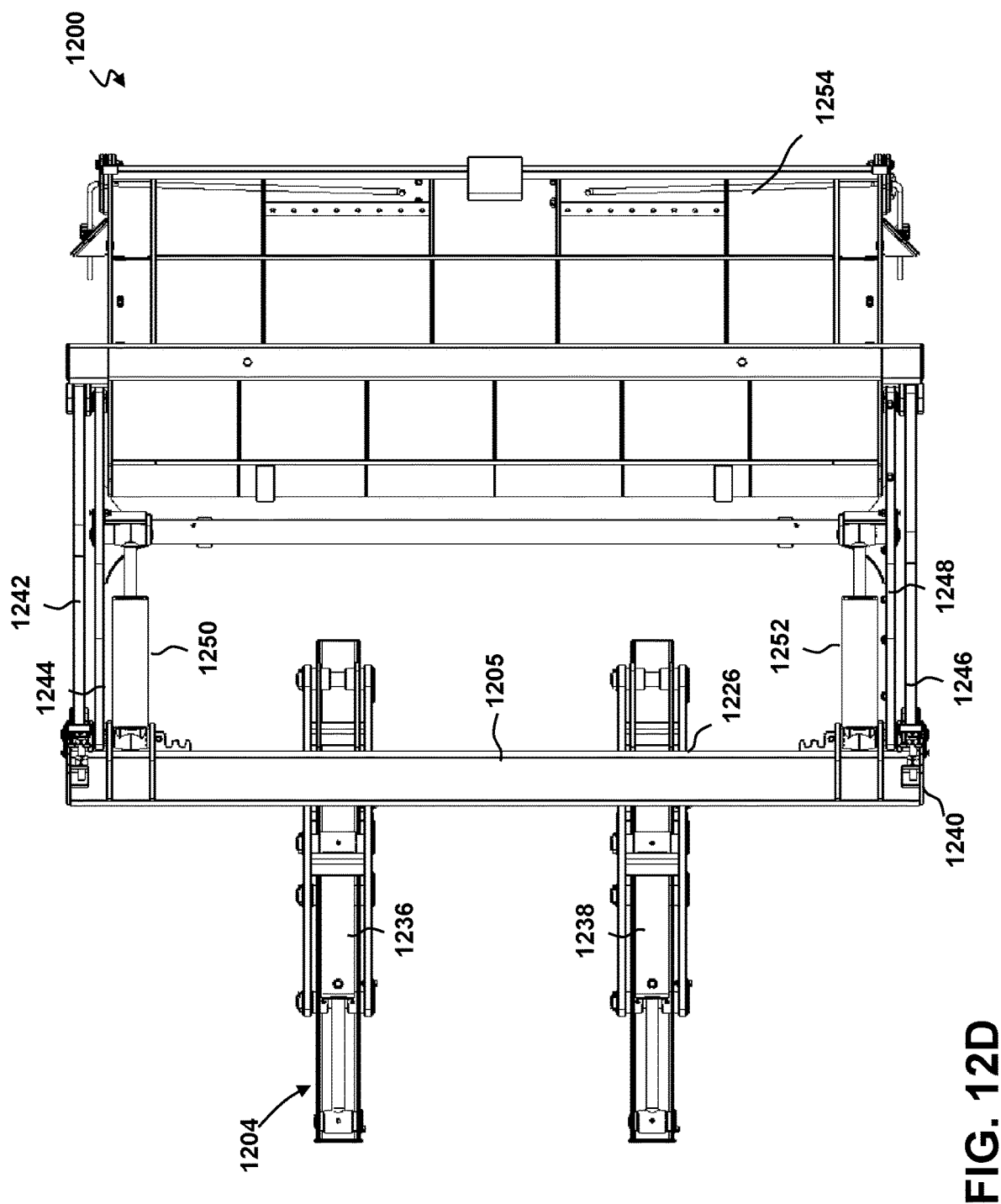
FIG. 12D depicts a bottom view of the alternate swing arm assembly of FIG. 12A without the vehicle frame, according to one embodiment.

FIG. 12A depicts a perspective view of another alternate swing arm assembly 1200 on a vehicle frame 1202, according to one embodiment. FIG. 12B depicts a perspective view of the alternate swing arm assembly 1200 of FIG. 12A without the vehicle frame, according to one embodiment. FIG. 12C depicts a top view of the alternate swing arm assembly 1200 of FIG. 12A without the vehicle frame, according to one embodiment. FIG. 12D depicts a bottom view of the alternate swing arm assembly 1200 of FIG. 12A without the vehicle frame, according to one embodiment.

The swing arm assembly 1200 may include a liftgate frame 1204 attached to the vehicle frame 1202, such as by a plurality of nuts and bolts that attach the liftgate frame 1204 to a plurality of vehicle I-beams 1209. The liftgate frame 1204 may also be attached to the vehicle frame 1202 by welding the liftgate frame 1204 to an underside of the vehicle. In some embodiments, the liftgate frame 1204 may be secured to the vehicle by a combination of nuts, bolts, and welding.

The liftgate frame 1204 may be attached to a beam 1205 via a first bracket mount 1226 via two or more pairs of upper linkages, such as a first pair of upper linkages 1228, a second pair of upper linkages 1230, a third pair of upper linkages 1232, and a fourth pair of upper linkages 1234. The first pair of upper linkages 1228 and second pair of upper linkages 1230 may be disposed proximate a first side of the swing arm assembly 1200. The third pair of upper linkages 1232 and the fourth pair of upper linkages 1234 may be disposed proximate a second opposite side of the swing arm assembly 1200. The first side and the second opposite side of the swing arm assembly 1200 may be identical. One or more upper actuators, such as a first upper actuator 1236 and a second upper actuator 1238 may be used to move the beam 1205 and first bracket mount 1226 from a stowed first position under the vehicle frame 1202 to an engaged second position proximate the vehicle opening 1218. The pairs of upper linkages 1228, 1230, 1232, 1234 may be substantially straight and substantially parallel to one another. Each of the pairs of upper linkages 1228, 1230, 1232, 1234 may be on either side of a frame member of the swing arm assembly 1200.

The first bracket mount 1226 may be attached to the beam 1205. A second bracket mount 1240 may also be attached to the beam 1205. The second bracket mount 1240 may connect the beam to a lift platform 1254 via a first lower linkage 1242, a second lower linkage 1244, a third lower linkage 1246, and a fourth lower linkage 1248. The first lower linkage 1242 and second lower linkage 1244 may be disposed proximate the first side of the swing arm assembly 1200. The third lower linkage 1246 and fourth lower linkage 1248 may be disposed proximate the second opposite side of the swing arm assembly 1200. A first lower actuator 1250 and a second lower actuator 1252 may be used to move the platform 1254 from a first position positioned selectively relative to a vehicle floor 1256, to a second position for stowing, to a third position positioned selectively relative to an external surface, such as the ground. The second bracket mount 1240 and beam 1205 remain fixed in position when the lift is the 'worked' position, as shown in FIG. 12B. The second bracket mount 1240 and beam 1205 do not move when the lower actuators 1250, 1252 are being operated. A third bracket mount 1245 may connect the platform 1254 to the beam 1205 via the lower linkages 1242, 1244, 1246, 1248. One or more stops 1235 may limit movement of the second pair of upper linkages 1230 and/or the fourth pair of upper linkages 1234. The one or more steps 1235 may limit movement of the upper linkages 1228, 1230, 1232, 1234 so that the lift platform 1254 does not impinge on a vehicle bed, walk ramp such as shown in FIG. 14; tow hitch such as shown in FIG. 15; steps; a vehicle restraint, such as a dock lock; a vehicle restraint receiver; or the like.

The first bracket mount 1226 and the second bracket mount 1240 may be connected to the beam 1205. The beam 1205 may be a structural element, such as a support having a substantially square or rectangular cross-section. In other embodiments, the beam 1205 may be made from two or more pieces. In other embodiments, the first bracket mount 1226 and the second bracket mount 1240 may be connected. The first bracket mount 1226 may operate to move from the first position positioned selectively relative to a vehicle floor 1256, to a second position for stowing, to a third position positioned selectively relative to an external surface, such as the ground. The movement of the first bracket 1226 may be via an actuator, a motor, a manual movement, or the like.

The platform 1254 is depicted in a folded position. In some embodiments, the platform 1254 may be folded or partially folded when the swing arm assembly 1200 is in a stowed position. In other embodiments, the platform 1254 may be a one-piece platform.

Figure 13A:
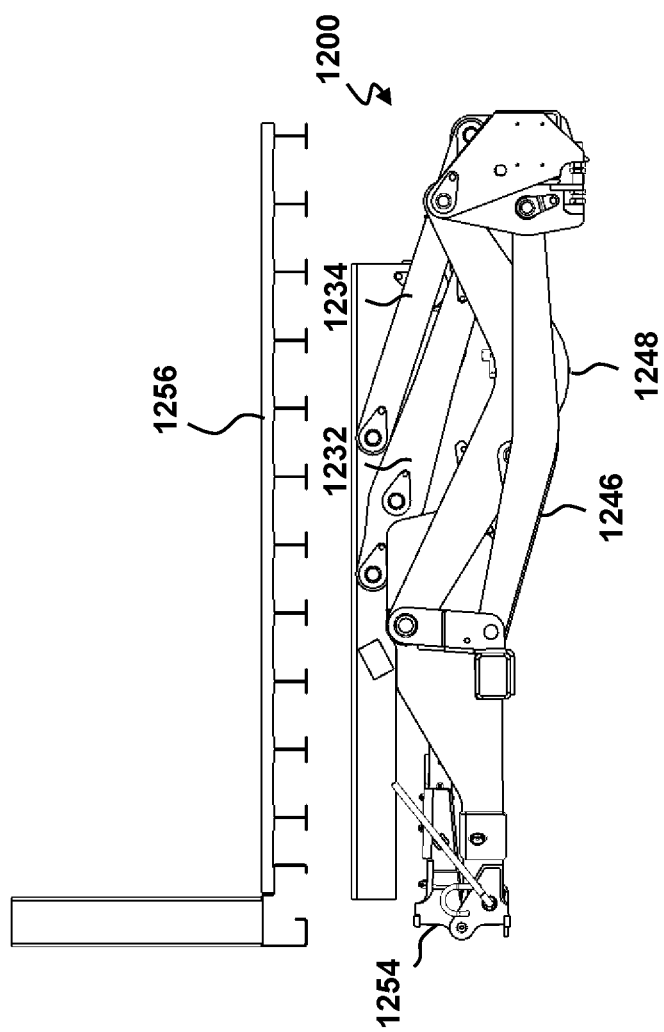
FIG. 13A depicts a side view of the alternate swing arm assembly of FIG. 12A in a stowed position, according to one embodiment.

FIG. 13A depicts a side view of the alternate swing arm assembly of FIG. 12A in a stowed position, according to one embodiment. The swing arm assembly 1200 and lift platform 1254 are stowed underneath the vehicle floor 1256. This stowed position may be used when the vehicle is in motion, the swing arm assembly 1200 is not in use, or the like. The pairs of upper linkages 1232, 1234 and pair of lower linkages 1246, 1248 maintain the lift platform 1254 underneath the vehicle in the stowed position.

Figure 13B:
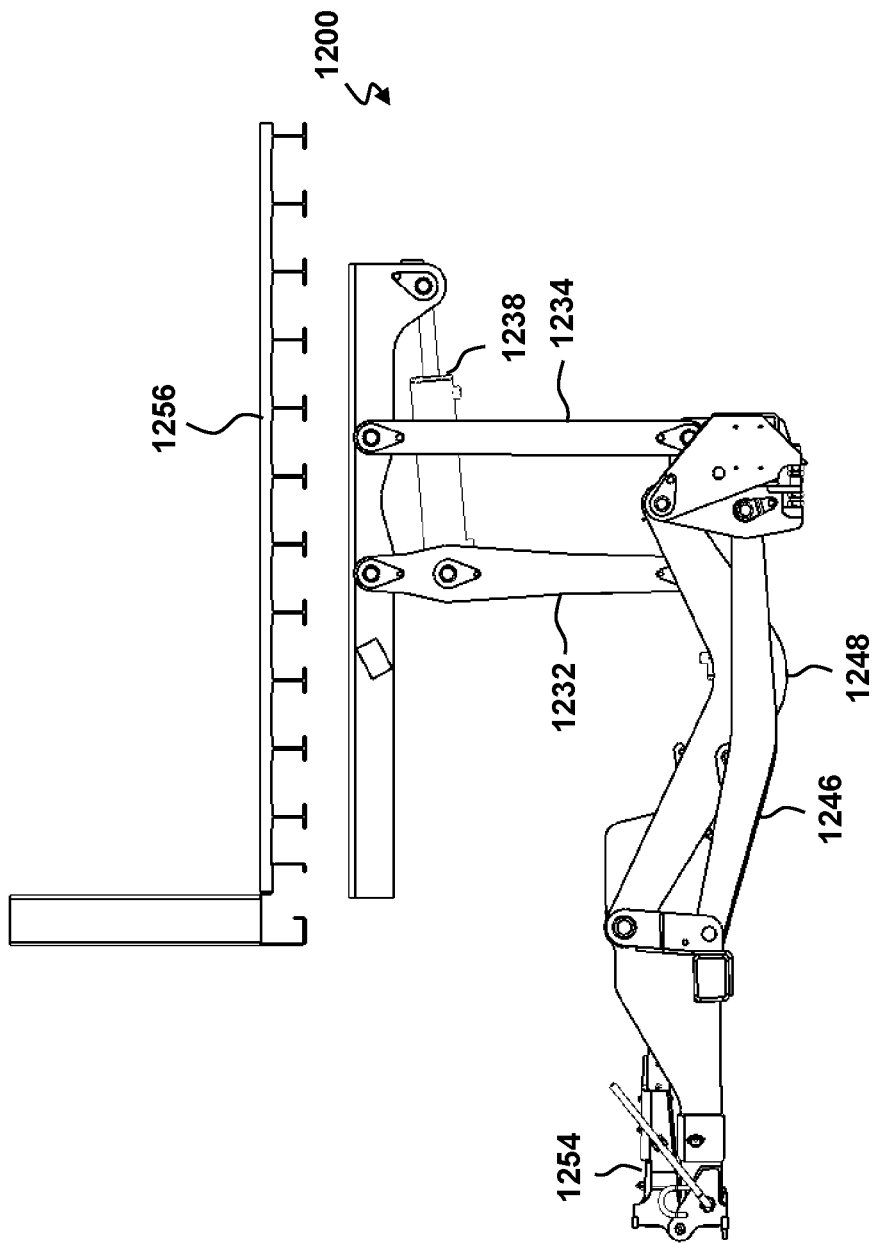
FIG. 13B depicts a side view of the alternate swing arm assembly of FIG. 12A in a middle position, according to one embodiment.

FIG. 13B depicts a side view of the alternate swing arm assembly of FIG. 12A in a middle position, according to one embodiment. The second upper actuator 1238 may extend causing the lift platform 1254 to move away from the vehicle floor 1256 via pivoting movement of the third pair of upper linkages 1232 and fourth pair of upper linkages 1234. The third lower linkage 1246, fourth lower linkage 1248, and lift platform 1254 may remain substantially level relative to the vehicle floor 1256 and/or their stowed positions during this pivoting movement. In some embodiments, the lift platform 1254 may be angled a set amount relative to the vehicle floor 1256 and/or the ground.

Figure 13C:
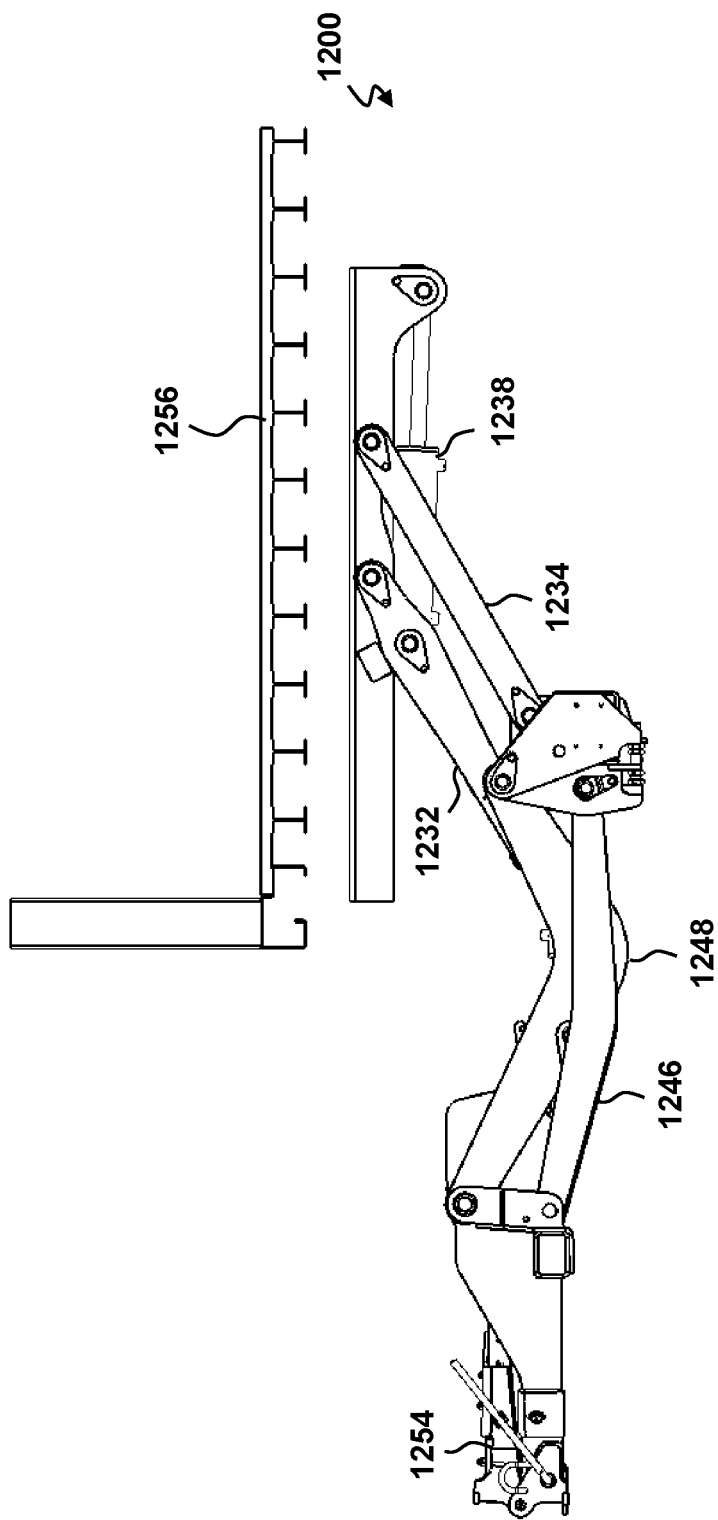
FIG. 13C depicts a side view of the alternate swing arm assembly of FIG. 12A in a worked position, according to one embodiment.
Figure 13D:
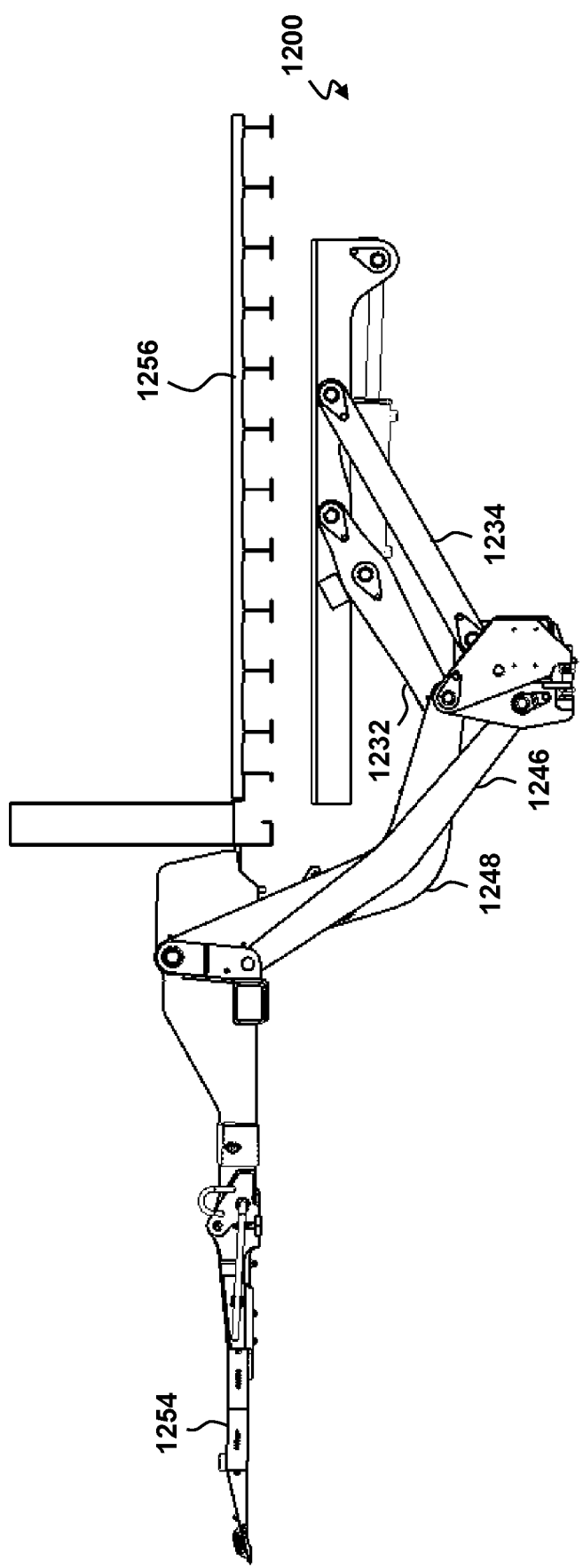
FIG. 13D depicts a side view of the alternate swing arm assembly of FIG. 12A in an up position, according to one embodiment.
Figure 13E:
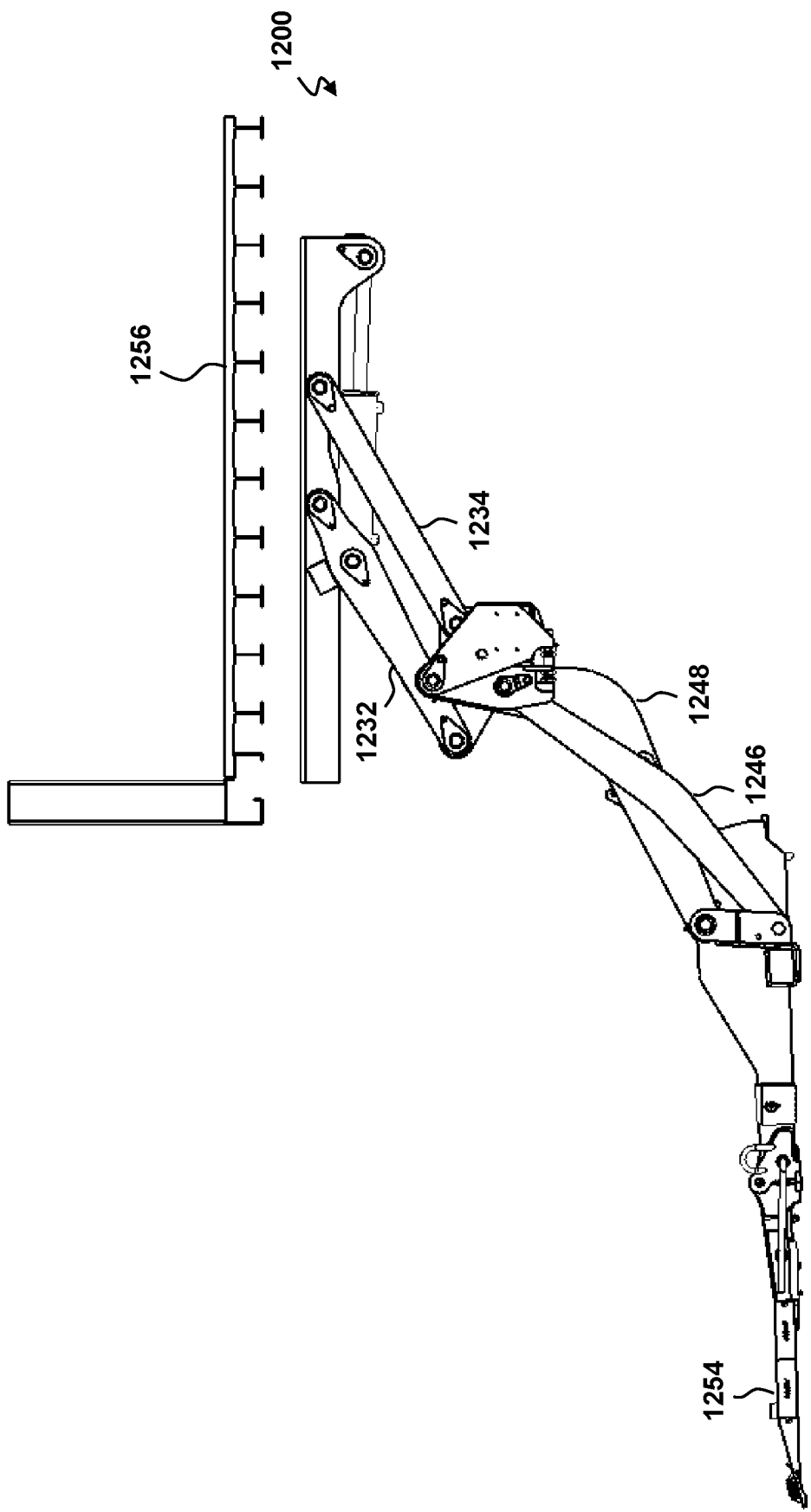
FIG. 13E depicts a side view of the alternate swing arm assembly of FIG. 12A in a down position, according to one embodiment.

FIG. 13C depicts a side view of the alternate swing arm assembly of FIG. 12A in a worked position, according to one embodiment. The second upper actuator 1238 may continue to extend until the lift platform 1245 is at a maximum horizontal distance from the vehicle floor 1256. From the worked position shown in FIG. 13C, the lift platform 1254 may be unfolded and raised, as shown in FIG. 13D, and/or lowered, as shown in FIG. 13E. A vertical height of first bracket relative to the liftgate frame in the first stowed position, as shown in FIG. 13A, may be substantially equal to a vertical height of the first bracket relative to the liftgate frame in the second engaged position, as shown in FIG. 13C.

FIG. 13D depicts a side view of the alternate swing arm assembly of FIG. 12A in an up position, according to one embodiment. In the up position shown in FIG. 13D, the platform 1254 is raised to be positioned selectively relative to the vehicle floor 1256 to allow for the transfer of items in the vehicle onto the platform 1254 or vice versa. The platform 1254 may be substantially aligned with the vehicle floor 1256, higher than the vehicle floor 1256, or lower than the vehicle floor 1256. The platform 1254 may be substantially parallel to the vehicle floor 1256 or slanted relative to the vehicle floor 1256. The amount of slant in the platform 1254 may be set, adjustable manually by a user, or adjustable automatically via a controller and actuator or motor, or by geometry. The second lower actuator may extend to move the lift platform 1254 to a maximum vertical height that may be above, below, or substantially aligned with the vehicle floor 1256 via the third lower linkage 1246 and the fourth lower linkage 1248. The platform 1254 may remain substantially level relative to the vehicle floor 1256 and/or the ground during movement. The platform 1254 may ramp down or ramp up relative to its vertical height.

FIG. 13F depicts a side view of the alternate swing arm assembly of FIG. 12A in a down position, according to one embodiment. In the down position shown in FIG. 13E, the platform 1254 is positioned selectively relative to an external surface, such as the ground. The second lower actuator may retract to move the lift platform 1254 to a position relative to the ground via the third lower linkage 1246 and the fourth lower linkage 1248.

FIG. 14 depicts a perspective view of a vehicle 1400 having a walk ramp 1402, according to one embodiment. The swing arm assemblies described herein move in arcuate paths such that the walk ramp 1402 may be pulled from the truck and placed in an engaged position with one end on the ground without impinging or contacting the swing arm assembly.

FIG. 15 depicts a perspective view of a vehicle 1500 having a tow hitch 1502, according to one embodiment. The swing arm assemblies described herein move in arcuate paths such that the tow hitch 1502 remain in position for optional towing without impinging or contacting the swing arm assembly.

Figure 16:
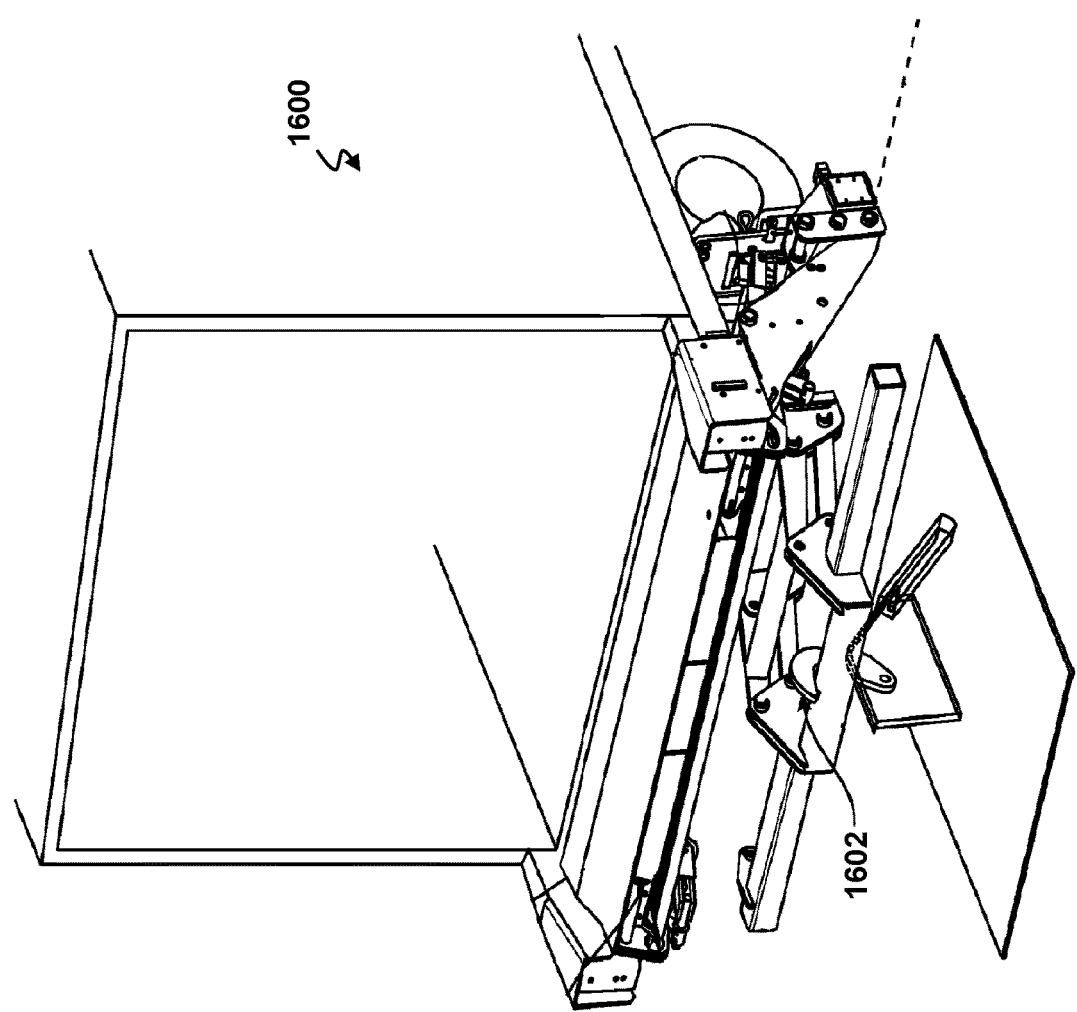
FIG. 16 depicts a perspective view of a vehicle 1600 having a vehicle restraint, according to one embodiment.

FIG. 16 depicts a perspective view of a vehicle 1600 having a vehicle restraint 1602, according to one embodiment. In some embodiments, the vehicle 1600 may include the vehicle restraint 1602, such as a dock lock, and/or a vehicle restraint receiver. During loading and unloading operations, the vehicle 1600 is backed up to the dock against bumpers, such that the vehicle bed is generally horizontally aligned with the upper surface of the dock. A dock lock may include a bar, hook, platform, or the like which engages, holds, latches, and/or supports the fixed underride. A dock lock hook engages or grabs a center portion of the underride, thus locking the vehicle in position relative to the dock. The swing arm assemblies described herein move in an arcuate paths such that the vehicle restraint 1602 may be used to secure the vehicle to a loading dock without impinging or contacting the swing arm assembly. The lift platform is in a stowed (tucked) position under the vehicle bed, and the underride is grabbed (locked) by the vehicle restraint 1602, or dock lock, extending upwardly from the ground level.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:
   two pairs of upper linkages, wherein each pair of upper linkages is pivotally connected to a first bracket at a first end, and pivotally connected to a liftgate frame at a second end;
   two pairs of lower linkages, wherein each pair of lower linkages is pivotally connected to the first bracket at a third end, and pivotally connected to a lift platform at a fourth end;
   one or more upper actuators connected to the liftgate frame at one end and each pair of upper linkages, between the first end and the second end at the other end and configured to move the lift platform in a range from a stowed position underneath the liftgate frame to an engaged position moved away from underneath the liftgate frame by pivoting the two pairs of upper linkages;
   one or more lower actuators connected to the first bracket at one end and each pair of lower linkages between the third end and the fourth end at the other end and configured to move the lift platform in the engaged position in a range from a position proximate a vehicle opening to an external surface, by pivoting the two pairs of lower linkages; and
   one or more moveable engagement mechanisms configured to secure a post on the first bracket when the lift platform is in at least one of: the stowed position underneath the liftgate frame and the engaged position;
   wherein one or more actuators of the one or more upper actuators and the one or more lower actuators are configured to pivot one or more linkages of the two pairs of upper linkages and the two pairs of lower linkages such that the lift platform remains at a set orientation relative to the external surface during movement between the stowed position and the engaged position;
   wherein the moveable engagement mechanisms include one or more storage engagement mechanisms that are disposed distal from the vehicle opening and configured to secure the first bracket in the stowed position underneath the liftgate frame and one or more deployment engagement mechanisms that are disposed proximate the vehicle opening and configured to secure the first bracket in the engaged position; and
   wherein the one or more storage engagement mechanisms are connected to the liftgate frame at a fifth end, wherein the fifth end of the one or more storage engagement mechanisms is disposed farther away from the vehicle opening than the second end of the each pair of upper linkages.

2. The system of claim 1 further comprising:
   two or more first bracket mounts connected to the first bracket, wherein each pair of upper linkages is connected to the first bracket via respective first bracket mounts of the two or more first bracket mounts; and one or more stops connected to the liftgate frame, wherein each of the one or more stops contacts at least one upper linkage of the two pairs of upper linkages in the engaged position.

3. The system of claim 2 wherein each pair of upper linkages are pivotally mounted between respective first bracket mounts of the two or more first bracket mounts and the liftgate frame.

4. The system of claim 2 further comprising:
two or more second bracket mounts connected to the first bracket, wherein each pair of lower linkages is connected to the first bracket via respective second bracket mounts of the two or more second bracket mounts.

5. The system of claim 4 further comprising:
two or more third bracket mounts connected to the lift platform, wherein each pair of lower linkages is connected to the lift platform via respective third bracket mounts of the two or more third bracket mounts.

6. The system of claim 5 wherein the two pairs of lower linkages are pivotally mounted between the two or more second bracket mounts and the two or more third bracket mounts, and wherein the liftgate frame is mounted to a vehicle frame.

7. The system of claim 5 wherein the two or more first bracket mounts, the two or more second bracket mounts, the two or more third bracket mounts, and the lift platform remain at the set orientation during movement between the stowed position and the engaged position.

8. The system of claim 5 wherein the two or more first bracket mounts, the two or more second bracket mounts, the two or more third bracket mounts, and the lift platform remain at the set orientation during movement between an up position and a down position positioned selectively relative to the external surface.

9. The system of claim 1 wherein the lift platform is configured to move from an up position to a down position positioned selectively relative to the external surface.

10. A system, comprising:
two pairs of upper linkages, wherein each pair of upper linkages is pivotally connected to a first bracket at a first end, and pivotally connected to a liftgate frame at a second end;
two pairs of lower linkages, wherein each pair of lower linkages is pivotally connected to the first bracket at a third end, and pivotally connected to a lift platform at a fourth end;
one or more upper actuators connected to the liftgate frame at one end and each pair of upper linkages, between the first end and the second end at the other end and configured to move the lift platform in a range from a stowed position underneath the liftgate frame to an engaged position moved away from underneath the liftgate frame by pivoting the two pairs of upper linkages;
one or more lower actuators connected to the first bracket at one end and each pair of lower linkages between the third end and the fourth end at the other end and configured to move the lift platform in the engaged position in a range from a position proximate a vehicle opening to an external surface, by pivoting the two pairs of lower linkages, wherein one or more actuators of the one or more upper actuators and the one or more lower actuators are configured to pivot one or more linkages of the two pairs of upper linkages and the two pairs of lower linkages such that the lift platform remains at a set orientation relative to the external surface during movement in an arcuate path between the stowed position to the engaged position;
one or more moveable engagement mechanisms configured to secure a post on the first bracket when the lift platform is in at least one of: the stowed position underneath the liftgate frame and the engaged position; and
one or more stops connected to the liftgate frame, wherein each of the one or more stops contacts at least one upper linkage of the two pairs of upper linkages in the engaged position;
wherein the moveable engagement mechanisms include one or more storage engagement mechanisms that are disposed distal from the vehicle opening and configured to secure the first bracket in the stowed position underneath the liftgate frame and one or more deployment engagement mechanisms that are disposed proximate the vehicle opening and configured to secure the first bracket in the engaged position; and
wherein the one or more storage engagement mechanisms are connected to the liftgate frame at a fifth end, wherein the fifth end of the one or more storage engagement mechanisms is disposed farther away from the vehicle opening than the second end of the each pair of upper linkages.

11. The system of claim 10 wherein two or more first bracket mounts are connected to the first bracket, wherein each pair of upper linkages is connected to the first bracket via respective first bracket mounts of the two or more first bracket mounts.

12. The system of claim 10 wherein at least one upper linkage of the two pairs of upper linkages comprise an "L" shape.

13. The system of claim 10 wherein the two pairs of lower linkages are pivotally mounted between two or more second bracket mounts and two or more third bracket mounts.

14. The system of claim 10 wherein at least one lower linkage of the two pairs of lower linkages comprise a bend proximate a middle portion.

15. The system of claim 10 wherein at least one lower linkage of the two pairs of lower linkages comprise an "L" shape.

16. The system of claim 10 wherein the lift platform is configured to move from an up position to a down position positioned selectively relative to the external surface.

17. The system of claim 10, wherein the one or more moveable engagement mechanisms are rotatably mounted on the liftgate frame to engage and disengage said first bracket.

18. The system of claim 10, further comprising:
a control module for controlling movement of the one or more moveable engagement mechanisms to engage and disengage said first bracket, wherein the control module comprises at least one of: a controller and an actuator.

19. A system, comprising:
one or more pairs of upper linkages, wherein each pair of upper linkages is pivotally connected to a first bracket at a first end, and pivotally connected to a liftgate frame at a second end;
one or more pairs of lower linkages, wherein each pair of lower linkages is pivotally connected to the first bracket at a third end, and pivotally connected to a lift platform at a fourth end;
one or more upper actuators connected to the liftgate frame at one end and each pair of upper linkages, between the first end and the second end at the other end and configured to move the lift platform in a range from a stowed position underneath the liftgate frame to an engaged position moved away from underneath the liftgate frame by pivoting the one or more pairs of upper linkages;

one or more lower actuators connected to the first bracket at one end and each pair of lower linkages between the third end and the fourth end at the other end and configured to move the lift platform in the engaged position in a range from a position proximate a vehicle opening to an external surface, by pivoting the two pairs of lower linkages; and one or more moveable engagement mechanisms configured to secure a post on the first bracket when the lift platform is in at least one of: the stowed position underneath the liftgate frame and the engaged position;

wherein one or more actuators of the one or more upper actuators and the one or more lower actuators are configured to pivot one or more linkages of the two pairs of upper linkages and the two pairs of lower linkages such that the lift platform remains at a set orientation relative to the external surface during movement between the stowed position and the engaged position, wherein the lift platform is underneath the liftgate frame in the stowed position; and one or more stops connected to the liftgate frame, wherein each of the one or more stops contacts at least one upper linkage of the one or more pairs of upper linkages in the engaged position;

wherein the moveable engagement mechanisms include one or more storage engagement mechanisms that are disposed distal from the vehicle opening and configured to secure the first bracket in the stowed position underneath the liftgate frame and one or more deployment engagement mechanisms that are disposed proximate the vehicle opening and configured to secure the first bracket in the engaged position; and wherein the one or more storage engagement mechanisms are connected to the liftgate frame at a fifth end, wherein the fifth end of the one or more storage engagement mechanisms is disposed farther away from the vehicle opening than the second end of the each pair of upper linkages.

20. The system of claim 19 further comprising:

a vehicle frame, wherein the liftgate frame is mounted to the vehicle frame; and a vehicle accessory connected to the vehicle frame;

wherein during the movement from the stowed position to the engaged position, the lift platform moves around the vehicle accessory without impinging the vehicle accessory.

* * * * *